May 7, 1946.  W. D. HAILES ET AL  2,399,734
CENTRALIZED TRAFFIC CONTROLLING SYSTEM FOR RAILROADS
Filed April 27, 1943  13 Sheets-Sheet 5

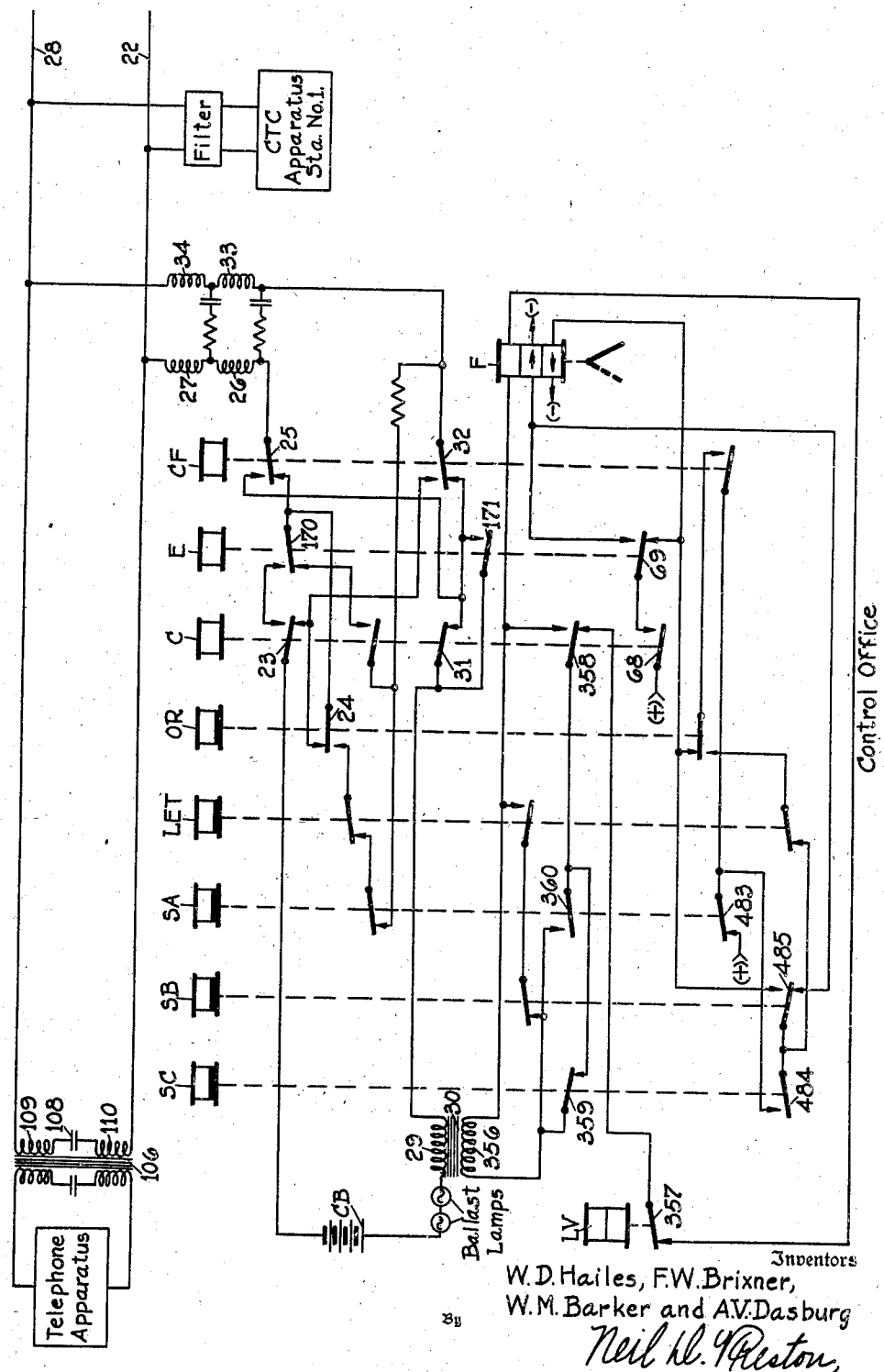

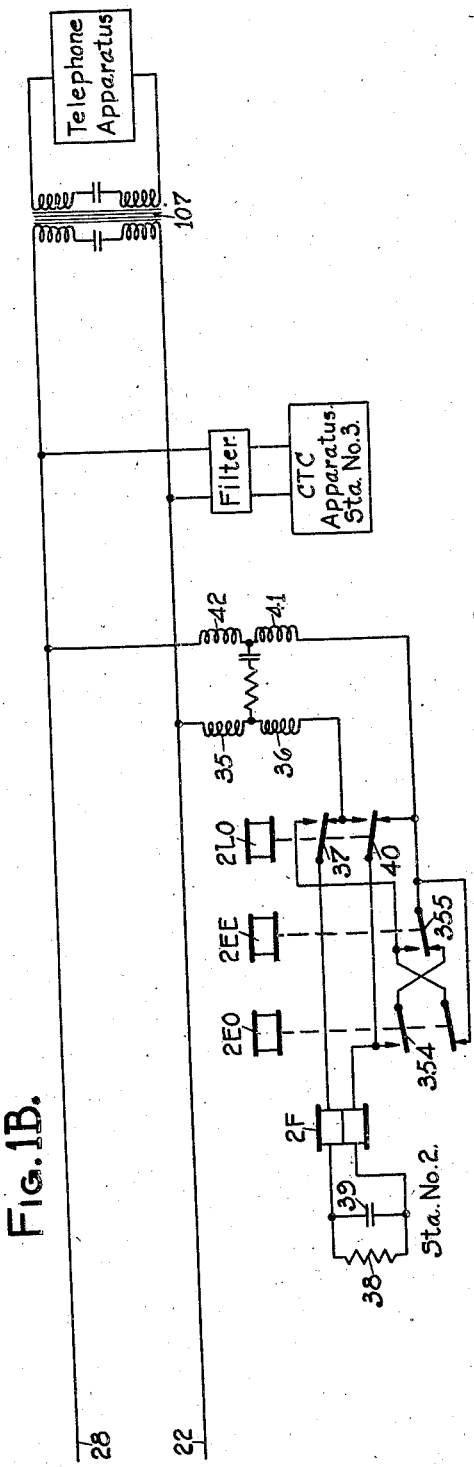

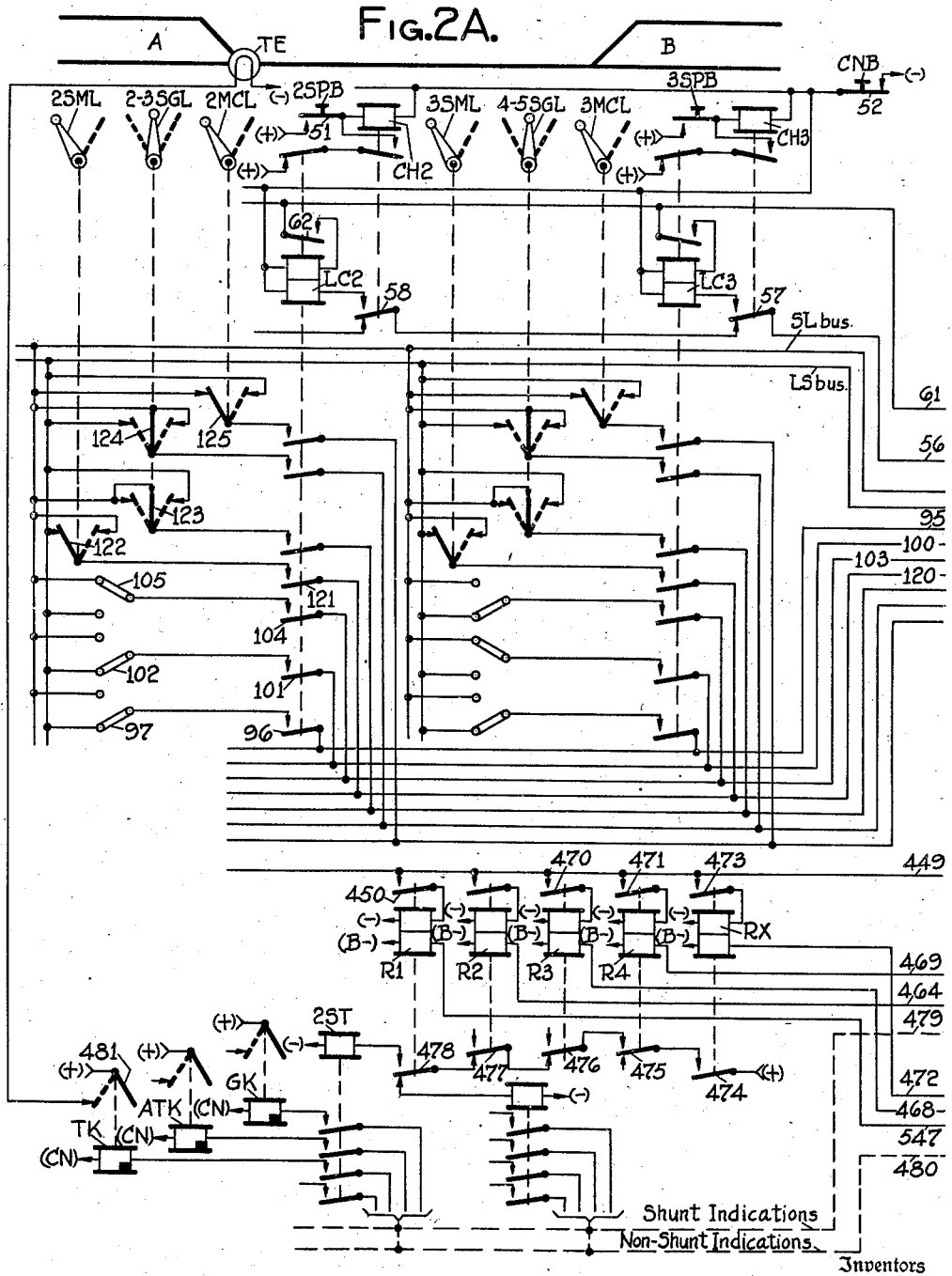

Inventors
W. D. Hailes, F. W. Brixner,
W. M. Barker and A. V. Dasburg
By Neil W. Preston
Their Attorney

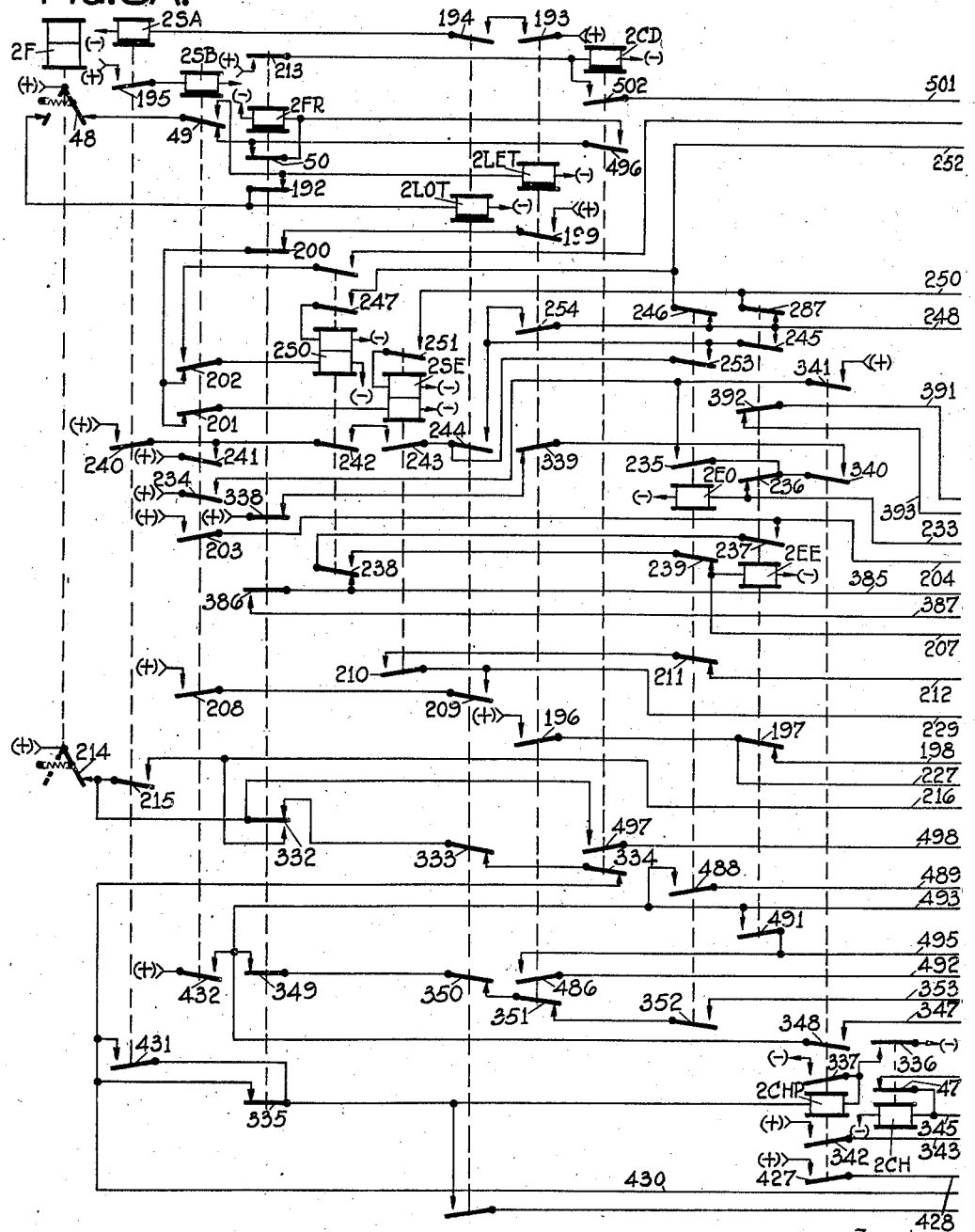

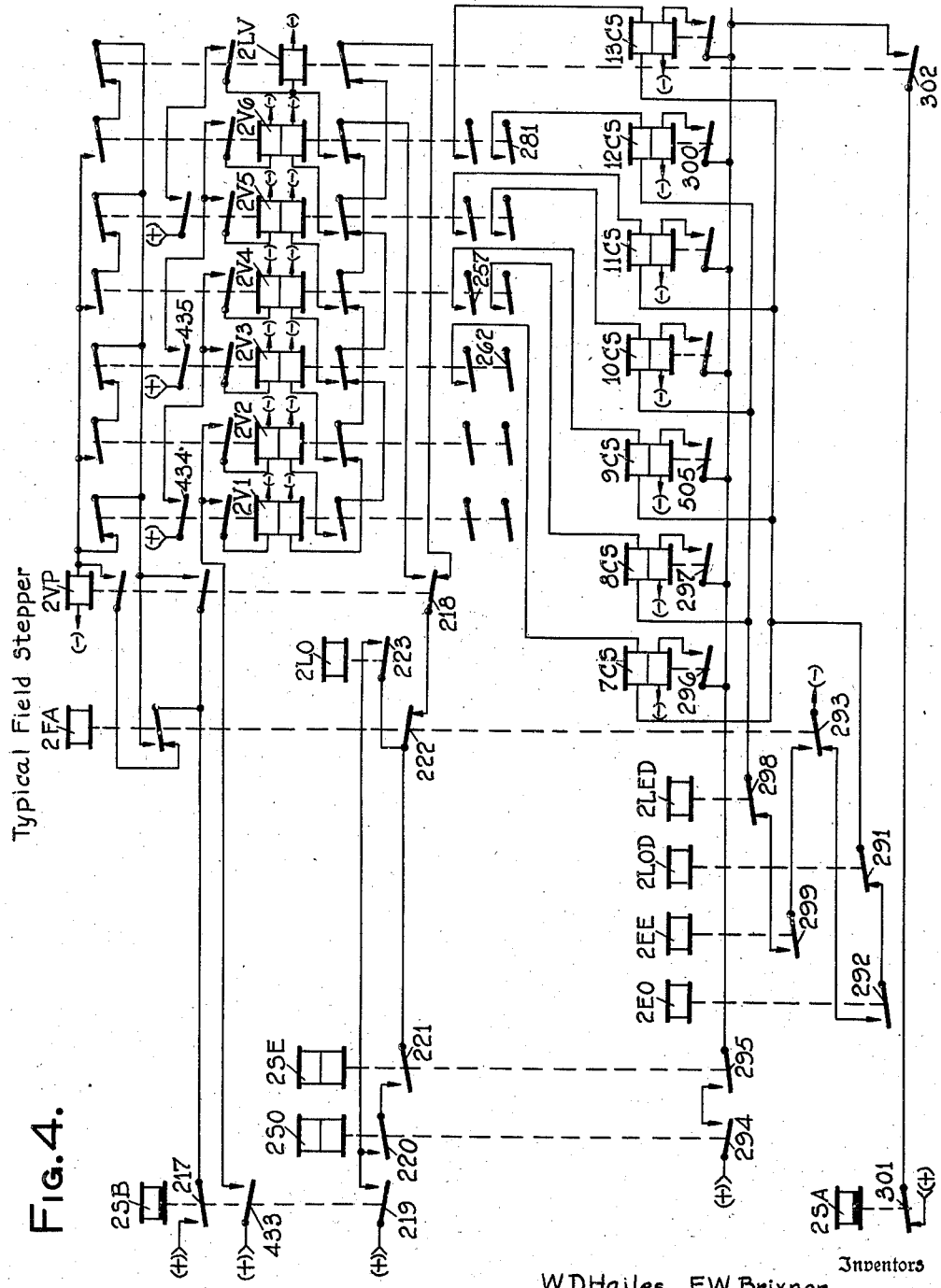

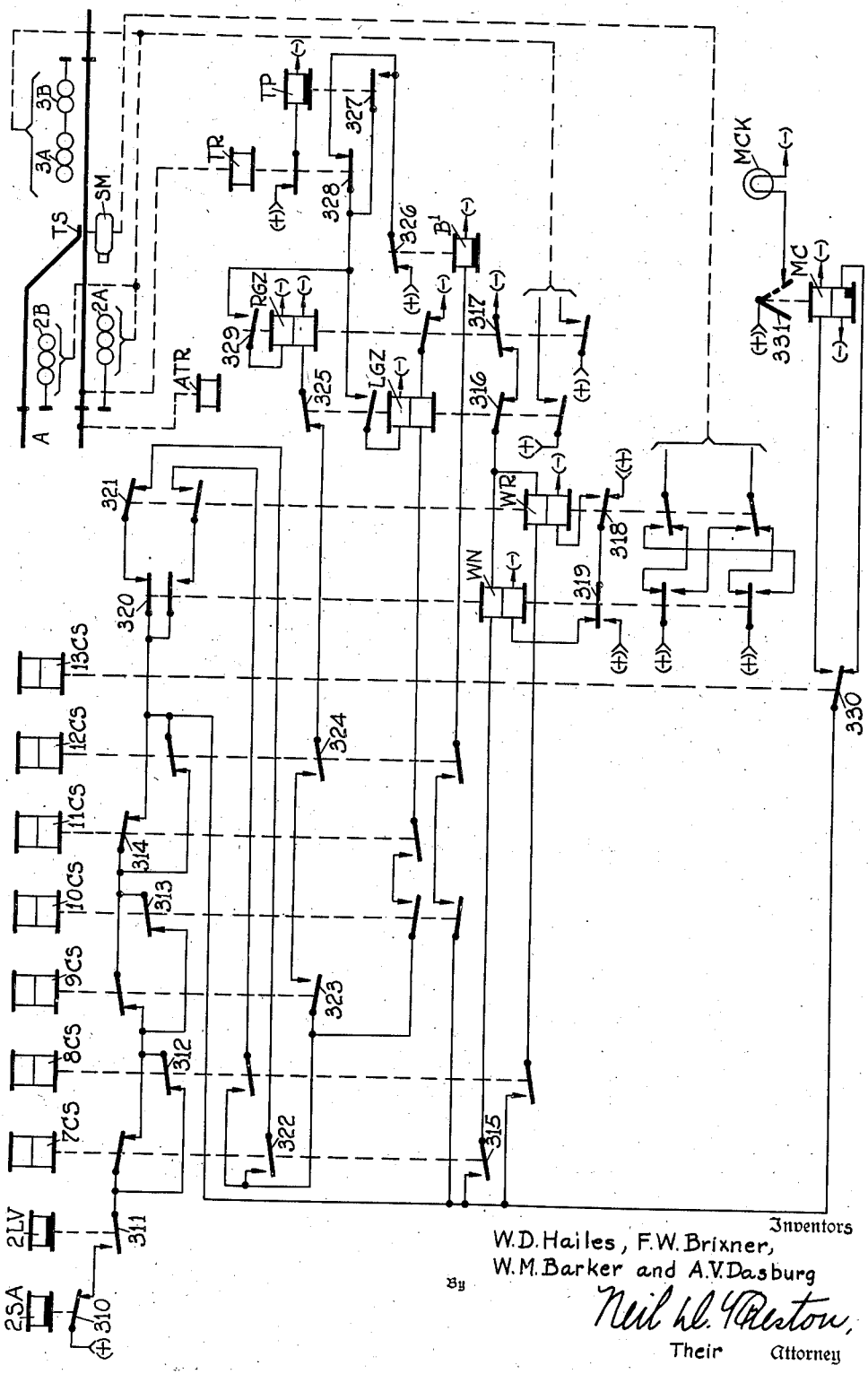

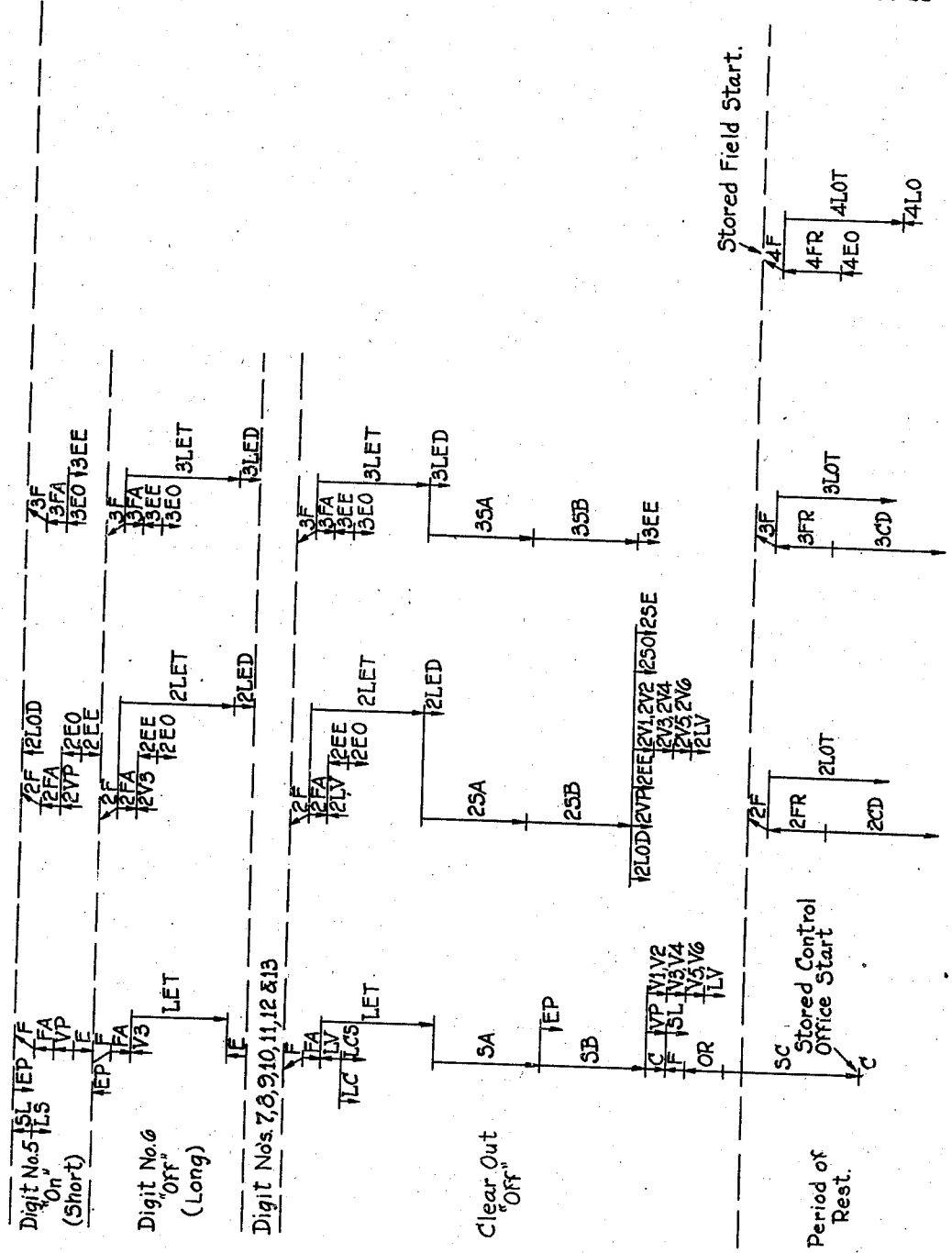

Figure 8A. Indication Cycle Sequence Chart. Length of arrows indicates approximate relative timing of relay operations necessary to provide a proper sequence of operation.

May 7, 1946.  W. D. HAILES ET AL  2,399,734
CENTRALIZED TRAFFIC CONTROLLING SYSTEM FOR RAILROADS
Filed April 27, 1943  13 Sheets-Sheet 13

Inventors
W.D.Hailes, F.W.Brixner,
W.M.Barker and A.V.Dasburg
By Neil W. Preston,
Their Attorney Patented May 7, 1946

2,399,734

UNITED STATES PATENT OFFICE 2,399,734

CENTRALIZED TRAFFIC CONTROLLING SYSTEM FOR RAILROADS

William D. Hailes, Brighton, Frederick W. Brixner, Gates, William M. Barker, Greece, and Alfred V. Dasburg, Brighton, N. Y., assignors to General Railway Signal Company, Rochester, N. Y.

Application April 27, 1943, Serial No. 484,728

11 Claims. (Cl. 177—353)

This invention relates to centralized traffic controlling systems for railroads, and it more particularly pertains to centralized traffic controlling systems of the code communication type.

An object of the present invention is to communicate switch and signal controls and indications by distinctive codes between a control office and several field stations over a single line circuit, such line circuit being of a "shunt" type in that the line circuit is never opened in the field but is selectively shunted at the various field stations when such stations have indications to transmit to the control office. By this arrangement, the same line wires can be used for other purposes such as telephonic communication. A field station, for the purpose of this disclosure, comprises the control apparatus for a group of signals and/or a power switch located relatively close together as, for example, at either end of a passing siding.

Another object of the present invention is to selectively transmit long and short "on" periods, and long and short "off" periods in the form of different series of impulses and time spaces, each impulse together with the time space following such impulse constituting a step period. For the transmission of codes from the control office, each step period is characterized in a selected one of two ways, either with the impulse long and the following time space short, or with the impulse short and the following time space long. The decoding means at the various field stations is adapted to be selectively responsive to either of such combinations for each step period, but to be non-responsive for any step period having either a short period of energization followed by a short period of deenergization, or a long period of energization followed by a long period of deenergization. By this particular arrangement of code transmission and reception, an erroneous control can be received at a field station only in case of a double error in the codes transmitted during any one step, and the probability of such double error occurring is extremely slight because it would require a failure at the same time of apparatus associated with communication by a period of energization or "on" period, and other apparatus associated with communication by a period of deenergization or "off" period.

Another object of the present invention is to transmit indications to the control office from any field station having indications to transmit by selectively applying a shunt to the line circuit to transmit registration and indication codes to the control office by different series of "shunt" and "non-shunt" periods, each of such periods being selectively made short or long. An object in connection with the transmission of such periods is to apply and remove the shunt by separate relays in such a manner that the failure of either of such relays at one field station will not interfere with the use of the line circuit for the communication of controls and indications between the control office and other field stations.

Other objects, purposes and characteristic features of the present invention will be in part obvious from the accompanying drawings and in part pointed out as the description of the invention progresses.

In describing the invention in detail, reference will be made to the accompanying drawings, in which like reference characters designate corresponding parts throughout the several illustrations, similar letter reference characters being employed to designate parts of a similar nature, such parts being generally identified as being associated with a particular location, device, or sequence of operation by preceding or succeeding numerals, and in which—

Figs. 1A and 1B when placed end-to-end illustrate the line circuit for this embodiment of the present invention;

Figs. 2A, 2B and 2C when placed side-by-side illustrate the control office apparatus for the transmission of controls and the reception of indications according to this embodiment of the present invention;

Figs. 3A and 3B when placed side-by-side illustrate the apparatus for receiving controls and transmitting indications at a typical field station;

Fig. 4 illustrates a typical field stepper together with the control of a bank of decoding relays associated therewith;

Fig. 5 illustrates typical application circuits showing how signals and a power track switch can be controlled in accordance with control codes received at that field station;

Fig. 6 is a code chart showing the codes used in this embodiment of the present invention for the transmission of controls to the various field stations from the control office;

Figure 7A:
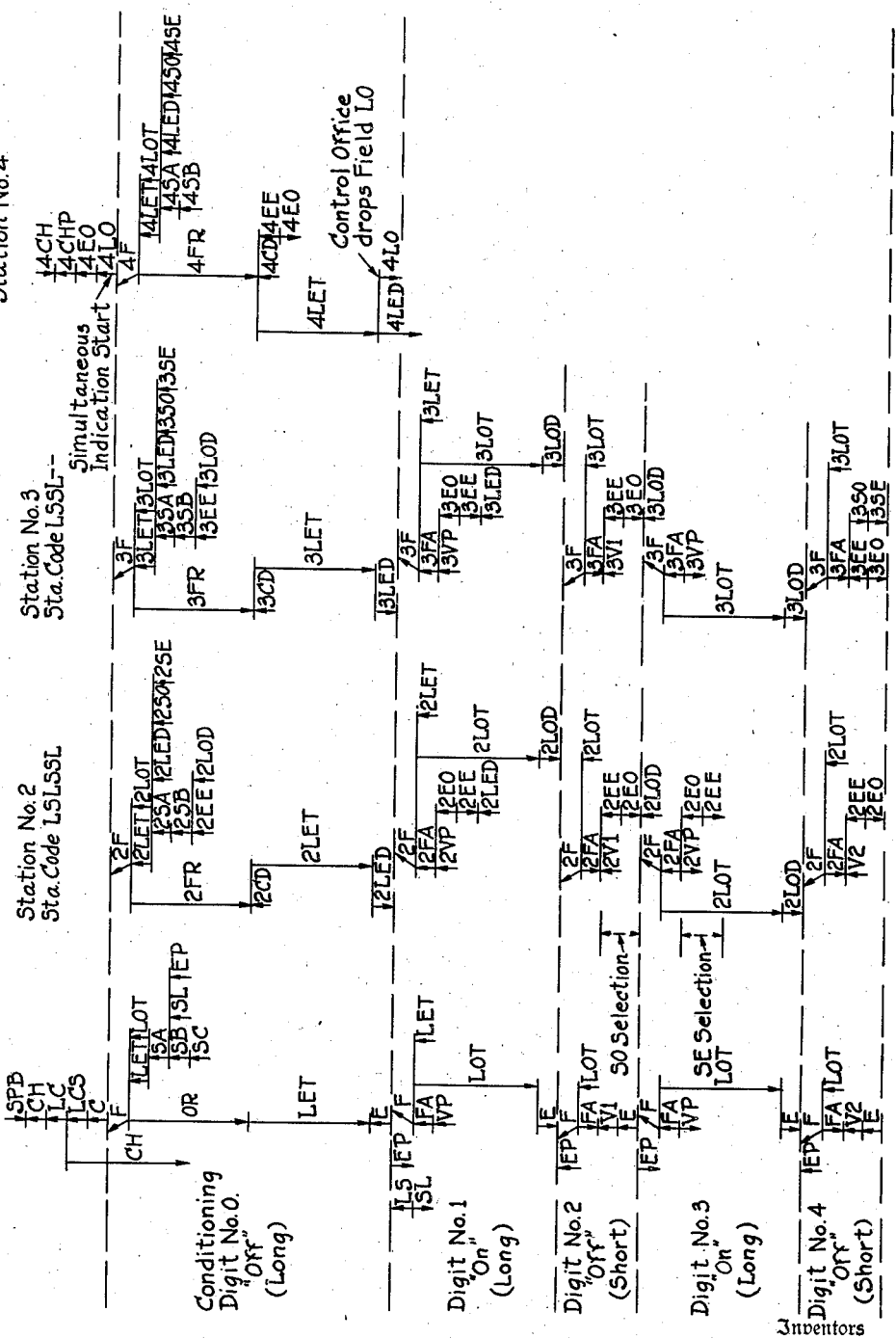
Figure 8B:
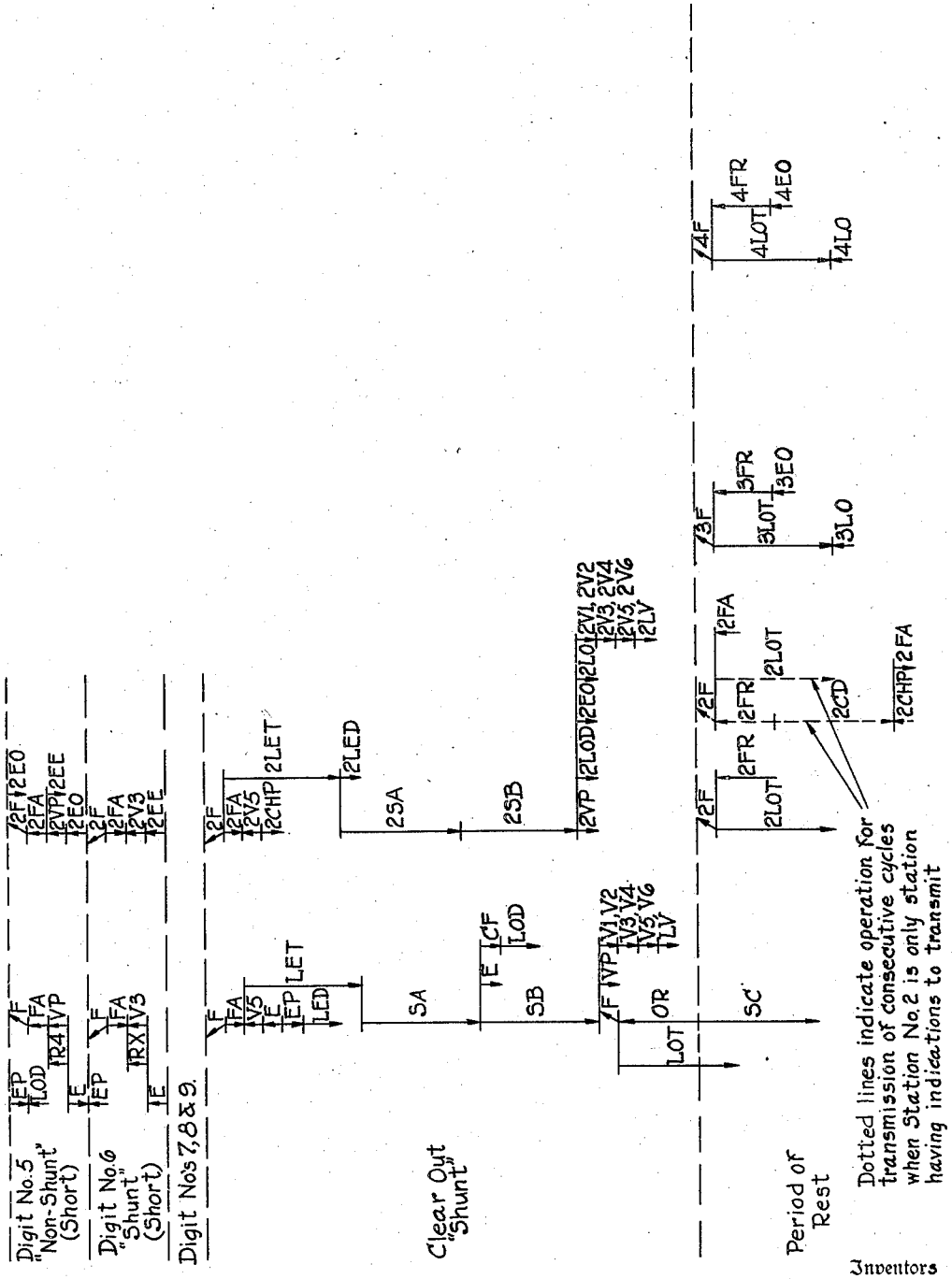

Figs. 7A and 7B when placed one above the other form a control cycle sequence chart illustrating the sequence in which the relays of the system are operated during a typical control cycle of operation; and Figs. 8A and 8B when placed one above the other form an indication cycle sequence chart illustrating the sequence of operation of the relays of the system during the transmission of a typical indication cycle.

For the purpose of simplifying the illustrations and facilitating in the explanation thereof, the various parts and circuits constituting this embodiment of the present invention have been shown diagrammatically, and certain conventional illustrations have been employed, the drawings having been made more with the purpose of facilitating the disclosure of the present invention as to its principles and mode of operation, rather than for the purpose of illustrating the specific construction and arrangement of parts that would be employed in practice. Thus, the various relays and their contacts are illustrated in a conventional manner, certain contacts being shown in the conventional written circuit form, and symbols are used to indicate the connections to terminals of batteries or other sources of electric current instead of showing all of the wiring connections to such terminals.

The symbols (+) and (—) are employed to indicate the positive and negative terminals respectively of suitable batteries or other sources of direct current, and the circuits with which these symbols are used always have current flowing in the same direction. The symbols (B+) and (B—) indicate connections to the opposite terminals of a suitable battery or other direct current source which has a central or intermediate tap designated (CN), and the circuits with which these symbols are used may have current flowing in one direction or the other, dependent upon the particular terminal used in combination with the intermediate tap (CN).

In order to simplify the disclosure of the present invention, reference is made from time to time to functions common to all parts of a similar character by use of the letter reference characters common to such parts without preceding or succeeding numerals. It is to be understood that such a reference applies to any parts designated in the drawings by reference characters that are similar except for numerals associated therewith.

In the description of the present invention each distinctive series of impulses and time spaces, or "non-shunt" and "shunt" periods is said to constitute a respective control or indication cycle. Each cycle is initiated from a period of rest during which the line circuit is normally energized with a particular polarity, into a conditioning period. Such conditioning period is an "off" period in the case of a control cycle or a "shunt" period in the case of an indication cycle. Following the conditioning period the various "on" and "off" periods of a control cycle are numbered consecutively as digits, the odd numbered digits being the "on" periods and the even numbered digits being the "off" periods. The combination of each "on" period, or odd digit, with the following "off" period, or even digit, is said to constitute a step period. Similarly, in an indication cycle, the periods following the conditioning period are numbered consecutively as digits, the odd numbered digits being "non-shunt" periods, and the even numbered digits being "shunt" periods. Following each series of impulses is a clear-out period before the system enters a period of rest. In a control cycle the clear-out period is an "off" period, and in an indication cycle the clear-out period is a "shunt" period.

It is to be understood that the system is applicable to the control of power switches and signals under practically any conditions where it is desirable to control such devices over a line circuit from a distant point. For the purpose of disclosure of this embodiment of the present invention, however, it is assumed that the system is applied to the control of power switches and signals at the opposite ends of a stretch of single track extending between passing sidings A and B, such track layout being illustrated in Fig. 2A as being diagrammatically shown on the panel of a control machine at the control office. The structure of such control machine can be, for example, as is shown in the patent to J. F. Merkel, Patent No. 2,145,798, dated January 31, 1939.

The track switch and signals at the right-hand end of the passing siding A are illustrated in Fig. 5. The switch machine SM can be of a power operated type as is shown, for example, in the patent to W. K. Howe, Patent No. 1,466,903, dated September 4, 1923, and although the signals can be of any suitable well-known type such as search light, semaphore, and position light signals, the signals illustrated are assumed to have individual color lamp units for the respective clear, caution, and stop indications, and the specific control of the indicator lamps has not been shown as it is to be understood that this control can be provided in accordance with the usual practice familiar to those skilled in the art.

*Control office apparatus.*—Buttons and control levers are provided on the control panel of the control machine in the usual manner for the manual designation of switch and signal controls to be communicated to the respective field stations. For example, the levers 2SML, 2—3SGL, and the maintainers call-lever 2MCL (see Fig. 2A) are associated with the selection of controls to be transmitted to field station No. 2. The lever 2SML is a two-position lever for selecting the position of the power switch at that field station, the lever 2—3SGL is for the purpose of selecting the control of the signals at that field station as to whether a signal is to be cleared for governing eastbound or westbound traffic or whether a signal is to be put to stop. The normal position of the lever is in its center position, which corresponds to the stop indications of signals for both directions at the field station No. 2, and the operation of the lever to a right-hand or left-hand position selects the clearing of a signal governing traffic to the right or a signal governing traffic to the left respectively. The maintainers call-lever 2MCL is a two-position lever normally maintained in its cancel position, which can be operated to a "call" position when it is desired to transmit a maintainers call control to field station No. 2.

Associated with initiating of cycles of operation of the system for the transmission of controls to the various field stations are start buttons SPB, change relays CH, and code determining relays LC, one of each being provided for each field station. A stick relay LCS (see Fig. 2C) is responsive to the picking up of relay LC for any field station, and the picking up of such relay prevents the picking up of other LC relays until the termination of the control cycle which has been initiated. A relay C is responsive to the picking up of a relay LCS for the initiation of the system into a control cycle from a state of rest, and such relay is maintained picked up throughout the cycle. A cancel button CNB is provided as a means for manually cancelling control office starts.

Relays OR, SA, SB and SC (see Fig. 2C) are slow acting relays, the relay OR being an "office rest" relay which is energized during a period of rest and deenergized during a control or indication cycle, and the relays SA, SB and SC being cycle marking relays which are picked up throughout each cycle of operation of the system.

A two-position polar relay F is provided at the control office, such relay having windings for local energization, and for energization by transformer coupling to the line circuit. During an indication cycle, the relay F is operated in response to the "shunt" and "non-shunt" conditions of the line circuit; and during a control cycle, the relay F is positioned by local energization. A relay FA acts as a repeater of relay F during each cycle of operation, such relay being energized during the "on" or "non-shunt" periods of the cycle.

The relay E at the control office is a code transmitter relay for closing and opening the line circuit to create "on" and "off" periods during a control cycle. The relay E has a back point repeater relay EP used in the execution of indications during an indication cycle.

Relays LS and SL (see Fig. 2B) are selectively energized in accordance with the characters of the impulses to be transmitted during the various step periods. The relay LS when energized at the beginning of a step period determines the character of the digits of the step to be a long "on" followed by a short "off," and the relay SL when energized at the beginning of a step determines that the step will be comprised of a short "on" followed by a long "off."

Relays LET, LOT, LED and LOD (see Fig. 2C) are associated with the defining of long "off" and "on" periods during a control cycle and long "shunt" and "non-shunt" periods during an indication cycle. The relays LET and LOT are slow in dropping away for timing the length of the respective even and odd digits, the even digits being "off" periods during a control cycle and "shunt" periods during an indication cycle, and the "odd" digits being "on" periods during a control cycle and "non-shunt" periods during an indication cycle. The relays LED and LOD drop away in response to the dropping away of the respective LET and LOT relays.

As a means for forming the various channels, a stepping relay bank (see Fig. 2B) is provided at the control office, having the number of stepping relays dependent upon the number of different channels required in a manner well-known to those skilled in the art. In this embodiment, six stepping relays V1 through V6 are provided to form 13 channels in combination with a last-step relay LV and a half-step relay VP.

A relay CF (see Fig. 2C) at the control office is responsive to a field station start for the transmission of an indication cycle, and such relay is maintained energized throughout that cycle, thus locking out a control office start of a control cycle, after an indication cycle has been initiated for a predetermined length of time.

Relays R1 through R4, and relay RX (see Fig. 2A) are associated with the registration of each station transmitting during an indication cycle, the response of the relay RX after the other registration relays have been conditioned causes the picking up of a station relay ST for the field station transmitting that indication cycle.

Two-position polar magnetic stick relays TK and GK for each indication station are positioned at the end of each indication cycle transmitted by that station in accordance with the respective conditions of occupancy and conditions of the signals or other devices at that field station as communicated during that cycle of operation. Suitable indicator lamps are controlled by the relays TK and GK, the lamp TE, for example, being shown as controlled by the indication relay TK.

*Field apparatus.*—At each of the field stations, relays F, FA, SA, SB, LOT, LET, LOD, LED, V1 through V6, LV and VP (see Figs. 3A and 3B and Fig. 4) are of the same general character and have the same general functions as relays which have been described having similar letter reference characters as being provided at the control office. Such relays are readily identified, as to the particular field station with which they are associated, by preceding numerals.

Relays CH, CHP and LO are provided at each of the field stations for initiating an indication cycle of operation at that field station. Each of the relays CH is normally energized and is dropped away upon a change in the condition of some device at that field station to be indicated at the control office. Responsive to the dropping away of the relay CH, the relay CHP at that field station is picked up, and the picking up of such relay is effective to cause the picking up of the lock-out relay LO in the process of initiating the transmission of an indication cycle.

The relays EE and EO at each of the field stations serve as code transmitter relays for the transmission of indications. The relay EO in picking up applies a shunt to the line circuit to terminate each odd or "non-shunt" period, and the relay EE when picked up is effective to terminate a "shunt" period. The relays EE and EO at each of the field stations are also used during a control cycle in a manner which will be more readily apparent as the description progresses.

A slow acting relay CD is provided at each of the field stations for use in cycle distribution. That is, the relay CD is effective to allow the transmission of but one indication cycle by that station until a cycle has been transmitted by each other field station having a simultaneous start at the beginning of the series of indication cycles.

Relays SO and SE at each of the field stations are station selecting relays which are picked up at the beginning of a control cycle, and are maintained picked up throughout the cycle to allow the execution of controls transmitted during that cycle, only if the code assigned to that field station corresponds with the code transmitted during that cycle of operation from the control office.

A bank of decoding relays CS (see Fig. 4) is provided at each of the field stations for decoding the control codes transmitted to that field station, one relay being provided for each digit of the control codes.

Relays WN, WR, RGZ, LGZ, B and MC (see Fig. 5) at each of the field stations are application relays which are conditioned upon execution at the end of a control cycle in accordance with the positioning of the decoding relay CS at that field station, for governing devices such as power switches and signals and maintainer's call apparatus at that field station.

*Line circuit.*—With reference to Figs. 1A and 1B, the line circuit used in this embodiment of the present invention comprises the line wires 22 and 28 extending from the control office to the various field stations. The opposite ends of the line wires are indicated as being coupled by suitable transformers 106 and 107 to telephone apparatus. To prevent a direct current shunt of the line circuit through the windings of the transformers, suitable condensers are connected in series with the windings of the transformers such as the condenser 108 at the left-hand end of the line circuit connected between the windings 109 and 110 of the transformer 106.

So far as the use of the line circuit for the C. T. C. system of the present invention is concerned, it is normally energized, so that any field station may initiate the system into operation and transmit indications by shunting and unshunting the line circuit at its location. For the transmission of controls, the line circuit is governed by the control office apparatus in a manner to apply different series of direct current code impulses. The direct current apparatus of the C. T. C. system both at the control office and at the several field stations is connected across the line wires through suitable filter devices which restrict the flow of alternating current into this portion of the system from the telephone communication portion of the line circuit.

With reference to Figs. 1A and 1B, it will be readily seen that direct current pulses may be applied to the line circuit from the control battery CB which will flow over the line wires 22 and 28 to energize the direct current line relays F at the several field stations. For convenience in describing the operation of the system, the application of positive energy to line wire 22 from the line battery CB is said to cause the positive energization of the line circuit, and the application of negative energy to that line wire is said to cause the negative energization of the line circuit.

With reference to Fig. 1A, it will be seen that the primary of the transformer 30 is connected in series with the battery CB across the line wires 22 and 28. Thus, the application of a shunt to the line circuit at any field station causes an increase in the current passing through the primary winding 29 of this transformer. Such increase in current produces a pulse of energy in the secondary winding 356 which actuates the polar relay F in the control office to a particular position, as will be described in detail hereinafter. In series with this impulse transformer 30 is two ballast lamps, that is, lamps which tend to maintain a constant current flow under varying voltage conditions. These lamps are placed in the circuit so as to limit the current flow in the line circuit to the desired control values independent of the location of the shunt applied to the line circuit, as it will be appreciated the various field stations having indications to transmit will be at widely varying distances from the control office. These lamps having thermal characteristics, as above mentioned, do not in any way adversely affect the production of impulses in the secondary winding of the impulse transformer 30 upon application or removal of a shunt of a field station. As a matter of fact, these ballast lamps in maintaining the current within a proper control range tend to minimize the saturation effect on the impulse transformer 30 and thus raise its over-all efficiency of operation in the system of the present invention.

Having thus described the general organization of the apparatus employed in this embodiment of the present invention, further description of the system will be set forth with respect to the mode of operation of the system under certain typical operating conditions.

Operation

The communication system provided by the present invention is normally at rest from which it can be initiated into a cycle of operation for the transmission of controls from the control office to the field stations, or indications from the respective field stations to the control office.

Upon the initiation of the system at the beginning of a cycle, the system enters a conditioning period which is called an "off" period if the control office is transmitting, or a "shunt" period if a field station is transmitting. The conditioning period is short or long dependent upon whether the field or the control office starts the cycle respectively. By the conditioning period being made long by a start at the control office, the control office can overcome a simultaneous field station start so as to allow the control office to maintain control of the line for the transmission of a control cycle.

With reference to the code chart shown in Fig. 6, it will be noted that the codes for a control cycle are made up of step periods which have their respective "on" and "off" periods either long and short respectively or short and long respectively, each step period being characterized in either of those two ways. The first group of step periods or code characters is used for station selection, and the second group of step periods or code characters is used for the communication of controls to the field station selected during the first part of the cycle.

Following the transmission of the last "on" period of a control cycle or "non-shunt" period of an indication cycle, the system enters a clear-out period during which the apparatus at the control office and the various field stations is restored so as to condition the system for the initiation of another cycle of operation. Following the clear-out period, at the end of a cycle of operation, the system enters a period of rest from which it can be initiated into either a control or an indication cycle.

*Normal-at-rest conditions.*—When the system is at rest, the line circuit is maintained energized with a positive polarity to allow any field station to register at the control office the start of an indication cycle by the application of a shunt across the line wires at the field station desiring to initiate such an indication cycle.

At the control office, the office-rest relay OR (see Fig. 2C) is normally energized by a circuit extending from (+), including contact 20 of the line relay F in its right-hand position, winding of relay OR, and back contact 21 of relay SB, to (—). In accordance with the energization of the relay OR, the positive terminal of line battery CB (see Fig. 1A) is connected to the line wire 22 through back contact 23 of relay C, front contact 24 of relay OR, back contact 25 of relay CF, and line filter windings 26 and 27. The negative terminal of the line battery CB is connected to the line wire 28 through winding 29 of the line transformer 30, back contact 31 of relay C, back contact 32 of relay CF, and line filter windings 33 and 34.

The relays F at the respective field stations are responsive to such energization of the line circuit so as to cause their polar contacts to be actuated to right-hand positions. The relay 2F (see Fig. 1B), for example, at field station No. 2 is energized during a period of rest by the closure of a circuit extending from the positive terminal of line battery CB (see Fig. 1A) including back contact 23 of relay C, front contact 24 of relay OR, back contact 25 of relay CF, filter windings 26 and 27, line wire 22, filter windings 35 and 36, back contact 37 of relay 2LO, upper winding of relay 2F, resistor 38, and condenser 39 connected in multiple, lower winding of relay 2F, back contact 40 of relay 2LO, filter windings 41 and 42, return line wire 28, filter windings 34 and 33, back contact 32 of relay CF, back contact 31 of relay C, and winding 29 of transformer 30, to the negative terminal of the line battery CB.

The inclusion in the circuit just described for the relay 2F of the resistance 38 and the condenser 39 in combination improves the power factor of the circuit, and thereby increases the speed of operation of the line relay 2F. The line relay 2F must have a considerable number of ampere-turns in order to operate its contacts, and because of its being desirable to operate the system at a minimum line current value, such relay must have a large number of turns to provide the required number of ampere-turns. The inductance of the windings of the relay 2F is thus relatively high because of so many turns, and such high inductance would ordinarily cause the relay to be slower acting. By the inclusion of the resistor 38 and the condenser 39 in the circuit in the manner described, the power factor of the circuit is improved, and thereby the relay 2F is made quick acting in spite of its high inductance. This external resistance 38 also serves as a means to adapt a standard relay to various line circuit conditions encountered in practice.

During a period of rest, a change relay CH at each of the field stations is maintained picked up by a stick circuit including contacts of all devices to be indicated at the control office. Thus, for example, the relay 2CH (see Fig. 3A) is normally maintained picked up by a stick circuit extending from (+), including front contact 43 of relay RM, front contact 44 of relay LM, front contact 45 of relay ATR, front contact 46 of relay TR, front contact 47 of relay 2CH, and winding of relay 2CH, to (—). It will be noted that this circuit would be closed through back contacts of either or all of the relays TR, ATR, LM or RM if such relays were dropped away, but the shifting of the contacts of either of such relays is effective to momentarily open the stick circuit for the change relay 2CH to cause such relay to be dropped away for the initiation of an indication cycle. It is to be understood that contacts of other devices to be indicated at the control office could be included in the stick circuit of relay 2CH as has been indicated by the dotted line shown for applying energy to the contact 43 of relay RM.

The OS track relay TR at field station No. 2 is normally energized by the usual type of track circuit for the detector track section at the right-hand end of the passing siding A, and the signal-at-stop repeater relays LM and RM are normally energized in accordance with the stop indication displayed by the signals 3A and 3B, and 2A and 2B respectively, in accordance with the usual practice.

At each of the field stations, the field rest relay FR is normally energized, the relay 2FR at field station No. 2, for example, being normally energized by a stick circuit extending from (+), including contact 48 of the line relay 2F in its right-hand position, back contact 49 of relay 2SB, front contact 50 of relay 2FR, and winding of relay 2FR, to (—).

*Manual start.*—The system can be manually initiated into a cycle of operation for the transmission of controls by first positioning the control levers (see Fig. 2A) for the particular field station to which the operator desires to communicate controls and then momentarily actuating the start button SPB for that field station.

Responsive to the actuation of such start button, a change relay CH is picked up for that field station, and the picking up of such relay can be effective to initiate a cycle of operation immediately if the system is at rest, but if the system is in operation, such change relay will store the start which has been initiated until such time as the system is free to transmit the controls that have been selected for transmission.

The relays LC and LCS have their circuits arranged to allow the transmission of control cycles to respective field stations in a predetermined order when a plurality of manual starts has been initiated, a relay LC being provided for each field station, and a single LCS relay being provided at the control office so as to be responsive to the picking up of an LC relay for the beginning of a control cycle, and thereby prevent the picking up of any other LC relays until that cycle of operation has been completed.

To consider more specifically the above described mode of operation, it will be assumed that an operator desires to cause the transmission of a control to field station No. 2 for clearing the signal 2A governing traffic to the right. Under such conditions the lever 2SML is operated to its normal left-hand position, and the signal control lever 2—3SGL is operated to its right-hand position. The operator then depresses the start button 2SPB, and the depression of such button is effective to cause the picking up of the relay CH2 by the energization of a circuit extending from (+), including contact 51 of button 2SPB, closed in its depressed position, winding of relay CH2, and the normally closed contact 52 of the cancel button CNB, to (—).

The picking up of relay CH2 is effective to cause the picking up of the relay LC2, if the system is at rest, by the energization of a circuit extending from (+), including back contact 53 of relay CF (see Fig. 2C), back contact 54 of relay SB, back contact 55 of relay LCS, wire 56, back contact 57 of relay CH3, front contact 58 of relay CH2, lower winding of relay LC2, and normally closed contact 52 of the cancel button CNB, to (—). The picking up of relay LC2 under such conditions closes a stick circuit for its upper winding, and at the same time closes a circuit to cause the picking up of the relay LCS. Such circuit extends from (+), including back contact 59 of relay LV (see Fig. 2B), wire 60, winding of relay LCS, wire 61, front contact 62 of relay LC2, upper winding of relay LC2, and normally closed contact 52 of the cancel button CNB, to (—).

It will be seen from the circuits which have been described for the relays associated with the initiation of a control cycle, that the change relays CH2 and CH3 can be simultaneously energized, but the chain pick-up circuits for the relays LC is so arranged that the relay LC3 is given preference over relay LC2, and thus the picking up of relay CH3 would be effective to open the circuit which has been described for the relay LC2 at back contact 57, to prevent the energization of such relay until the controls have been transmitted to the field station No. 2 with which the relay LC3 is associated.

Upon the picking up of the relay LCS in response to the manual start, a circuit is closed to cause the picking up of the relay C (see Fig. 2C) extending from (+), including front contact 63 of relay LCS, back contact 64 of relay SC, back contact 65 of relay CF, and winding of relay C, to (—). A stick circuit for the relay C is closed upon the picking up of relay SB during the conditioning period of the control cycle to maintain the relay C picked up throughout the transmission of such cycle. Such stick circuit extends from (+), including front contact 66 of relay SB, front contact 67 of relay C, and winding of relay C, to (—).

*Control office conditioning for control cycle.—* The picking up of relay C in response to a manual start of a control cycle at the control office is effective to open the line circuit and initiate a long "off" conditioning period by the opening of back contacts 23 and 31 in the line circuit (see Fig. 1A).

The picking up of the relay C (see Fig. 2C) at the beginning of the conditioning period causes the relay F to be energized with a polarity to operate its polar contacts to their left-hand positions by the energization of a circuit for the lower winding of that relay extending from (+), including front contact 68 of relay C (see Fig. 1A), back contact 69 of relay E, and lower winding of relay F, to (—).

Upon the shifting of the polar contacts of relay F, circuits are closed to cause the picking up of the relays LET and LOT. The circuit by which relay LET (see Fig. 2C) is picked up extends from (+), including contact 70 of relay F in its left-hand position, front contact 71 of relay OR, and winding of relay LET, to (—). The relay LOT is picked up by the energization of an obvious circuit closed at contact 70 of relay F in its left-hand position.

Following the picking up of the relays LET and LOT, the relays SA, SB and SC are successively picked up, relay SA being picked up by the energization of a circuit extending from (+), including front contacts 72 of relay LOT, front contact 73 of relay LET, and winding of relay SA, to (—), and the relays SB and SC being picked up by the closure of obvious circuits at front contacts 111 and 74 of relays SA and SB respectively.

Responsive to the picking up of the relay SA, the relay SL, which is associated with the selection of the character of the step periods, is picked up in a manner and for purposes hereinafter pointed out when considering the characters of step periods selected. The relay EP is also picked up in response to the picking up of the relay SA, such relay being picked up by the energization of a circuit extending from (+), including front contact 75 of relay SA, back contact 76 of relay E, and winding of relay EP, to (—).

The circuit by which the relay OR is normally energized is opened at the beginning of the conditioning period upon the shifting of contact 20 of the relay F away from its right-hand position, and the stick circuit for the relay OR is open at that time at back contact 77 of the relay C, thus causing the relay OR to be dropped away; but because of the slow drop-away characteristics of such relay, it is not dropped away until the relays SA, SB and SC have had time to be picked up.

The dropping away of the relay OR during the conditioning period causes the dropping away of the relay LET by the opening of a circuit which has been described for such relay at front contact 71. The relay LET is slow acting because it is used to time the long "off" periods, so sufficient time is consumed before it drops away to make the conditioning period relatively long during a control cycle as compared to the length of the conditioning period during an indication cycle. Upon the dropping away of the relay LET, a circuit is closed to cause the picking up of the impulsing relay E for the termination of the conditioning period. This circuit will be hereinafter considered when considering specifically the manner in which the relay E is used for the impulsing of the line circuit.

*Characters of step periods selected.—* With reference to the code chart shown in Fig. 6, the control station codes used for station selection during a control cycle, and the switch and signal control codes, are made up of step periods which are characterized by having their "on" and "off" periods either long and short respectively, or short and long respectively. For convenience in the discussion of the codes, these "on" and "off" periods of the steps are termed digits, and each digit may be characterized as being either short or long represented by an "S" or an "L" respectively in the code chart of Fig. 6. For the purpose of providing an inherent check in the codes, the code element or character for each step as a whole is considered as comprising two complementary code digits, that is, one code character or element for a step is a short code digit followed by a long code digit, while the other code character or element for that step is a long code digit followed by a short code digit. With this arrangement of code characters, an improper change in any code digit from a short to a long so deforms the code character for that step that no selection or control is effected, and thus provides a higher degree of reliability in the transmission of controls. By this arrangement, the number of stations that can be selected by station selecting codes is equal to two raised to the power of the number of step periods employed for station selection. Thus, according to the code chart of Fig. 6, for example, the use of three steps for station selection provides a capacity for the selection of any one of eight stations.

The steps following those used for station selection are used for the communication of controls, the fourth step period being used for the control of a power switch. If the step period has its "on" period long and its "off" period short, the control is for the power operation of the track switch to its normal position, but if that step period has its "on" period short and its "off" period long, the control is for the power operation of the track switch to its reverse position.

The fifth and sixth steps in this embodiment of the present invention are used for signal control purposes. If the "on" and "off" periods of the fifth step are respectively long and short, and the "on" and "off" periods of the sixth step period are respectively short and long, the code is for the clearing of a signal governing train movements of a power switch. If the step period has its "on" and "off" periods of the fifth step period are respectively short and long and the "on" and "off" periods of the sixth step are respectively long and short, the code calls for the clearing of a signal for governing traffic to the left, or westbound traffic. If the "on" and "off" periods of the fifth and sixth step are short and long respectively for both steps, the code is for the restoration to stop of a signal at the field station selected by the preceding station selecting code.

Following the step periods used for the control of the track switch and the signals, is an "on" period shown in the code chart as digit No. 13, which is essential in order that the "off" period for the last step of the cycle can be used. The last "on" period provides a channel for the transmission of a control, but inasmuch as there is no "off" period that can be used for code purposes in combination with it, the control transmitted through such channel is not checked against error as the preceding characters of the code are checked. The last "on" period, however, can be used for a control not required to be checked, such as a maintainer's call as provided in this embodiment of the present invention. According to the code chart, if the last "on" period of a control cycle is long, a maintainer's call is transmitted to the field station selected during the first part of the control cycle, and if the last "on" period is short, a control is transmitted for the cancelling of any maintainer's call which may have been initiated during a preceding cycle of operation for the field station being called. Thus, the last "on" period is short during a control cycle, except when the operator at the control office has positioned the maintainer's call lever MCL at the control office for the transmission of a maintainer's call control to that field station, there being a maintainer's call lever MCL at the control office for the transmission of a maintainer's call control to that field station, there being a maintainer's call lever MCL provided on the control panel of the control machine for each field station included in the system.

Figure 2B:
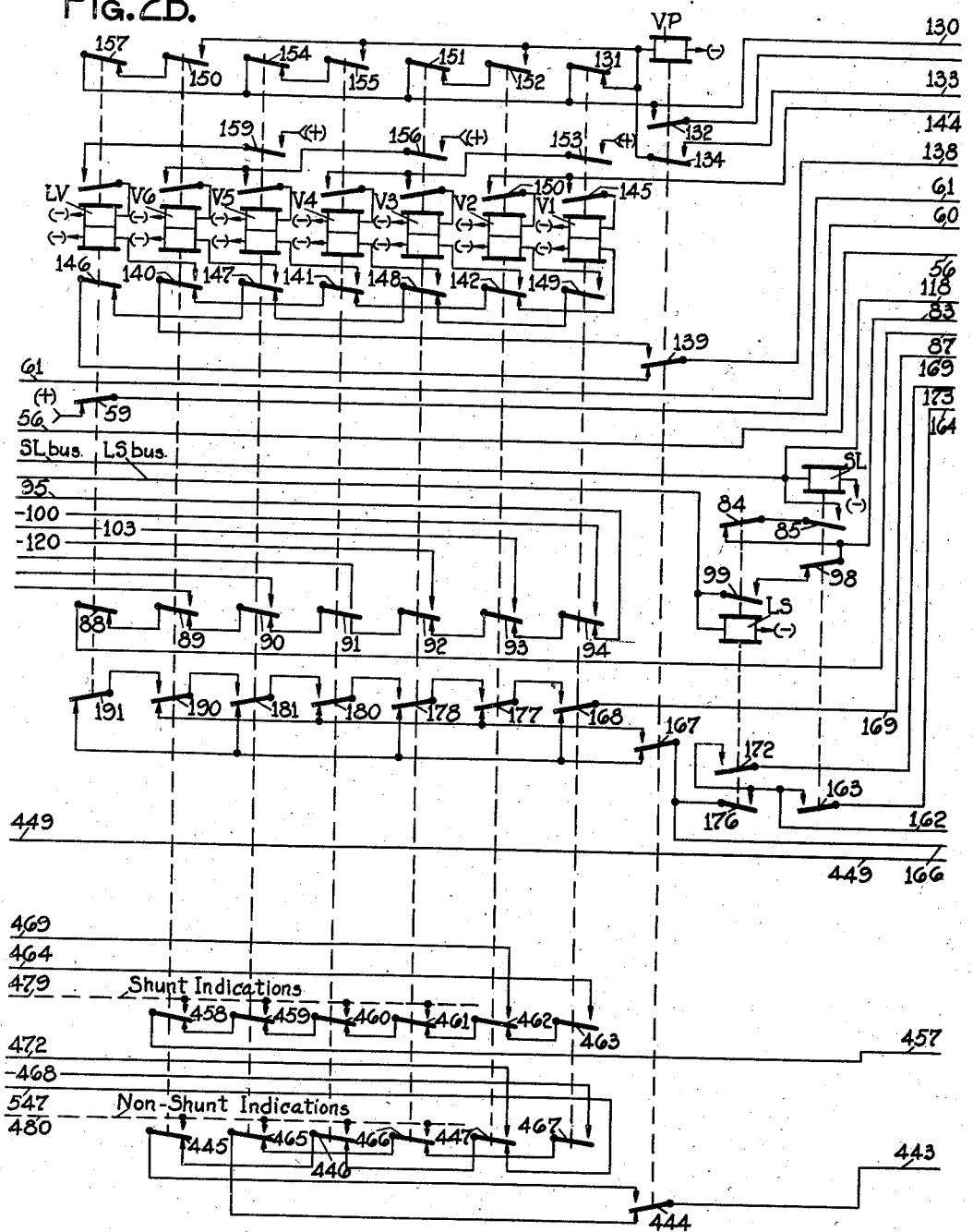

The character of the respective stepping periods during a control cycle as to whether they are to be made up of long "on" periods followed by short "off" periods or short "on" periods followed by long "off" periods is determined by the relays LS and SL (see Fig. 2B). The relay LS is picked up at the beginning of an "on" period if the "on" and "off" periods of that stepping period are to be respectively long and short, while the relay SL is picked up at the beginning of an "on" period if the "on" and "off" periods of that step are to be respectively short and long.

At the beginning of a control cycle of operation, the relay SL is picked up, irrespective of what the character of the first step is to be, because such relay is used to select long "off" periods, and the conditioning period of a control cycle is similar to a long "off" period in that it is of sufficient length to allow the long "off" timing relay LET to be dropped away.

The relay SL is picked up during the conditioning period of a control cycle in response to the picking up of the relay SA by the energization of a circuit extending from (+), including front contact 78 of relay C (see Fig. 2C), front contact 79 of relay OR, front contact 80 of relay SA, wire 118, and winding of relay SL, to (—). A stick circuit is closed upon the picking up of the relay SL to maintain such relay picked up until the character of the first step is selected at the beginning of the first "on" period. Such stick circuit extends from (+), including front contact 81 of relay C, back contact 82 of relay FA, wire 83, back contact 84 of relay LS, front contact 85 of relay SL, and winding of relay SL, to (—). Should the characters of the code to be transmitted require the relay SL to be energized for each step of the cycle, such relay would be maintained continuously picked up throughout that cycle, but when the character of a step changes to a long "on" and a short "off," the relay LS is picked up at the beginning of such "on" period, and the picking up of that relay is effective to cause the release of the relay SL by opening the stick circuit for such relay at back contact 84. This condition will be more fully described as the description of the selection of the characters of the step periods progresses.

Assuming a start to have been initiated for the transmission of a control cycle to field station No. 2, and assuming the relay E to be picked up to terminate the conditioning period, the relay LS is picked up at the beginning of the first "on" period of the cycle to select the first character of the code to correspond with that shown in Fig. 6 for code No. 2 of the code chart.

The circuit by which the relay LS is picked up under such conditions is closed upon the picking up of the relay E and extends from (+), including front contact 81 of relay C (see Fig. 2C), front contact 86 of relay E, wire 87, back contacts 88, 89, 90, 91, 92, 93 and 94 of relays LV, V6, V5, V4, V3, V2 and V1 respectively, wire 95, front contact 96 of relay LC2, code jumper 97, LS bus, and winding of relay LS, (—). The picking up of that relay opens the stick circuit for the relay SL at back contact 84 to cause the relay SL to drop away.

The circuit that has been described for relay LS is maintained closed throughout the "on" period, and an auxiliary circuit is closed by a front contact 82 of relay FA (see Fig. 2C) connected in multiple with front contact 86 of relay E, to hold the relay LS during the shifting of contact 86 of the impulsing relay E at the end of that "on" period.

Upon the dropping away of the impulsing relay E at the end of the first "on" period, a stick circuit is closed for the relay LS extending from (+), including front contact 81 of relay C, back contact 86 of relay E, wire 83, back contact 98 of relay SL, front contact 99 of relay LS, and winding of relay LS, to (—). This stick circuit maintains relay LS picked up throughout the "off" period, and the closure of back contact 82 of relay FA connected in multiple with back contact 86 of relay E during such "off" period is effective to provide stick energy for the relay LS until the beginning of the second "on" period. The dropping away of the relay FA at the beginning of the first "off" period, prior to the picking up of the first stepping relay V1, is effective to remove pick-up energy feeding through the bank of stepping relay contacts, so that the picking up of the first stepping relay V1 subsequent to the dropping away of the relay FA during that "off" period is ineffective to prematurely energize an SL or an LS relay for selecting the character of the "on" and "off" periods of the following stepping period.

At the beginning of the second step period, a pick-up circuit is closed for the relay LS, but such relay is already picked up, because the character of the second step corresponds with the character of the first step. The circuit by which the relay LS is maintained picked up during such second "off" period extends from (+), including front contact 81 of relay C (see Fig. 2C), front contacts 86 and 82 of relays E and FA connected in multiple, wire 87, back contacts 88, 89, 90, 91, 92 and 93 of relays LV, V6, V5, V4, V3 and V2 respectively, front contact 94 of relay V1, wire 100, front contact 101 of relay LC2, code jumper 102, LS bus, and winding of relay LS, to (—). The relay LS is maintained picked up during the second "off" period in a manner similar to that which has been described for maintaining that relay picked up during the first "off" period.

At the beginning of the third "on" period, the character of the step period shifts for the station selecting code under consideration to a short "on" and a long "off," and therefore the relay SL is picked up in response to the picking up of the impulse relay E at the beginning of the third "on" period. The circuit by which relay SL is picked up under such conditions extends from (+), including front contact 81 of relay C (see Fig. 2C), front contact 86 of relay E, wire 87, back contacts 88, 89, 90, 91 and 92 of relays LV, V6, V5, V4 and V3 respectively, front contact 93 of relay V2, wire 105, front contact 104 of relay LC2, code jumper 105, SL bus, and winding of relay SL, to (−). The picking up of relay SL under such conditions causes the dropping away of relay LS by opening its circuit at back contact 98, and the closure of back contact 84 of relay LS in the stick circuit for the relay SL conditions the stick circuit for the relay SL so that such relay may be maintained picked up during the following "off" period. The inclusion of front contact 82 of relay FA in multiple with front contact 86 of relay E in the circuit for relay SL provides for the continued energization of such relay upon the shifting of contact 86 of relay E at the end of the third "off" period, the closure of back contact 86 of relay E at the end of the third "on" period being effective to close a stick circuit which has been described for the relay SL. Back contact 82 of relay FA is connected in multiple with back contact 86 of relay E in that circuit to maintain the stick circuit closed during the beginning of the following "on" period. Having described specifically the manner in which the relays SL and LS are selectively energized in accordance with the characters of a particular station selecting code to be transmitted, it is believed, from the description as it has been set forth, that the manner should be readily apparent in which such relays are conditioned for other codes as predetermined by the code jumpers included in the circuits in association with contacts of LC relays for other field stations.

The relays SL and LS are selectively conditioned during the last part of a control cycle for the selection of control codes in a manner very similar to that which has been described specifically for the conditioning of such relays for the selection of station selecting codes. To consider specifically a typical condition of the selection of control codes for transmission to a field station, it will be assumed that the lever 2SML is operated to its left-hand position for the transmission of a control for the power operation of the switch TS at the field station No. 2 to its normal position, and it will be assumed that the signal control lever 2—3SGL is operated to its right-hand position for the selection of a clear control to be transmitted for a signal governing eastbound traffic at field station No. 2.

It has been described that the relay SL is picked up for the selection of the character of the third step of a control cycle for the selection of field station No. 2, and therefore such relay is picked up at the beginning of the "on" period of the fourth step which is used for the transmission of switch controls. According to the code table, however, the control selected for transmission to operate the power switch to its normal position requires the seventh and eighth digits to be respectively long and short or in other words, requires the energization of the relay LS at the beginning of the "on" period of the fourth step period. Such relay is picked up upon the picking up of the impulsing relay E by the closure of a circuit extending from (+), including front contact 81 of relay C (see Fig. 2C), front contact 86 of relay E, wire 87, back contacts 88, 89, 90 and 91 of relays LV, V6, V5 and V4 respectively, front contact 92 of relay V3, wire 120, front contact 121 of relay LC2, contact 122 of lever 2SML in its left-hand position, LS bus, and winding of relay LS, to (−). The relay LS is maintained picked up throughout the step period in a manner corresponding to that which has been heretofore described and for the energization of that relay during the first step period. It is believed to be readily apparent from the circuit which has been described that the contact 122 of lever 2SML selects as to whether the relay LS or the relay SL is to be energized throughout the fourth step period, and that if the relay selected for energization throughout that period is other than the relay energized during the prior period, its picking up is effective to release the other relay by the opening of its stick circuit.

In a very similar manner to that which has been described for the control of relays SL and LS for selecting the character of the fourth step period, the contacts 123 and 124 of the signal control lever 2—3SGL select which of the two relays is to be maintained energized during the respective fifth and sixth step periods, the circuit for the energization of either such relays during the "on" period of the fifth step being selected through front contact 91 of the stepping relay V4, and the circuit for either of such relays being selected during the sixth step through a circuit including front contact 90 of relay V5.

Relay SL or relay LS is picked up during the last "on" period of the cycle as selected by contact 125 of the maintainer's call lever 2MCL. If such lever is in its right-hand position, the contact 125 of such lever is effective to select the relay LS to be picked up at the beginning of the last "on" period, and if the lever is in its left-hand position, the contact 125 of such lever is effective to select the relay SL to be energized during the last "on" period. If the relay SL is energized during that period, the period will be short, and if relay LS is energized during that period, the period will be long.

It will be obvious from the circuits that have been described for picking up the relays SL and LS that the picking up of the stepping relays successively during the respective "off" periods is effective to open the pick-up circuits closed during the respective preceding "on" periods, so as to cause the pick-up circuits to be closed only through the desired channels. For example, the picking up of relay V1 during the first "off" period opens the circuit by which the relay LS has been picked up during the preceding "on" period and maintains such circuit open until the end of the cycle.

*Operation of stepping relay bank.*—Having considered how the character of the various steps is determined for transmission during a control cycle consideration will now be given to the mode of operation of the stepping relay bank at the control office in response to the transmission of codes during a control cycle.

Generally speaking, the pulsing of the impulsing relay E for the transmission of impulses over the line circuit, causes the line relay F to be energized to operate its polar contacts to a right-hand position during the "on" periods, and causes such relay to operate its polar contacts to left-hand positions during the "off" periods. Thus, each time the relay E picks up to mark the beginning of an "on" period, the center winding of the relay F is energized by a circuit extending from (+), including front contact 68 of relay C (see Fig. 1A), front contact 69 of relay E, and center winding of relay F, to (—). Such energization causes the polar contacts of that relay to be operated to right-hand positions, and the closure of contact 126 of relay F (see Fig. 2C) in its right-hand position after the relay SB has been picked up at the beginning of the cycle causes the relay FA to be picked up by the energization of a circuit extending from (+), including front contact 127 of relay SB, polar contact 126 of relay F, and winding of relay FA, to (—).

When the relay E is dropped away to mark the termination of an "on" period, the circuit that has just been described for the center winding of relay F is opened at front contact 69 (see Fig. 1A) and the closure of back contact 69 of relay E provides a circuit for the energization of the lower winding of relay F with a polarity to operate the polar contacts of such relay to left-hand positions. Such circuit extends from (+), including front contact 68 of relay C, back contact 69 of relay E, and lower winding of relay F, to (—). The opening of polar contact 126 of relay F (see Fig. 2C) in its right-hand position causes the dropping away of relay FA, and thus the relay FA follows the relay F so as to be energized during the "on" periods and de-energized during the "off" periods.

The stepping relay bank is operated in response to the relay FA. The relay VP shifts in its position during each "on" period in response to the picking up of the relay FA, and a stepping relay V is picked up during each "off" period in response to the dropping away of the relay FA.

The relay VP is picked up in response to the picking up of relay FA during the first "on" period by the energization of a circuit extending from (+), including front contact 128 of relay SB, front contact 129 of relay FA, wire 130, back contact 131 of relay V1, and winding of relay VP, to (—). The closure of front contact 132 of relay VP upon the picking up of that relay closes a stick circuit to shunt front contact 129 of relay FA out of the circuit just described to maintain relay VP picked up during the shifting of contact 129 of relay FA in the following "off" period. When relay FA is dropped away under such conditions, another stick circuit is closed for relay VP to maintain such relay energized throughout the "off" period after the stepping relay V1 has been picked up to open the stick circuit including front contact 132 of relay VP at back contact 131 of relay V1. The stick circuit including back contact 129 of relay FA extends from (+), including front contact 128 of relay SB, back contact 129 of relay FA, wire 133, front contact 134 of relay VP, and winding of relay VP, to (—).

Upon the dropping away of the relay FA during the first "on" period, a circuit is closed to cause the picking up of the stepping relay V1. Such circuit extends from (+), including back contact 135 of relay FA, front contact 136 of relay C, front contact 137 of relay SB, wire 138, front contact 139 of relay VP, back contacts 140, 141 and 142 of relays V6, V4 and V2 respectively, and lower winding of relay V1, to (—). The picking up of such relay is effective to close a stick circuit for its upper winding to maintain that relay picked up throughout the cycle. Such stick circuit extends from (+), including front contact 143 of relay SB, wire 144, front contact 145 of relay V1, and upper winding of relay V1, to (—).

Inasmuch as the picking up of the relay V1 during the first "off" period has been effective to open the circuit by which the relay VP was picked up during the first "on" period, the relay VP is dropped away upon the picking up of the relay FA during the second "on" period when its stick circuit is opened at back contact 129, and by the dropping away of such relay a circuit is conditioned by which the stepping relay V2 can be picked up upon the dropping away of the relay FA during the second "off" period. Such circuit extends from (+), including back contact 135 of relay FA, front contact 136 of relay C, front contact 137 of relay SB, wire 138, back contact 139 of relay VP, back contacts 146, 147 and 148 of relays LV, V5 and V3 respectively, front contact 149 of relay V1, and lower winding of relay V2, to (—). The closure of front contact 150 of relay V2 closes a stick circuit for the upper winding of that relay similar to the stick circuit that has been described for maintaining the relay V1 picked up.

The picking up of the relay FA during the third "on" period causes the picking up of the relay VP by the energization of a pick-up circuit extending from (+), including front contact 128 of relay SB, front contact 129 of relay FA, wire 130, back contact 151 of relay V3, front contact 152 of relay V2, and winding of relay VP, to (—). The closure of front contact 132 of the relay VP shunts contact 129 of relay FA out of the circuit just described to maintain the relay VP picked up until the closure of back contact 129 of relay FA during the following "off" period. When relay FA is dropped away during the following "off" period the relay VP is maintained picked up by the energization of the same stick circuit which has been described as being effective during the first "off" period to maintain that relay energized.

Upon the dropping away of the relay FA during the third "off" period, a circuit is closed for the relay V3, extending from (+), including back contact 135 of relay FA, front contact 136 of relay C, front contact 137 of relay SB, wire 138, front contact 139 of relay VP, back contacts 140 and 141 of relays V6 and V4 respectively, front contact 142 of relay V2, and lower winding of relay V3, to (—). The relay V3 is maintained picked up by its stick circuit dependent upon the closure of front contact 153 of relay V1 in an obvious manner. The picking up of relay V3 during the third "off" period is effective to open the circuit by which the relay VP has been picked up during the prior "on" period and thus conditions the relay VP so that it will be dropped away upon the opening of its stick circuit by the picking up of relay FA during the fourth "on" period.

By the dropping away of the relay VP during the fourth "on" period, a circuit is conditioned by which the relay V4 can be picked up upon the dropping away of the relay FA during the fourth "off" period. The circuit by which the relay V4 is picked up during the fourth "off" period extends from (+), including back contact 135 of relay FA, front contact 136 of relay C, front contact 137 of relay SB, wire 138, back contact 139 of relay VP, back contacts 146 and 147 of relays LV and V5 respectively, front contact 148 of relay V3, and lower winding of relay V4, to (—). Relay V4 is maintained picked up by an obvious stick circuit closed at front contact 153 of relay V1.

The relay VP picks up during the fifth "on"

period because of a pick-up circuit conditioned for such relays by the picking up of relay V4 during the preceding "off" period. Such circuit extends from (+), including front contact 128 of relay SB, front contact 129 of relay FA, wire 130, back contact 154 of relay V5, front contact 155 of relay V4, and winding of relay VP, to (—).

The dropping away of the relay FA during the fifth "off" period, with the relay VP picked up, closes a circuit by which the relay V5 is picked up. Such circuit extends from (+), including back contact 135 of relay FA, front contact 136 of relay C, front contact 137 of relay SB, wire 138, front contact 139 of relay VP, back contact 140 of relay V6, front contact 141 of relay V4, and lower winding of relay V5, to (—). The relay V5 is maintained picked up throughout the control cycle by an obvious stick circuit closed at front contact 156 of relay V3 for its upper winding. The picking up of relay V5 during the fifth "off" period opens the circuit by which the relay VP has been picked up by the prior "on" period and thus conditions the relay VP so that it will be dropped away upon the opening of the stick circuit for that relay by the picking up of the relay FA during the sixth "on" period.

The dropping away of the relay FA during the sixth "off" period with the relay VP dropped away, causes the picking up of the relay V6 by the energization of a circuit extending from (+), including back contact 135 of relay FA, front contact 136 of relay C, front contact 137 of relay SB, wire 138, back contact 139 of relay VP, back contact 146 of relay LV, front contact 147 of relay V5, and lower winding of relay V6, to (—). The picking up of relay V6 closes an obvious stick circuit for such relay to maintain it energized throughout the cycle of operation.

During the seventh "on" period (digit 13) the relay VP is picked up upon the picking up of the relay FA by the energization of a circuit extending from (+), including front contact 128 of relay SB, front contact 129 of relay FA, wire 130, back contact 157 of relay LV, front contact 158 of relay V6, and winding of relay VP, to (—), and the picking up of that relay closes a stick circuit at front contact 132 to shunt front contact 129 of relay FA out of the circuit just described.

The picking up of the relay VP during the last "on" period of the control cycle conditions a circuit for the relay LV so that such relay can be picked up upon the dropping away of the relay FA during the following clear-out period. Such circuit extends from (+), including back contact 135 of relay FA, front contact 136 of relay C, front contact 137 of relay SB, wire 138, front contact 139 of relay VP, front contact 140 of relay V6, and lower winding of relay LV, to (—). An obvious stick circuit for the upper winding of relay LV is closed at front contact 159 of relay V5 to maintain such relay picked up until the restoration of the relays of the stepping bank later in the clear-out period.

It will be obvious from the above description that each of the successive steps is taken in a manner similar to that of a preceding step, and therefore it is believed to be readily apparent how other steps can be added as they are required in practice to increase the capacity of the system.

*Impulsing of the line circuit at the control office.*—It has been pointed out how the characters of the step periods are selected by the relays LS and SL during a control cycle, and consideration will now be given to the specific manner in which the impulsing relay E (see Fig. 2C) is controlled in accordance with the characters of the step periods selected.

Relay E is first picked up during a control cycle at the end of the conditioning period for the termination of that period and the initiation of the first "on" period. The relay E is picked up at that time in response to the dropping away of the timing relay LET by the energization of a circuit extending from (+), including front contact 75 of relay SA, front contact 160 of relay C, back contact 161 of relay OR, wire 162, front contact 163 of relay SL, wire 164, back contact 165 of relay LET, wire 166, back contact 167 of relay VP, back contact 168 of relay VI, wire 169, and winding of relay E, to (—).

Each time the relay E is picked up during a control cycle, the line battery CB (see Fig. 1A) is connected across the line wires to impress thereon a period of positive energization. The positive terminal of the line battery is connected to the line wire through front contact 23 of relay C, front contact 170 of relay E, back contact 25 of relay CF, and filter windings 26 and 27 to line wire 22; and the negative terminal of the line battery CB is connected to the line wire 28 through winding 29 of transformer 30, front contact 171 of relay E, back contact 32 of relay CF, and filter windings 33 and 34 to line wire 28. It will be seen from this circuit that the picking up of the relay E to close front contacts 170 and 171 initiates a period of energization of the line circuit, and the dropping away of such relay terminates that period.

Assuming the selection for transmission of code No. 2 of the code chart (see Fig. 6) for the selection of field station No. 2, the relay LS is picked up at the beginning of the first "on" period, and the picking up of such relay establishes a stick circuit for maintaining the relay E picked up until the relay LOT, for timing the long "on" periods, is dropped away. Such stick circuit extends from (+), including front contact 75 of relay SA (see Fig. 2C), front contact 160 of relay C, back contact 161 of relay LS, wire 173, front contact 172 of relay LS, wire 173, front contact 174 of relay LOT, front contact 175 of relay E, and winding of relay E, to (—). It will be noted from the mode of operation of the system for the control of relays LS and SL, that the relay LS is picked up at the beginning of the first "on" period, and the picking up of such relay, by opening the stick circuit for relay SL, causes the relay SL to be dropped away. Therefore, the pick-up circuit, which has been described for the relay E, is opened at front contact 163 at the beginning of the first "on" period by the dropping away of relay SL, but the relay E is maintained picked up throughout such period by the energization of the stick circuit which has been described, such stick circuit being dependent upon the closure of front contact 174 of relay LOT. Inasmuch as the first "on" period must be long in accordance with the energization of the relay LS throughout that period, the relay E is maintained picked up until its stick circuit is opened at front contact 174 by the dropping away of the timing relay LOT. The dropping away of the relay E under such conditions terminates the first "on" period.

Inasmuch as the first "off" period is selected to be short by the energization of the relay LS, the relay E is picked up to terminate such "off" period in response to the closure of a pick-up circuit for that relay by the picking up of the first stepping relay V1. Such circuit extends from (+), including front contact 75 of relay SA, front contact 160 of relay C, back contact 161 of relay OR, wire 162, front contact 176 of relay LS, front contact 167 of relay VP, back contact 177 of relay V2, front contact 168 of relay V1, wire 169, and winding of relay E, to (—). It will be noted that this circuit differs from the circuit which has been described by which the relay E has been picked up at the end of the conditioning period in that the circuit includes front contact 176 of relay LS rather than back contact 165 of relay LET, the timing relay LET being maintained picked up during the first "off" period because of its slow action in combination with the selection of the first "off" period as a short period.

According to the station code for field station No. 2, the relay LS is maintained picked up during the second step, and therefore the relay E is maintained throughout the second "on" period by the stick circuit which has been described for such relay until the dropping away of the timing relay LOT, thus providing that the second impulse is long.

The picking up of the relay E to terminate the second "off" period is effected in response to the picking up of the stepping relay V2, because such "off" period is selected to be short. The circuit by which the relay E is picked up under such conditions extends from (+), including front contact 75 of relay SA, front contact 160 of relay C, back contact 161 of relay OR, wire 162, front contact 176 of relay LS, back contact 167 of relay VP, back contact 178 of relay V3, front contact 177 of relay V2, front contact 168 of relay V1, wire 169, and winding of relay E, to (—).

According to the code assigned to the field station No. 2, the third step has a short "on" period and a long "off" period as selected by the energization of the relay SL at the beginning of such step period. Thus the relay E is maintained picked up during the third "on" period only until the shifting of the relay VP. The stick circuit by which the relay E is maintained picked up under such conditions extends from (+), including front contact 75 of relay SA, front contact 160 of relay C, back contact 161 of relay OR, wire 162, front contact 163 of relay SL, wire 164, front contact 179 of relay E, wire 166, back contact 167 of relay VP, back contact 178 of relay V3, front contact 177 of relay V2, front contact 168 of relay V1, wire 169, and winding of relay E, to (—). It will be noted that the pick-up circuit by which the relay E has been picked up to terminate the preceding long "off" period is opened at the beginning of the third "on" period by the dropping away of the relay LS at front contact 176 after the relay SL is picked up to select the character of the third step period. When the relay VP picks up during the third "on" period, the opening of back contact 167 in the stick circuit just described for the relay E causes such relay to be dropped away to terminate such "on" period.

Inasmuch as the third "off" period is selected to be long, the relay E can be picked up for the termination of the "off" period only after the timing relay LET has dropped away to close back contact 165. This is because the front contact 176 of relay LS, which is used to pick up the relay E to terminate a short "off" period is open during the third step. The circuit by which the relay E is picked up in response to the dropping away of the relay LET extends from (+), including front contact 75 of relay SA, front contact 160 of relay C, back contact 161 of relay OR, wire 162, front contact 163 of relay SL, wire 164, back contact 165 of relay LET, wire 166, front contact 167 of relay VP, back contact 180 of relay V4, front contacts 178, 177 and 168 of relays V3, V2 and V1 respectively, wire 169, and winding of relay E, to (—). The picking up of relay E under such conditions terminates the third "off" period, and thus completes the transmission of the first three steps of the control cycle which are used to select the field station No. 2 for the reception of the controls to be transmitted during the last part of the cycle.

Assuming, for example, that the switch control selected for transmission is for operation of the power switch at field station No. 2 to a normal position, the relay LS is picked up at the beginning of the fourth "on" period to determine that the "on" and "off" periods for the fourth step will be respectively long and short. Inasmuch as the fourth "on" period is to be long, the stick circuit is closed for the relay E including front contacts 172 and 174 of relays LS and LOT respectively, so as to maintain the relay E picked up until the timing relay LOT has dropped away, thus forming a long "on" period.

In response to the picking up of the relay V4 during the fourth "off" period, the relay E is picked up to form a short "off" period by the energization of a circuit extending from (+), including front contact 75 of relay SA (see Fig. 2C), front contact 160 of relay C, back contact 161 of relay OR, wire 162, front contact 176 of relay LS, back contact 167 of relay VP, back contact 181 of relay V5, front contacts 180, 178, 177 and 168 of relays V4, V3, V2 and V1 respectively, wire 169, and winding of relay E, to (—).

Assuming the signal control transmitted during the control cycle to be for clearing a signal governing eastbound traffic, the relay LS is maintained picked up throughout the fifth step period, and thus the relay E is maintained picked up during the fifth "on" period by its stick circuit dependent upon front contact 174 of relay LOT to provide a long "on" period. Upon the picking up of relay V5 during the fifth "off" period, the relay E is picked up to form a short "off" period by the energization of a circuit extending from (+), including front contact 75 of relay SA (see Fig. 2C), front contact 160 of relay C, back contact 161 of relay OR, wire 162, front contact 176 of relay LS, front contact 167 of relay VP, back contact 190 of relay V6, front contacts 181, 180, 178, 177 and 168 of relays V5, V4, V3, V2 and V1 respectively, wire 169, and winding of relay E, to (—).

According to the code for the clearing of a signal governing eastbound traffic, the sixth step period must have short and long "on" and "off" periods respectively. Thus, the relay SL is picked up at the beginning of the sixth "on" period, and the relay LS is dropped away. The picking up of the relay SL provides that the relay E is maintained energized during the sixth "on" period only until the dropping away of the relay VP, by the energization of a circuit extending from (+), including front contact 75 of relay SA (see Fig. 2C), front contact 160 of relay C, back contact 161 of relay OR, wire 162, front contact 163 of relay SL, wire 164, front contact 179 of relay E, wire 166, front contact 167 of relay VP, back contact 190 of relay V6, front contacts 181, 180, 178, 177 and 168 of relays V5, V4, V3, V2 and V1 respectively, wire 169, and winding of relay E, to (—).

Inasmuch as the sixth "off" period must be long for the code under consideration, the relay E can be picked up for the termination of such "off" period only after the dropping away of the timing relay LET. The circuit by which the relay E is picked up at the end of the sixth "off" period extends from (+), including front contact 75 of relay SA (see Fig. 2C), front contact 160 of relay C, back contact 161 of relay OR, wire 162, front contact 163 of relay SL, wire 164, back contact 165 of relay LET, wire 166, back contact 167 of relay VP, back contact 191 of relay LV, front contacts 190, 181, 180, 178, 177 and 168 of relays V6, V5, V4, V3, V2 and V1 respectively, wire 169, and winding of relay E, to (—).

Assuming the maintainer's call lever to be in its normal position for the selection of the last impulse of the control cycle to be short, the relay SL is maintained picked up during such impulse, and thus the relay E is dropped away upon the picking up of relay VP by the opening of its circuit at back contact 167 during that "on" period to cause the impulse transmitted to be short.

*Field station conditioning for control cycle.*— The field stations have their line relays F normally connected across the line wires when the system is at rest, each of such line relays having its polar contacts actuated to a position opposite from the position in which such contacts are spring biased when the relay is deenergized. Inasmuch as the conditioning becomes effective in a similar manner at each of the field stations during a control cycle initiated from a period of rest of the system, the conditioning at field station No. 2 will be considered in detail as typical of the conditions effected at the other field stations of the system during such period.

Upon the removal of energy from the line circuit at the control office by the picking up of the relay C to initiate the conditioning period, the polar contacts of the relay 2F (see Fig. 3A) are actuated to their left-hand positions in which they are spring biased. The shifting of contact 48 to its left-hand position closes pick-up circuits for the relays 2LET and 2LOT. The circuit for relay 2LET extends from (+), including contact 48 of relay 2F in its left-hand position, front contact 192 of relay 2FR and winding of relay 2LET, to (—). The relay 2LOT is picked up by the energization of an obvious circuit closed at contact 48 of relay 2F in its left-hand position.

In accordance with the picking up of the relays 2LET and 2LOT, a circuit is closed to cause the picking up of the relay 2SA extending from (+), including front contact 193 of relay 2LET, front contact 194 of relay 2LOT, and winding of relay 2SA, to (—). The picking up of relay 2SA closes an obvious circuit at front contact 195 to cause the picking up of relay 2SB.

It will be noted that relay 2SA is energized only when both of the relays 2LET and 2LOR are picked up. Inasmuch as relay 2LET is energized only in response to an "on" or "non-shunt" period, and relay 2LOT is energized only in response to an "off" or "shunt" period, an abnormally long "on" or "non-shunt" or "off" or "shunt" period, due to the failure of some part of the code transmitting or receiving apparatus at that field station is effective to cause the dropping away of relay 2SA, and to thereby cause a clear-out condition at that field station. Relay 2SA is sufficiently slow acting to be maintained picked up during the short times in which either relay 2LET or relay 2LOT is dropped away in the normal course of operation of a control or indication cycle.

The relay 2LED is picked up during the conditioning period in response to the picking up of the relay 2LET. The circuit by which such relay is picked up extends from (+), including front contact 196 of relay 2LET, back contact 197 of relay 2EE, wire 198, and winding of relay 2LED, to (—).

The station selecting relays 2SO and 2SE are also picked up during the conditioning period in response to the picking up of the relay 2LET, such relays being picked up prior to the picking up of the relay 2SB. Relay 2SE is picked up under such conditions by the energization of a circuit extending from (+), through front contact 199 of relay 2LET, front contact 200 of relay 2FR, back contact 201 of relay 2SB, and lower winding of relay 2SE, to (—). The relay 2SO is picked up under such conditions by the energization of a circuit for its lower winding extending from (+), including front contact 199 of relay 2LET, front contact 200 of relay 2FR, back contact 202 of relay 2SB, and lower winding of relay 2SO, to (—). Relays 2SO and 2SE are maintained picked up throughout the remainder of the conditioning periods by stick circuits hereinafter considered when considering specifically control station selection.

The relay 2EE is picked up in response to the picking up of relay 2SB by the energization of a circuit extending from (+), including front contact 203 of relay 2SB, wire 204, back contact 205 of relay 2LO, back contact 206 of relay 2FA, wire 207, and winding of relay 2EE, to (—).

The relay 2LOD is also picked up in the conditioning period, in response to the picking up of relay 2SB, by the energization of a circuit extending from (+), including front contact 208 of relay 2SB, front contact 209 of relay 2LOT, front contact 210 of relay 2SE, back contact 211 of relay 2EO, wire 212, and winding of relay 2LOD, to (—).

Although the relay 2FR is deenergized during the conditioning of these relays, because of its slow drop-away characteristics, such relays have sufficient time to be conditioned as described prior to the dropping away of relay 2FR. The stick circuit by which the relay 2FR is normally energized extends from (+), including polar contact 48 of relay 2F in its right-hand position, back contact 49 of relay 2SB, front contact 50 of relay 2FR, and winding of relay 2FR, to (—). The shifting of contact 48 of relay 2F to its left-hand position at the beginning of the conditioning period causes the deenergization of the relay 2FR, and after such relay has been dropped away, it remains dropped away until the system enters a period of rest at the end of that cycle of operation. The dropping away of relay 2FR during the conditioning period causes the picking up of the relay 2CD by the energization of an obvious circuit closed at back contact 213, and the relay 2CD, when picked up, is maintained energized by that circuit throughout the remainder of the cycle.

The dropping away of the relay 2FR is effective to cause the dropping away of the timing relay 2LET by the opening of the circuit for such relay at front contact 192. The dropping away of relay 2LET causes the dropping away of the relay 2LED by opening the circuit for such relay at front contact 196, thus completing the conditioning of the relays at field station No. 2 during a control cycle.

*Stepping at the field stations.*—Having described in detail the mode of operation of the stepping relay bank at the control office, such description is to be considered as typical of the mode of operation of the stepping relay banks at the field stations. The stepping at the field stations differs in some respects, however, in that it is rendered active during a control cycle only so long as the relays SO and SE at such field station remain picked up, and is rendered active during an indication cycle only so long as the relay LO at that field station is maintained picked up. The mode of operation of each of the field station stepping relay banks is similar to the mode of operation of the control office stepping relay bank which has been described in detail in that the relay VP shifts during each "on" period (starting with the picking up of that relay during the first "on" period), and a stepping relay V is picked up during each "off" period of the cycle, starting with the picking up of a relay V1, during the first "off" period. The operation of the stepping relay bank at each of the field stations, both in the shifting of the relay VP and the picking up of the stepping relays, is responsive to the relay FA at that field station, similar to the manner in which the stepping relay bank at the control office is responsive to a similar relay FA.

More specifically, the relay 2FA at field station No. 2 is picked up during each "on" or "non-shunt" period in response to the operation of the polar contact 214 of relay 2F to its right-hand position during either a respective control or indication cycle. The circuit by which the relay 2FA is energized under such conditions extends from (+), including contact 214 of relay 2F in its right-hand position, front contact 215 of relay 2SA, wire 216, and winding of relay 2FA, to (−). It will be obvious that the shifting of polar contact 214 of relay 2F at the end of each "on" or "non-shunt" period is effective to cause the dropping away of the relay 2FA.

Energy for the control of the relay 2VP, for example, at field station No. 2 is applied to the circuit of such relay at front contact 217 of relay 2SB (see Fig. 4), and energy for the pick-up circuits of the stepping relays at the field station No. 2 during a control cycle is applied to contact 218 of relay 2VP through front contact 219 of relay 2SB, front contact 220 of relay 2SO, front contact 221 of relay 2SE, and back contact 222 of relay 2FA. Energy is supplied to contact 218 of relay 2VP during an indication cycle from (+), including front contact 219 of relay 2SB, front contact 223 of relay 2LO, and back contact 222 of relay 2FA. It is believed to be readily obvious, from the description as it has been set forth in detail with respect to the mode of operation of the stepping relay bank in the control office, how the application of energy to contact 218 of relay 2VP during each "off" period of either a control or an indication cycle is effective to cause the picking up of the stepping relays, one stepping relay being picked up during each "off" or "shunt" period of the cycle, dependent upon the continued energization of the relays 2SO and 2SE during a control cycle, and the energization of the relay 2LO during an indication cycle.

*Timing of digits in the field.*—The code receiving apparatus at the respective field stations is not unlike that at the control office in that timing relays LOT and LET are provided for measuring the length of the respective digit periods of both control and indication cycles. Such relays are quick to pick up, but have drop-away characteristics sufficiently slow to measure long "on" and "off" periods and long "shunt" and "non-shunt" periods as distinguished from short "on" and "off" periods and short "shunt" and "non-shunt" periods. To consider the mode of operation of the timing relays, consideration will be given more specifically to the mode of operation of the timing relays at field station No. 2 as typical of the mode of operation of similar relays at the other field stations.

It has been pointed out that the relays 2LOT and 2LET are both picked up during the conditioning period of a control cycle, but the relay 2LET is dropped away during such conditioning period because of the opening of its circuit by the deenergization of relay 2FR. Upon considering the circuit for relay 2LED, it will be noted that such relay can be energized only in accordance with the closure of front contact 196 of relay 2LET, thus providing that the dropping away of relay 2LET during the conditioning period, or during any "off" period of the cycle, is effective to cause the dropping away of the relatively quick acting relay 2LED. The relay 2LED is used for code correspondence selection for station selection during the "off" periods in a manner to be hereinafter more fully described when considering station selection. If the conditioning period is short (as in an indication cycle), and if the respective "off" or "shunt" periods are short, the relay 2LET does not have time to be dropped away, although it has been deenergized, and therefore is effective to maintain its repeater relay 2LED picked up.

The relay 2LOT has a similar mode of operation except that it is used in timing the "on" or "non-shunt" periods, such relay being deenergized during each period, but having sufficient time to be dropped away only if the period is made long. The relatively quick acting relay 2LOD is energized only when the relay 2LOT is picked up to close front contact 209, and therefore such relay is dropped away each time the relay 2LOT is dropped away during a long "on" or "non-shunt" period.

To consider more specifically the mode of operation of the relay 2LET during a control cycle, it will be assumed that a control code is transmitted for field station No. 2 in a manner which has been specifically described. The relay 2LET is deenergized upon the dropping away of the relay 2FR during the conditioning period of that cycle of operation by the opening of its circuit at front contact 192, and the dropping away of such relay causes the dropping away of the relay 2LED by the opening of front contact 196.

During the first "on" period, the relay 2LET is picked up, in response to the energization of the relay 2F with a polarity to operate its polar contact to its right-hand position, by the energization of a circuit extending from (+), including polar contact 48 of relay 2F in its right-hand position, front contact 49 of relay 2SB, and winding of relay 2LET, to (−). The relay 2LET is picked up during each of the other "on" periods of the cycle by the energization of that circuit, if it has been dropped away during the preceding "off" period.

The relay 2LED is not picked up immediately upon the picking up of the relay 2LET, but its picking up is delayed until the picking up of the relay 2EE during that "on" period. Such delay is provided in order to form a period during the reception of controls during which decoding relays can be energized in a manner to be hereinafter described. The relay 2LED is picked up in response to the dropping away of the relay 2EE during the first "on" period by the energization of a circuit extending from (+), including front contact 196 of relay 2LET, back contact 197 of relay 2EE, wire 198, and winding of relay 2LED, to (—). The picking up of such relay closes a stick circuit at front contact 224 to shunt back contact 197 of relay 2EE out of the circuit just described, thus providing that the relay 2LED is maintained energized in accordance with the closure of front contact 196 of relay 2LET.

Inasmuch as the first "off" period is short, according to the code assumed to be transmitted, the relay 2LET does not have time to drop away during that period although it is deenergized at the beginning of such period by the shifting of contact 48 of relay 2F. The shifting of polar contact 48 of relay 2F to its right-hand position at the beginning of the second "on" period is effective to maintain the relay 2LET energized throughout that period, and until the relay 2F shifts its polar contact to its left-hand position at the beginning of the next "off" period. Inasmuch as the second "off" period is also short during the control cycle under consideration, the relay 2LET does not have time to drop away during that period, and such relay is maintained picked up during the third "on" period by the shifting of polar contact 48 of relay 2F to its right-hand position.

According to the code assigned to field station No. 2, the third "off" period is long, and therefore the relay 2LET has time to be dropped away after its circuit is opened during that period by the shifting of polar contact 48 of relay 2F to its left-hand position. The relay 2LED is dropped away by the opening of front contact 196 of relay 2LET during such "off" period, and the dropping away of such relay is effective by the closure of back contact 225 to affect the station selecting circuits in a manner to be hereinafter described.

It is to be understood that the conditions described concerning the mode of operation of the relays 2LET and 2LED during specific "on" and "off" periods is typical of the mode of operation of such relays during similar periods throughout the remainder of the cycle, such periods being used for the communication of controls from the control office to field station No. 2.

The mode of operation of the relays 2LOT and 2LOD during the respective "on" periods of a control cycle to measure such periods is very similar to the mode of operation of the relays 2LET and 2LED during the "off" periods. The relay 2LOT is energized by an obvious circuit whenever the relay 2F is deenergized (or is energized with a negative polarity), and therefore the relay 2LOT is maintained picked up during the conditioning period.

The shifting of contact 48 of relay 2F to its right-hand position at the beginning of the first "on" period is effective to open the circuit for the relay 2LOT in an obvious manner, and (during the transmission of the typical control cycle under consideration) the first "on" period is long, so the relay 2LOT has time to be dropped away, and by its dropping away to cause the dropping away of the relay 2LOD by opening the circuit for such relay at front contact 209.

During the first "off" period, the relay 2LOT is picked up by the closure of its circuit upon the shifting of polar contact 48 of relay 2F to its left-hand position, but the relay 2LOD is picked up only after the dropping away of the relay 2EO during that period. The circuit by which the relay 2LOD is picked up under such conditions extends from (+), including front contact 208 of relay 2SB, front contact 209 of relay 2LOT, front contact 210 of relay 2SE, back contact 211 of relay 2EO, wire 212, and winding of relay 2LOD, to (—). The picking up of such relay is effective to close a stick circuit at front contact 226 to shunt back contacts 210 and 211 of relays 2SE and 2EO out of the circuit just described so as to maintain the relay 2LOD picked up, dependent upon the front contact 209 of relay 2LOT.

Inasmuch as the second "on" period of the typical control cycle is also long, the relays 2LOT and 2LOD are dropped away during such period, and such relays are restored during the following "off" period, in a manner corresponding to that which has been described with respect to the mode of operation of such relays during the first "on" and first "off" periods of the cycle.

The third "on" period of the code transmitted is short, so the relay 2LOT does not have time to be dropped away during that period, although its circuit is opened at the beginning of that period by the shifting of polar contact 48 of relay 2F to its left-hand position. Inasmuch as the relay 2LOT does not have time to drop away during such short "on" period, the relay 2LOD is maintained picked up in accordance with the closure of front contact 209 of relay 2LOT.

It is to be understood that the description as it has been specifically set forth with respect to the control of the relays 2LOT and 2LOD to measure the length of certain "on" periods is typical of the mode of operation of such relays during corresponding periods for the remainder of the cycle used in the communication of controls from the control office to field station No. 2.

During an indication cycle the mode of operation of the relays 2LOT, 2LOD, 2LET and 2LED is similar in most respects to that which has been described as being effective during a control cycle. Inasmuch as the conditioning period of an indication cycle is short, the relay 2LET does not have time to drop away during such conditioning period, although its circuit is opened by the dropping away of relay 2FR as has been described as being effective during the conditioning period of a control cycle. The relays 2LOD and 2LED pick up at different times in an indication cycle than during a control cycle, because the picking up of the relay 2LO at the beginning of an indication cycle is effective to make such relays direct repeaters of the relays 2LOT and 2LET respectively. That is, the relay 2LED is picked up immediately in response to the picking up of the relay 2LET during an "on" period by the energization of a circuit extending from (+), including front contact 196 of relay 2LET, wire 227, front contact 228 of relay 2LO, and winding of relay 2LED, to (—). The relay 2LOD is picked up in response to the picking up of the relay 2LOT during an "off" period of an indication cycle by the energization of a circuit extending from (+), including front contact 208 of relay 2SB, front contact 209 of relay 2LOT, wire 229, front contact 230 of relay 2LO, and winding of relay 2LOD to (—).

Figure 3B:
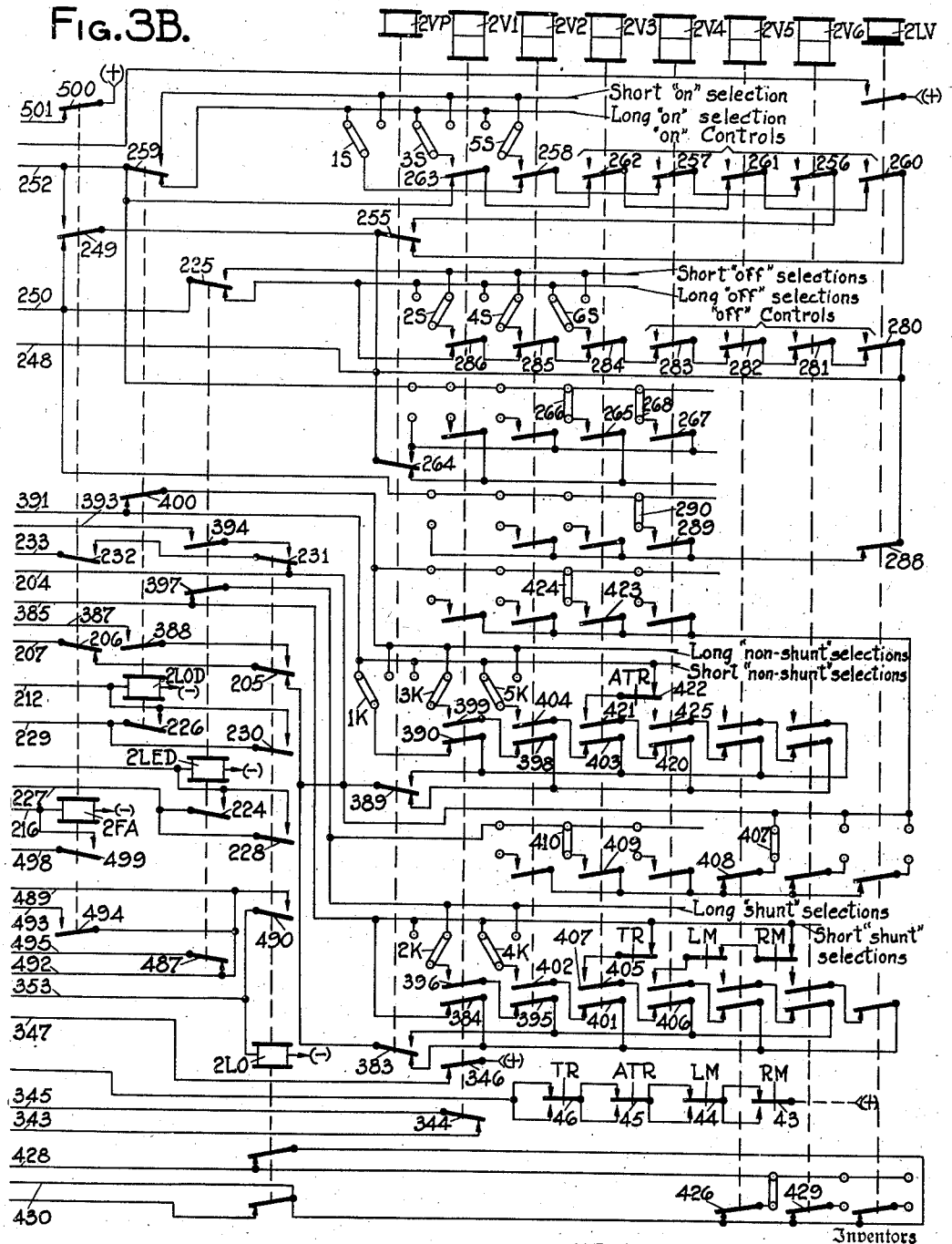

*Station selection for controls.*—It has been pointed out, and it will be obvious upon considering the line circuit of Figs. 1A and 1B, that the impulses are received at all of the field stations during a control cycle, because the field station line relays are connected in multiple across the line wires at all stations during a control cycle. Because the line circuit is energized with a positive polarity for the transmission of impulses during a control cycle, the line relays F at the respective field stations operate their polar contacts to their right-hand position in response to line circuit energization. For convenience in describing the mode of operation of the station selecting means provided by this invention, consideration will be given more specifically to the mode of operation of the typical field station No. 2. The field station No. 2, having its control apparatus illustrated in Figs. 3A and 3B, is assumed to be the second field station from the control office and assumed to be assigned code No. 2 of the code chart (see Fig. 6) as a station selection code. It is to be understood that this code is arbitrarily assigned to field station No. 2, and that any one of the particular station selecting codes shown in the code chart could as well be assigned to that station.

With reference to Fig. 3A, the relays 2SO and 2SE are used for station selection, both of such relays being picked up during the conditioning period in response to the picking up of the relays 2LET and 2LOT in a manner which has been described. After such relays are picked up at the beginning of a control cycle, they are maintained picked up by various stick circuits through the respective periods of the cycle only so long as the code characters received at that field station for station selection correspond to the code characters assigned to such field station.

The relay 2SO is effective, during each "off" period following an "on" period used for station selection, to check the character of such "on" period in correspondence with the character assigned to that field station for that period, and the relay 2SE checks, during each "on" period, the character of the preceding "off" period used for station selection in correspondence with the character of such period assigned to that field station. The dropping away of either the relay 2SO or the relay 2SE, because of non-correspondence of a character assigned to field station No. 2 with the character transmitted over the line circuit, causes the dropping away of the other of such station selecting relays. Such relays when dropped away during a control cycle remain de-energized throughout the remainder of that cycle because they can be picked up only when the field-rest relay 2FR is energized during the conditioning period. It has been pointed out that the operation of the stepping relay bank is effective during a control cycle only in accordance with the energization of the relays 2SO and 2SE, and thus the dropping away of such relays renders the stepping incomplete during the control cycle, and it will be apparent as the description progresses that the completion of the stepping is essential to the execution of controls at the end of the control cycle of operation.

Before considering specifically the stick circuits used in the control of the relays 2SO and 2SE, it is believed expedient to consider the control of the impulsing relays 2EO and 2EE during a control cycle, as the relays 2SO and 2SE are at times responsive to such relays. Although the relays 2EO and 2EE are primarily code transmitter relays used during an indication cycle for the respective shunting and unshunting of the line circuit, such relays are also used during a control cycle in connection with the control of the relays 2SO and 2SE during the station selecting part of the cycle, and in connection with the control of decoding relays CS during the reception of controls.

The relays 2EO and 2EE are picked up in response to the shifting of relay 2FA, the relay 2EO being picked up in response to the picking up of relay 2FA during each "on" period, and the relay 2EE being picked up in response to the dropping away of relay 2FA during each "off" period. The circuit by which the relay 2EO is picked up during each "on" period extends from (+), including front contact 203 of relay 2SB, wire 204, back contact 231 of relay 2LO, front contact 232 of relay 2FA, wire 233, and winding of relay 2EO, to (—). The circuit by which the relay 2EE is picked up during each "off" period extends from (+), including front contact 203 of relay 2SB, wire 204, back contact 205 of relay 2LO, back contact 206 of relay 2FA, wire 207, and winding of relay 2EE, to (—). Although the relays 2EO and 2EE respond in picking up to the shifting of relay 2FA, each of such relays has a stick circuit by which it is maintained energized until the picking up of the other of such relays. Thus, the relay 2EO when picked up is maintained energized by a stick circuit extending from (+), including front contact 234 of relay 2SB, front contact 235 of relay 2EO, back contact 236 of relay 2EE, and winding of relay 2EO, to (—); and similarly, the relay 2EE is energized when once picked up by a stick circuit extending from (+), including front contact 203 of relay 2SB, front contact 237 of relay 2EE, front contact 238 of relay 2SO, back contact 239 of relay 2EO, and winding of relay 2EE, to (—). From these stick circuits it will be readily apparent that the relay 2EE is dropped away during each "on" period in response to the picking up of the relay 2EO to open its stick circuit at back contact 239; and the relay 2EO is dropped away during each "off" period because of the opening of its stick circuit at back contact 236 by the picking up of the relay 2EE.

To consider specifically the stick circuits by which the relays 2SO and 2SE are maintained picked up during a control cycle, it will be assumed that a code is transmitted during a control cycle in the manner which has been described for field station No. 2 in accordance with the energization of the relay LC2 (see Fig. 2A) at the control office, such cycle including station selecting code No. 2 shown in the code chart of Fig. 6.

During the conditioning period of such cycle of operation at field station No. 2, the relays 2SO and 2SE (see Fig. 3A) are picked up by the energization of circuits for the lower windings of such relays in a manner which has been described when considering specifically the conditioning at the field stations, and stick circuits are closed for those relays to maintain them picked up subsequent to the dropping away of the relay 2FR, and the opening of the pick-up circuits for such relays at front contact 200. The stick circuit by which the relay 2SO is maintained picked up throughout the remainder of the conditioning period extends from (+), including front contacts 240 and 241 of relays 2SA and 2SB respectively connected in multiple, front contact 242 of relay 2SO, front contact 243 of relay 2SE, front contact 244 of relay 2LOT, front contact 245 of relay 2EE, back contact 246 of relay 2EO, front contact 247 of relay 2SO, and upper winding of relay 2SO, to (—). The stick circuit by which the relay 2SE is maintained picked up during the remainder of the conditioning period extends from (+), including contacts 240 and 241 of relays 2SA and 2SB respectively connected in multiple, front contact 242 of relay 2SO, front contact 243 of relay 2SE, front contact 244 of relay 2LOT, front contact 245 of relay 2EE, wire 248, back contact 249 of relay 2FA, wire 250, front contact 251 of relay 2SE, and upper winding of relay 2SE, to (—).

Assuming the transmission of a control station code for station No. 2, the relay 2SO is maintained picked up, subsequent to the dropping away of the relay 2FR in the conditioning period, by the energization of a circuit extending from (+), including front contacts 240 and 241 of relays 2SA and 2SB respectively connected in multiple, front contact 242 of relay 2SO, front contact 243 of relay 2SE, front contact 244 of relay 2LOT, front contact 245 of relay 2EE, back contact 246 of relay 2EO, front contact 24 of relay 2SO, and upper winding of relay 2SO, to (—). The relay 2SO is maintained picked up by this circuit until the circuit is opened by the picking up of the relay 2EO at back contact 246 during the first "on" period. Subsequent to the picking up of the relay 2EO during the first "on" period, however, the relay 2FA has picked up, and the picking up of relay 2FA is effective to close another stick circuit for the relay 2SO. Such circuit extends from (+), including front contacts 240 and 241 of relays 2SA and 2SB respectively connected in multiple, front contact 242 of relay 2SO, front contact 243 of relay 2SE, front contact 244 of relay 2LOT, front contact 245 of relay 2EE, wire 248, front contact 249 of relay 2FA, wire 252, front contact 247 of relay 2SO, and upper winding of relay 2SO, to (—). This circuit is maintained closed during the first "on" period until it is opened by the dropping away of relay 2EE at front contact 245; but the picking up of relay 2EO prior to the dropping away of relay 2EE under such conditions is effective to close another stick circuit for the relay 2SO extending from (+), including front contacts 240 and 241 of relays 2SA and 2SB respectively connected in multiple, front contact 242 of relay 2SO, front contact 243 of relay 2SE, front contact 253 of relay 2EO, front contact 254 of relay 2LET, wire 248, front contact 249 of relay 2FA, wire 252, front contact 247 of relay 2SO, and upper winding of relay 2SO, to (—). This stick circuit is maintained closed until the dropping away of the relay 2FA during the following "off" period. It will be noted from the stick circuits just described for the relay 2SO that the stick circuits described do not include code jumper selections as the energization of the relay 2SO in accordance with such selections is provided only during the "off" periods. It will be noted, however, that the stick circuits employed in the energization of the relay 2SO during the first "on" period are such as to check the operation of the relays 2EO and 2LET and 2EE and 2LOT in a manner which will be more readily apparent as the description progresses. It is believed sufficient to say at this time that the operation of such relays is checked in such a manner that upon the failure of either of such relays to be picked up as required for proper operation of the system, the relay 2SO will be dropped away to render that field station non-responsive to the codes transmitted during that cycle of operation.

The last stick circuit described for the relay 2SO maintains such relay picked up until the circuit is opened by the dropping away of the relay 2FA at back contact 249 during the first "off" period. The opening of that circuit causes the relay 2SO to be maintained picked up only by a stick circuit including code jumper 1S, and such jumper must select a code character corresponding to that which has been transmitted from the control office during the preceding "on" period. For the specific condition under consideration, it has been assumed that the first "on" period is long, and therefore, inasmuch as field station No. 2 requires the first "on" period to be long by the position of code jumper 1S, the relay 2SO is maintained picked up during the selection period subsequent to the dropping away of the relay 2FA in the first "off" period by a stick circuit extending from (+), including front contacts 240 and 241 of relays 2SA and 2SB respectively connected in multiple, front contact 242 of relay 2SO, front contact 243 of relay 2SE, front contact 253 of relay 2EO, front contact 254 of relay 2LET, wire 248, front contact 255 of relay 2VP, back contacts 256, 257 and 258 of relays 2V6, 2V4 and 2V2 respectively, jumper 1S, back contact 259 of relay 2LOD, wire 252, front contact 247 of relay 2SO, and upper winding of relay 2SO, to (—). It will be noted that this circuit includes a back contact 259 of relay 2LOD, and thus, in order to be closed, requires that the preceding "on" period must have been long. Should such period have been short, the relay 2SO would have been dropped away at field station No. 2, and the dropping away of such relay would have caused the dropping away of the relay 2SE by the opening of the circuit for such relay at front contact 242. It will be noted that the picking up of the relay 2EE during the first "off" period, with the relay 2LOT picked up at that time, closes a circuit portion in the stick circuit just described including front contacts 244 and 245 of relays 2LOT and 2EE respectively connected in series to shunt the series combination including front contacts 253 and 254 of relays 2EO and 2LET respectively out of the stick circuit just described. The selection circuit just described, however, is effective only until the relay 2EO is dropped away. The dropping away of the relay 2EO closes a stick circuit by which the relay 2SO is maintained picked up for the remainder of the first "off" period. Such stick circuit extends from (+), including front contacts 240 and 241 of relays 2SA and 2SB respectively connected in multiple, front contact 242 of relay 2SO, front contact 243 of relay 2SE, front contact 244 of relay 2LOT, front contact 245 of relay 2EE, back contact 246 of relay 2EO, front contact 247 of relay 2SO, and upper winding of relay 2SO, to (—). The stick circuit just described will be identified as being identical to the stick circuit by which the relay 2SO is maintained picked up at the end of the conditioning period and during the beginning of the first "on" period.

Inasmuch as the characters of the "off" and "on" periods forming the second step of a control cycle for field station No. 2 are identical to those transmitted for the first step of that cycle of operation, it will be readily apparent that the relay 2SO is maintained picked up during the second step in a manner similar to that which has been described as being effective during the first step of the cycle. During the second "off" period, the selection circuit for the relay 2SO extends from (+), including front contacts 240 and 241 of relays 2SA and 2SB respectively connected in multiple, front contact 242 of relay 2SO, front contact 243 of relay 2SE, front contact 253 of relay 2EO, front contact 254 of relay 2LET, wire 248, back contact 255 of relay 2VP, back contacts 260, 261 and 262 of relays 2LV, 2V5 and 2V3 respectively, front contact 263 of relay 2V1, code jumper 3S, back contact 259 of relay 2LOD, wire 252, front contact 247 of relay 2SO, and upper winding of relay 2SO, to (—). After the relay 2EE has been picked up during the second "off" period, energy is applied to the circuit just described from front contact 243 of relay 2SE including front contacts 244 and 245 of relays 2LOT and 2EE respectively, rather than including front contacts 253 and 254 of relays 2EO and 2LET respectively.

According to the station code assigned to field station No. 2, the third step comprises a short "on" period followed by a long "off" period. The relay 2SO is maintained picked up during the third "on" period of the cycle by the energization of stick circuits specifically described as being energized during the first "on" period, and the stick circuits by which the relay 2SO is maintained picked up during the third "off" period correspond to those described specifically for the energization of the relay 2SO during the first "off" period except for the selection circuit which is rendered effective by the dropping away of the relay 2FA during the third "off" period. Such selection circuit as initially closed extends from (+), including front contacts 240 and 241 of relays 2SA and 2SB respectively connected in multiple, front contact 242 of relay 2SO, front contact 243 of relay 2SE, front contact 253 of relay 2EO, front contact 254 of relay 2LET, wire 248, front contact 255 of relay 2VP, back contacts 256 and 257 of relays 2V6 and 2V4 respectively, front contact 258 of relay 2V2, code jumper 5S, front contact 259 of relay 2LOD, wire 252, front contact 247 of relay 2SO, and upper winding of relay 2SO, to (—). It will be noted from this circuit that the selection calls for the preceding "on" period to be short, and therefore includes a front contact 259 of the relay 2LOD. If the preceding "on" period were long, the relay 2LOD would have been dropped away during such period, and thus the selection circuit for the relay 2SO would be open during the following "off" period to cause that relay to be dropped away, thus rendering that field station non-responsive to control codes transmitted during that cycle of operation. As has been described with respect to preceding "off" periods, the picking up of relay 2EE during such period, in combination with the relay 2LOT which is picked up at that time, is effective to shunt contacts 253 and 254 of relays 2EO and 2LET respectively out of the circuit which has just been described.

The three steps used for station selection in this embodiment of the present invention having been taken during a control cycle, the relay 2SO is maintained picked up during the selection period of each of the following "off" periods by a permanent stick circuit, the relay 2SO being at other times maintained picked up during the following steps by stick circuits corresponding to those which have been described as being effective during preceding steps. The relay 2SO is maintained picked up during the selection period of each of the "off" periods following station selection, when the relay 2VP is deenergized during such "off" period, by the energization of a circuit extending from (+), including front contacts 240 and 241 of relays 2SA and 2SB respectively connected in multiple, front contact 242 of relay 2SO, front contact 243 of relay 2SE, front contact 253 of relay 2EO, front contact 254 of relay 2LET, wire 248, back contact 264 of relay 2VP, front contact 265 of relay 2V3, jumper 266, wire 252, front contact 247 of relay 2SO, and upper winding of relay 2SO, to (—). The contacts 253 and 254 of relays 2EO and 2LET respectively are shunted out of the circuit by front contacts 244 and 245 of relays 2LOT and 2EE respectively upon the picking up of relay 2EE during that "off" period. During the "off" periods in which the relay 2VP is picked up, a permanent stick circuit is closed for the relay 2SO during the period ordinarily used for station selection extending from (+), including front contacts 240 and 241 of relays 2SA and 2SB respectively connected in multiple, front contact 242 of relay 2SO, front contact 243 of relay 2SE, front contact 253 of relay 2EO, front contact 254 of relay 2LET, wire 248, front contact 264 of relay 2VP, front contact 267 of relay 2V4, jumper 268, wire 252, front contact 247 of relay 2SO, and upper winding of relay 2SO, to (—).

Inasmuch as the clear-out period is a period of deenergization, it will be readily obvious that the relay 2SO is maintained picked up during the clear-out period in a manner similar to that employed for maintaining such relay picked up during each of the "off" periods of the control portion of a control cycle, until the dropping away of the relay 2SB. The dropping away of the relay 2SB subsequent to the dropping away of the relay 2SA causes the dropping away of the relay 2SO by removing energy from the stick circuits for such relay at front contact 241.

The relay 2SE is controlled in a manner similar in some respects to the relay 2SO, but the relay 2SE is maintained energized or dropped away in accordance with the respective correspondence or non-correspondence condition of the code characters applied during the "off" periods. That is, the relay 2SE is dropped away during any "on" period following an "off" period in which the character of the code transmitted does not correspond with the character assigned to field station No. 2. The relay 2SE is maintained picked up by stick circuits during the "off" periods of a control cycle which have no bearing upon station selection, but which include contacts for checking the operation of certain of the relays.

Assuming the transmission of a control code for station No. 2, the relay 2SE is maintained picked up subsequent to the dropping away of relay 2FR in the conditioning period by the energization of a stick circuit extending from (+), including front contacts 240 and 241 respectively, of relays 2SA and 2SB connected in multiple, front contact 242 of relay 2SO, front contact 243 of relay 2SE, front contact 244 of relay 2LOT, front contact 245 of relay 2EE, wire 248, back contact 249 of relay 2FA, wire 250, front contact 251 of relay 2SE, and upper winding of relay 2SE, to (—). Such circuit is maintained closed until it is opened at back contact 249 of relay 2FA upon the picking up of that relay during the first "on" period. The picking up of the relay 2FA during an "on" period ordinarily uncovers the selection through the code jumpers defining the code assigned to field station No. 2, but inasmuch as it is the first "on" period that is under consideration, and there has been no preceding "off" period used for selecting purposes, the relay 2SE is maintained picked up during such "on" period by the energization of a stick circuit extending from (+), including front contacts 240 and 241 of relays 2SA and 2SB respectively connected in multiple, front contact 242 of relay 2SO, front contact 243 of relay 2SE, front contact 244 of relay 2LOT, front contact 245 of relay 2EE, wire 248, back contacts 280, 281, 283, 284, 285 and 286 of relays 2LV, 2V6, 2V5, 2V4, 2V3, 2V2 and 2VI respectively, back contact 225 of relay 2LED, wire 250, front contact 251 of relay 2SE, and upper winding of relay 2SE, to (—). Upon the picking up of the relay 2EO during that "on" period subsequent to the picking up of the relay 2LET, the closure of front contacts 253 and 254 of relays 2EO and 2LET respectively is effective to shunt contacts 244 and 245 of relays 2LOT and 2EE respectively out of the stick circuit which has just been described. When the relay 2EE is dropped away during the first "on" period, another stick circuit is closed for the relay 2SE to maintain such relay picked up until the picking up of the relay 2EE during the first "off" period. Such circuit extends from (+), including front contacts 240 and 241 of relays 2SA and 2SB respectively connected in multiple, front contact 242 of relay 2SO, front contact 243 of relay 2SE, front contact 253 of relay 2EO, front contact 254 of relay 2LET, back contact 287 of relay 2EE, front contact 251 of relay 2SE, and upper winding of relay 2SE, to (—). It will be noted that the picking up of the relay 2LED in response to the picking up of the relay 2EE during the first "on" period opens the stick circuit which has been described for the relay 2SE including back contact 225 of relay 2LED.

During the first "off" period, the relay 2SE is maintained picked up by a stick circuit which has been described dependent upon the closure of back contact 287 of relay 2EE, and another stick circuit is closed prior to the picking up of the relay 2EE for the relay 2SE extending from (+), including front contacts 240 and 241 of relays 2SA and 2SB respectively connected in multiple, front contact 242 of relay 2SO, front contact 243 of relay 2SE, front contact 244 of relay 2LOT, front contact 245 of relay 2EE, wire 248, back contacts 280, 281, 282, 283, 284, 285 and 286 of relays 2LV, 2V6, 2V5, 2V4, 2V3, 2V2 and 2VI respectively, back contact 225 of relay 2LED, wire 250, front contact 251 of relay 2SE, and upper winding of relay 2SE, to (—). Upon the picking up of the relay 2EO during that "on" period subsequent to the picking up of the relay 2LET, the closure of front contacts 253 and 254 of relays 2EO and 2LET respectively is effective to shunt contacts 244 and 245 of relays 2LOT and 2EE respectively out of the stick circuit which has just been described. When the relay 2EE is dropped away during the first "on" period, another stick circuit is closed for the relay 2SE to maintain such relay picked up until the picking up of the relay 2EE during the first "off" period. Such circuit extends from (+), including front contacts 240 and 241 of relays 2SA and 2SB respectively connected in multiple, front contact 242 of relay 2SO, front contact 243 of relay 2SE, front contact 253 of relay 2EO, front contact 254 of relay 2LET, back contact 287 of relay 2EE, front contact 251 of relay 2SE, and upper winding of relay 2SE, to (—). It will be noted that the picking up of the relay 2LED in response to the picking up of the relay 2EE during the first "on" period opens the stick circuit which has been described for the relay 2SE including back contact 225 of relay 2LED.

During the first "off" period, the relay 2SE is maintained picked up by a stick circuit which has been described dependent upon the closure of back contact 287 of relay 2EE, and another stick circuit is closed prior to the picking up of the relay 2EE for the relay 2SE extending from (+), including front contacts 240 and 241 of relays 2SA and 2SB respectively connected in multiple, front contact 242 of relay 2SO, front contact 243 of relay 2SE, front contact 253 of relay 2EO, front contact 254 of relay 2LET, wire 248, back contact 249 of relay 2FA, wire 250, front contact 251 of relay 2SE, and upper winding of relay 2SE, to (—). The relay 2EO is dropped away, however, during that "off" period, but subsequent to the dropping away of that relay, another stick circuit is closed for the relay 2SE extending from (+), including front contacts 240 and 241 of relays 2SA and 2SB respectively connected in multiple, front contact 242 of relay 2SO, front contact 243 of relay 2SE, front contact 244 of relay 2LOT, front contact 245 of relay 2EE, wire 248, back contact 249 of relay 2FA, wire 250, front contact 251 of relay 2SE, and upper winding of relay 2SE, to (—). It will be noted that this stick circuit corresponds to the circuit which has been described as being closed during the last of the conditioning period and the first part of the first "on" period, and in a similar manner such circuit is maintained closed during the last of the first "off" period and the beginning of the second "on" period.

The picking up of the relay 2FA during the second "on" period, by opening a stick circuit for relay 2SE at back contact 249, renders effective a selection stick circuit for the relay 2SE, which is closed only if the preceding "off" period has been in correspondence with the station code assigned to station No. 2. Such code requires the first "off" period to be short, so the circuit is closed for the relay 2SE through a front contact of the relay 2LED, which is picked up at that time if the preceding "off" period has been short, but is dropped away at that time if the preceding "off" period has been long. The circuit by which the relay 2SE is maintained picked up at that time in accordance with the preceding "off" period being short extends from (+), including front contacts 240 and 241 of relays 2SA and 2SB respectively connected in multiple, front contact 242 of relay 2SO, front contact 243 of relay 2SE, front contacts 244 and 245 of relays 2LOT and 2EE respectively, wire 248, back contacts 280, 281, 282, 283, 284 and 285 of relays 2LV, 2V6, 2V5, 2V4, 2V3 and 2V2, respectively, front contact 286 of relay 2VI, jumper 2S, front contact 225 of relay 2LED, wire 250, front contact 251 of relay 2SE, and upper winding of relay 2SE, to (—). If the preceding "off" period had been long instead of short, the circuit just described would have been open at front contact 243 of such relay, and the relay 2SE would be dropped away. The dropping away of the relay 2SE under such conditions would cause the dropping away of the relay 2SO by opening the stick circuit for such relay at front contact 243. When the relay 2EO is picked up during the second "on" period, the closure of front contact 253 of such relay in series with front contact 254 of relay 2LET shunts front contacts 244 and 245 of relays 2LOT and 2EE respectively out of the stick circuit just described. Upon the dropping away of the relay 2EE during the second "on" period, a stick circuit is closed for the upper winding of the relay 2SE, including back contact 287 of relay 2EE corresponding to the circuit which has been described for maintaining such relay picked up during the last part of the first "on" period and the first part of the following "off" period. Other stick circuits are closed for the relay 2SE during the second "off" period to correspond with those that have been described for maintaining the relay 2SE picked up during the first "off" period.

The picking up of the relay 2FA during the third "on" period renders effective a selection stick circuit for the relay 2SE extending from (+), including front contacts 240 and 241 of relays 2SA and 2SB respectively connected in multiple, front contact 242 of relay 2SO, front contact 243 of relay 2SE, front contact 244 of relay 2LOT, front contact 245 of relay 2EE, wire 248, back contacts 280, 281, 282, 283 and 284 of relays 2LV, 2V6, 2V5, 2V4 and 2V3 respectively, front contact 285 of relay 2V2, jumper 4S, front contact 225 of relay 2LED, wire 250, front contact 251 of relay 2SE, and upper winding of relay 2SE, to (—). The relay 2LED is picked up at that time because the second "off" period transmitted is assumed to have been short. The picking up of the relay 2EO during such "on" period closes a circuit including front contacts 253 and 254 of relays 2EO and 2LET respectively to shunt contacts 244 and 245 of relays 2LOT and 2EE out of the circuit just described. The dropping away of the relay 2EE during such "on" period closes a stick circuit for the relay 2SE, in a manner corresponding to that which has been described as being effective during the first "on" period. It will be readily apparent from the description as it has been set forth that the relay 2SE is maintained picked up during the third "off" period by the energization of stick circuits corresponding to those which have been described for maintaining such relay picked up during the first "off" period of the control cycle.

During the fourth "on" period of the control cycle assumed to be transmitted, the relay 2SE is maintained picked up by a selection circuit extending from (+), including front contacts 240 and 241 of relays 2SA and 2SB respectively, front contact 242 of relay 2SO, front contact 243 of relay 2SE, front contact 244 of relay 2LOT, front contact 245 of relay 2EE, wire 248, back contacts 280, 281, 282 and 283 of relays 2LV, 2V6, 2V5 and 2V4 respectively, front contact 284 of relay 2V3, jumper 6S, back contact 225 of relay 2LED, wire 250, front contact 251 of relay 2SE, and upper winding of relay 2SE, to (—). The picking up of the relay 2EO during that cycle of operation closes a circuit portion including front contacts 253 and 254 of relays 2EO and 2LET respectively, to shunt contacts 244 and 245 of relays 2LOT and 2EE respectively out of the circuit just described. It will be noted that the relay 2LED is dropped away during the fourth "on" period to close the stick circuit just described for the relay 2SE because the preceding "off" period has been long as required by the station code assigned to station No. 2. The closure of back contact 287 of relay 2EE during that "on" period closes a stick circuit corresponding to that which has been described when considering the first "on" period to maintain the relay 2SE picked up until the picking up of the relay 2EE during the following "off" period. The stick circuits by which the relay 2SE is maintained picked up during the fourth "off" period correspond to the circuits described for maintaining such relay energized during the first "off" period of the cycle.

Inasmuch as only the first three steps of the cycle are used for station selection, a stick circuit is closed during each of the "on" periods used for controls to replace the stick circuits which have been described as being effective for station selection during the "on" periods at the beginning of the cycle of operation. Such stick circuit is first closed during the fifth "on" period, and it extends from (+), including front contacts 240 and 241 of relays 2SA and 2SB respectively connected in multiple, front contact 242 of relay 2SO, front contact 243 of relay 2SE, front contact 244 of relay 2LOT, front contact 245 of relay 2EE, wire 248, back contact 288 of relay 2LV, front contact 289 of relay 2V4, jumper 290, wire 250, front contact 251 of relay 2SE, and upper winding of relay 2SE, to (—). The picking up of relay 2EO during that "on" period closes a circuit portion including front contacts 253 and 254 of relay 2EO and 2LET respectively to shunt contacts 244 and 245 of relays 2LOT and 2EE out of the circuit just described. The relay 2SE is maintained picked up during each of the "off" periods used for controls by the energization of stick circuits corresponding to the stick circuits specifically described by which the relay 2SE is maintained up and during the first "off" period of the cycle. Inasmuch as the clear-out period at the end of the cycle of operation is a period of deenergization, the relay 2SE is maintained picked up during such period in a manner similar to that described above for maintaining the relay energized during the first "off" period, except that it is dropped away upon the opening of its stick circuit at front contact 241 of relay 2SB when the relay 2SB is dropped away during the clearout period.

*Field station reception of controls.*—Having described how controls are transmitted from the control office to the respective field stations, how a particular field station is selected for the reception of such controls, and how the stepping is accomplished at such station, consideration will now be given to the means provided at each of the field stations for decoding the control codes transmitted to such stations.

For the decoding of controls transmitted from the control office to the field stations, a bank of decoding relays CS is provided at each of the field stations, such bank having one relay for each "on" period and one relay for each "off" period that is used in the communication of controls. The circuit organization is such that a relay CS is picked up during the control part of a control cycle for each "on" or "off" period that is long. Thus, for example, if a code is transmitted for the power operation of a track switch to a normal position, according to the code table of Fig. 6, a relay CS is picked up for the "on" period of that step because such "on" period is long, but no CS relay is picked up for the "off" period of that step because such "off" period is short. In a similar manner the decoding relays CS are controlled during the step periods used for the transmission of signal controls.

To consider more specifically the circuits by which the decoding relays CS are controlled, as a typical condition, it will be assumed that controls are transmitted during a control cycle to field station No. 2 for operating the track switch at such station to its normal position, and for clearing a signal at that field station for governing traffic to the right. It has been described, when considering the characters of the step periods selected at the control office, how such codes are selected for transmission in accordance with the manual designation of the controls.

The control of the decoding relays CS is not unlike the control that has been described for the step selecting relays 2SO and 2SE in that the relays CS having odd preceding numerals are energized during "off" periods of the control cycle, in accordance with the characters of the preceding "on" periods; and the relays CS having even preceding numerals are energized during the "on" periods in accordance with the characters of the preceding "off" periods. Furthermore, the relays CS having odd preceding numerals are energized by circuits having portions common to those circuits used for the selection control of the station selecting relay 2SO, and similarly the relays CS having even preceding numerals are picked up by the energization of circuits having portions common to those energized during the selection periods for the control of the relay 2SE.

For the purpose of simplifying the description of the circuits for the relays CS, it will be assumed that energy is applied to wire 248 during the "on" and "off" periods used in the picking up of such relays. It has been described how energy is applied continuously to this wire during a control cycle transmitted for station No. 2 in order to provide stick energy for the relays 2SO and 2SE. According to the typical control cycle under consideration, the fourth "on" period of such cycle is long, and therefore energy is applied to the relay 7CS to cause such relay to be picked up during the fourth "off" period upon the dropping away of relay 2FA during that "off" period. The circuit by which relay 7CS is picked up extends from wire 248 through back contact 255 of relay 2VP, back contact 260 of relay 2LV, back contact 261 of relay 2V5, front contact 262 (see Fig. 4) of relay 2V3, upper winding of relay 7CS, back contact 291 of relay 2LOD, front contact 292 of relay 2EO, and back contact 293 of relay 2FA, to (—). Such pick-up circuit is opened at front contact 292 of relay 2EO when such relay is dropped away during that "off" period, but prior to the opening of such pick-up circuit, the picking up of the relay 7CS has been effective to close a stick circuit for the lower winding of such relay to maintain it picked up throughout the remainder of the cycle. Such stick circuit extends from (+), including front contact 294 of relay 2SO, front contact 295 of relay 2SE, front contact 296 of relay 7CS, and lower winding of relay 7CS, to (—). It will be noted from the pick-up circuit described for the relay 7CS that such relay can be picked up only when the relay 2LOD is dropped away to close back contact 291. Thus, the relay 7CS can be picked up during the fourth "off" period only if the preceding "on" period has been long to allow the dropping away of the relay 2LOD during such period.

Inasmuch as the fourth "off" period is short for a control cycle used in the transmission of a switch control for the power operation of the track switch TS to its normal position, the relay 8CS is not picked up during the fifth "on" period because the preceding "off" period has been short, and thus the relay 2LED has not been dropped away during such "off" period.

Assuming the fifth and sixth steps of the control cycle to be used for the transmission of a control for the clearing of a signal governing traffic to the right, the relay 9CS is picked up during the fifth "off" period of the cycle upon the dropping away of the relay 2FA during such "off" period by the energization of a circuit extending from wire 248 (see Fig. 3B), including front contact 255 of relay 2VP, back contact 256 of relay 2V6, front contact 257 (see Fig. 4) of relay 2V4, upper winding of relay 9CS, back contact 291 of relay 2LOD, front contact 292 of relay 2EO, and back contact 293 of relay 2FA, to (—). It is because of the closure of back contact 291 of the relay 2LOD to signify that the preceding "on" period has been long that the relay 9CS is picked up. The opening of front contact 292 of the relay 2EO during that "off" period opens the pick-up circuit that has been described for relay 9CS, but relay 9CS is maintained picked up until the end of the cycle by the energization of a stick circuit extending from (+), including front contact 294 of relay 2SO, front contact 295 of relay 2SE, front contact 505 of relay 9CS, and lower winding of relay 9CS, to (—).

Inasmuch as the fifth "off" period, or the tenth digit of the code is short, the relay 10CS remains deenergized during the cycle of operation under consideration because it can be picked up only if the relay 2LED has been dropped away during the fifth "off" period. The relay 11CS also remains deenergized during that cycle because the sixth "on" period (eleventh digit) is short. The relay 11CS cannot be picked up because of the opening of its circuit at back contact 291 of relay 2LOD.

Inasmuch as the "off" period of the sixth step (twelfth digit) is long in the control cycle under consideration, the relay 12CS is picked up during the final "on" period because of the preceeding "off" period being long, by the energization of a circuit extending from wire 248 (see Fig. 3B), including back contact 280 of relay 2LV, front contact 281 (see Fig. 4) of relay 2V6, upper winding of relay 12CS, back contact 298 of relay 2LED, front contact 299 of relay 2EE, and front contact 293 of relay 2FA, to (—). It is the closure of back contact 298 of relay 2LED in the circuit that signifies that the preceding "off" period has been long. The dropping away of the relay 2EE opens the pick-up circuit for the relay 12CS at front contact 299, but the relay 12CS is maintained picked up throughout the remainder of the cycle by the energization of a stick circuit extending from (+), including front contact 294 of relay 2SO, front contact 295 of relay 2SE, front contact 300 of relay 12CS, and lower winding of relay 12CS, to (—).

Inasmuch as it is assumed that the maintainer's call lever for field station No. 2 is in its normal position at the control office during the transmission of the typical control cycle of operation, the last "on" period of the cycle is short, and therefore the relay 13CS remains deenergized throughout the cycle.

To maintain the relays CS energized at the end of the cycle during the execution period an auxiliary stick circuit is provided for the relays CS that is closed during the clear-out period upon the dropping away of the relay 2SA. It is believed to be obvious that the closure of back contact 301 of relay 2SA connected in series with front contact 302 of relay 2LV, applies energy to the stick windings of the relays CS to maintain such relays picked up until the relay 2LV has been dropped away at the end of the execution period.

It is believed that it should be readily apparent to those skilled in the art from the description as it has been set forth as to the mode of operation of the system in the selected energization of the relays CS in response to particular long "off" and "on" periods of a typical control cycle of operation, how such relays are controlled in response to the transmission of other code combinations from the control office.

*Control of application relays.*—Each control cycle has an execution period at the end thereof, during which switch and signal control relays are conditioned in accordance with the controls transmitted during that cycle of operation, the circuits for such relays (see Fig. 5) being energized in accordance with the conditioning of the decoding relays CS. The circuits are so arranged, however, that execution becomes effective to control the switch and signal control relays only if one and only one relay CS has been picked up for each step period of that cycle of operation that is used for the communication of switch and signal controls. By this arrangement execution at the end of a control cycle can be effective only if each of the step periods used for the communication of controls has been made up of combinations of long and short "off" and "on" periods, the "on" period either having been long and the "off" period short, or the "on" having been short and the "off" period long.

Assuming the transmission of the control cycle which has been heretofore described as a typical control cycle of operation, the relay WN at field station No. 2 has its pick-up winding energized during the execution period at the end of such cycle by a circuit closed upon dropping of the relay 2SA. Such circuit extends from (+), including back contact 310 of relay 2SA, front contact 311 of relay 2LV, back contact 312 of relay 8CS, back contact 313 of relay 10CS, back contact 314 of relay 11CS, front contact 315 of relay 7CS, upper winding of relay WN, back contact 316 of relay LGZ, and back contact 317 of relay RGZ, to (—). The relay WN when picked up is maintained energized by a stick circuit extending from (+), including back contact 318 of relay WR, front contact 319 of relay WN, and lower winding of relay WN, to (—). This stick circuit is normally closed, because it is assumed that the track switch TS for which the relay WN is provided is in its normal position.

In accordance with the energization of the relay WN, and with the relay WR dropped away, a circuit is closed for the pick-up winding of the relay RGZ, extending from (+), including back contact 310 of relay 2SA, front contact 311 of relay 2LV, back contact 312 of relay 8CS, back contact 313 of relay 10CS, back contact 314 of relay 11CS, front contact 320 of relay WN, back contact 321 of relay WR, front contact 322 of relay 7CS, front contact 323 of relay 9CS, front contact 324 of relay 12CS, back contact 325 of relay LGZ, and lower winding of relay RGZ, to (—). The picking up of the relay RGZ closes a stick circuit to maintain such relay picked up until it is dropped away either by the transmission of a stop control from the control office, or by the acceptance of the signal 2A governed by such relay by a train. The stick circuit for relay RGZ extends from (+), including back contact 326 of relay B¹, back contact 327 of relay TP, connected in multiple with front contact 328 of relay TR, front contact 329 of relay RGZ, and upper winding of relay RGZ, to (—).

In accordance with the energization of the relays WN and RGZ, the track switch TS is power operated by the switch machine SM to its normal position, and the signal 2A is allowed to be cleared in accordance with automatic conditions dependent upon the unoccupied condition of track sections in advance of such signal. Such control can be provided in any suitable manner well known to those familiar with the art, such, for example, as in the manner more fully disclosed in the patent to R. F. Wells, Patent No. 2,159,922, dated May 23, 1939.

If the control code transmitted from the control office to field station No. 2 is for the restoration of a signal to stop, the relay B¹ is picked up during such cycle in accordance with the energization of the decoding relays 10CS and 12CS in an obvious manner, and the picking up of such relay is effective by the opening of back contact 326 to cause the dropping away of the signal control relay RGZ or LGZ.

Having described specifically the manner in which certain of the switch and signal control relays at field station No. 2 are controlled in response to a particular control code transmitted from the control office, it is believed to be readily apparent the manner in which the application relays are responsive to other code combinations for operating the track switch to its reverse position, and for causing the clearing of the other signals associated with that field station.

If the last "on" period of a control cycle were long for the communication of a maintainer's call to field station No. 2, the relay 13CS would be picked up during the clear-out period, and the energization of such relay would be effective during the execution period to cause the energization of the two-position polar maintainer's call relay MC with a polarity to cause the illumination of the maintainer's call indicator lamp MCK. Under such conditions, the relay MC would have its upper winding energized by a circuit extending from (+), including back contact 310 of relay 2SA, front contact 311 of relay 2LV, back contact 312 of relay 8CS, back contact 313 of relay 10CS, back contact 314 of relay 11CS, front contact 330 of relay 13CS, and upper winding of relay MC, to (—). Such energization would be effective to cause the polar contact 331 to be actuated to its right-hand position to cause the energization of the lamp MCK. It is to be understood that such energization of the polar relay MC can be effected to cause the sounding of a bell or the energization of the indication means to attract the attention of the maintainer in accordance with the requirements of practice. It will be readily apparent that the transmission of a subsequent cycle of operation with the maintainer's call lever in its normal or cancel position would be effective to cause the energization of the lower winding of the relay MC with a polarity to operate the polar contact 331 of that relay to its left-hand position and thereby opening the circuit for the maintainer's call lamp MCK. Such operation would be dependent upon the closure of back contact 330 of relay 13CS during the execution period of the cycle.

*Indications.*—During an indication cycle the first part of the cycle is used for station registration and the last part of the cycle is used for the transmission of indications. The impulses forming the codes are produced by shunting and unshunting the line circuit at each field station transmitting an indication cycle to form selected long or short "shunt" periods and selected long or short "non-shunt" periods, energy being steadily applied to the line circuit at the control office throughout each indication cycle for the energization of such line circuit with a negative polarity. Inasmuch as the line circuit shunt is applied at each of the field stations through the line filter at that station, such shunt cannot materially affect any alternating current circuit, such, for example, as a telephone circuit, that may be superimposed upon the line circuit.

The codes employed during an indication cycle differ from those employed during a control cycle in that each digit is used as a character of the code rather than requiring a combination of "on" and "off" periods to form a code character as has been described for a control cycle. In other words, each code character or element in a control cycle of operation comprises two complementary code digits, and only one code element comprising two code digits is transmitted on one step period. But for the transmission of indications, each code digit is used as a code character or element so that two station registering code characters or two indication conditions are transmitted during each step period. Obviously, such an assignment of codes for use in the communication of indications does not provide the check against error in the codes that is employed during a control cycle, but it is considered that the degree of reliability required in the communication of indications is not sufficient to warrant the use of a code checking scheme of the complementary digit code character type such as that employed in the communication of controls; but it is to be understood, however, that the code check principle applied during a control cycle can be applied to the communication of indications and to indication station registration if such check is required in practice.

The codes used for station registration are assigned to the various indication stations in an order of code superiority, the most superior code being assigned to the station nearest the control office. The following code table shows the five digit station registration code for this embodiment of the present invention, the order of superiority also being the order of geographic location of the various indication stations from the control office.

*Code table*

| Order of superiority | Indication station registration digits | | | | |
|---|---|---|---|---|---|
| | 1 | 2 | 3 | 4 | 5 |
| 1 | S | L | S | L | S |
| 2 | S | L | S | S | S |
| 3 | S | L | L | L | S |
| 4 | S | L | L | S | S |
| 5 | S | S | S | L | S |
| 6 | S | S | S | S | S |
| 7 | S | S | L | L | S |
| 8 | S | S | L | S | S |
| 9 | L | L | S | L | S |
| 10 | L | L | S | S | S |
| 11 | L | L | L | L | S |
| 12 | L | L | L | S | S |
| 13 | L | S | S | L | S |
| 14 | L | S | S | S | S |
| 15 | L | S | L | L | S |
| 16 | L | S | L | S | S |

From the above code table it will be noted that the last channel used for station restoration is always short. This channel is used in the energization of the last of the station registration relays to be picked up at the control office, the picking up of such relay being effective to cause the energization of a station relay ST for the field station corresponding to the registration code that has been transmitted. This channel can be either a "shunt" or a "non-shunt" period as will be more readily apparent as the description progresses. Inasmuch as the last character of the station registration code is always short, the number of stations that can be selectively registered by a given number of registration digits is equal to two raised to the power of one less than the number of digits in such registration code.

The conditions determining the order of superiority of the various codes are that a short "non-shunt" period is superior to a long "non-shunt" period, and a long shunt period is superior to a short "shunt" period. The manner in which these periods are superior to each other will be more fully described as the description progresses. The initiation of an indication cycle at a field station is dependent upon the shifting in the position of a device at that field station that requires the transmission of an indication to the control office. The change in the position of such device interrupts a normally energized stick circuit for the relay CH at that field station, and the dropping away of such relay CH is effective when the communication system is at rest to cause the transmission of an indication cycle from that field station.

To consider specifically how the start of an indication cycle is initiated at a particular field station, it will be assumed, for example, that the relay 2CH at field station No. 2 (see Figs. 3A and 3B) is dropped away because of the shifting of the contacts of the relay RM as is effective upon the clearing of the signal 2A for governing eastbound traffic in a manner which has been described. The opening of front contact 43 of relay RM is effective to cause the dropping away of the relay 2CH.

When the relay 2CH is dropped away, the relay 2CHP is picked up (provided that the communication system is at rest) by the energization of a circuit extending from (+), including contact 214 of relay 2F in its right-hand position, front contact 332 of relay 2FR, back contact 333 of relay 2LOT, back contact 334 of relay 2CD, front contact 335 of relay 2FR, winding of relay 2CHP, and back contact 336 of relay 2CH, to (−). The closure of front contact 337 of relay 2CHP is effective to close a stick circuit to shunt back contact 336 of relay 2CHP out of the circuit just described.

The relay 2EO is picked up in response to the picking up of the relay 2CHP by the energization of a circuit extending from (+), including front contact 338 of relay 2FR, back contact 339 of relay 2LET, front contact 340 of relay 2CHP, back contact 236 of relay 2EE, and winding of relay 2EO, to (−). The picking up of such relay is effective to close a stick circuit by which that relay is maintained energized until the relay 2EE is picked up at the end of the conditioning period. Such circuit extends from (+), including front contact 341 of relay 2CHP, front contact 235 of relay 2EO, back contact 236 of relay 2EE, and winding of relay 2EO, to (−). The picking up of relay 2CHP is effective to cause the picking up of the relay 2CH by the energization of a circuit extending from (+), including front contact 342 of relay 2CHP, wire 343, back contact 344 of relay 2VI, wire 345, and winding of relay 2CH, to (−). The picking up of relay 2CH is effective to close a stick circuit for such relay corresponding to that which has been described when considering the normal conditions of the system.

The relay 2LO is picked up in response to the picking up of the relay 2EO to shunt the line and thus initiate the conditioning period. Relay 2LO is picked up under such conditions by the energization of a circuit extending from (+), including back contact 346 of relay 2VI (see Fig. 3B), wire 347, front contact 348 of relay 2CHP, front contact 349 of relay 2FR, back contact 350 of relay 2LOT, back contact 351 of relay 2LET, front contact 352 of relay 2EO, wire 353, and winding of relay 2LO, to (—).

Upon the picking up of the relay 2LO, the line relay 2F (see Fig. 1B) is pole changed by the shifting of contacts in an obvious manner, and a shunt is applied to the line circuit because the relay 2EO is picked up at that time. The shunt extends from line wire 22, including filler windings 35 and 36, front contact 40 of relay 2LO, front contact 354 of relay 2EO, back contact 355 of relay 2EE, and filter windings 41 and 42, to line wire 28.

In accordance with the application of the shunt to the line circuit, the decay of flux in the primary winding of the line transformer 30 (see Fig. 1A) at the control office is effective to cause the energization of the upper winding of the line relay F with a polarity to cause such relay to operate its polar contacts to their left-hand positions. The circuit by which the upper winding of relay F is energized under such conditions extends from the right-hand terminal of the secondary winding 356 of the line transformer including upper winding of relay F, back contact 357 of relay LV, back contact 358 of relay C, and back contact 359 of relay SC to the left-hand terminal of the secondary winding 356 of the line transformer. The picking up of relay SA during the conditioning period is effective by the closure of front contact 360 to shunt back contact 359 of relay SC out of the circuit just described.

In response to the shifting of the contacts of relay F, the field control relay CF (see Fig. 2C) is picked up at the control office by the energization of a circuit extending from (+), including back contact 63 of relay LCS, back contact 361 of relay SC, polar contact 362 of relay F in its left-hand position, and winding of relay CF, to (—).

The relay CF is maintained picked up throughout the indication cycle by stick circuits which are arranged to check the proper operation of the relays LED, LOD, E and EP. The relay CF is maintained picked up initially during the conditioning period by the energization of a stick circuit extending from (+), including back contact 363 of relay SB, front contact 364 of relay CF, and winding of relay CF, to (—). After the relay SA has been picked up during the conditioning period, a stick circuit is closed for the relay CF, extending from (+), including front contact 365 of relay SA, back contact 366 of relay EP, front contact 367 of relay LOD, front contact 364 of relay CF, and winding of relay CF, to (—).

The picking up of the relay CF (see Fig. 1A) is effective to pole change the line circuit and thus cause such line circuit to be energized with a negative polarity. The negative terminal of line battery CB is connected to line wire of the line circuit through the primary winding 29 of the line transformer 30, back contact 31 of relay C, front contact 25 of relay CF, filter windings 26 and 27 to line wire 22; and the positive terminal of the line battery CB is connected to line wire 28, through back contact 23 of relay C, and front contact 32 of relay CF, and filter windings 33 and 34 to line wire 28. The energization of the line circuit with a negative polarity is effective to cause each field station included between the control office and the nearest field station attempting to transmit an indication cycle to have the polar contacts of its line relay F shifted to their left-hand positions to cause such station to be non-responsive to the transmission of the indication cycle. The specific manner in which such field stations are locked out by the negative energization of the line circuit will be more apparent as the description progresses.

The conditioning is effective at the control office in a manner similar in some respects to that which has been described when considering the conditioning during a control cycle. That is, the shifting of the polar contacts of relay F (see Fig. 2C) to their left-hand positions is effective to cause the picking up of the relays LET and LOT, and the dropping away of relay OR in a manner which has been described. The picking up of the relays LET and LOT is effective to cause the relays SA, SB and SC to be successively energized in a manner which has been described, and the picking up of the relay SA is effective to cause the picking up of the relay E by the energization of a circuit extending from (+), including front contact 75 of relay SA, front contact 380 of relay CF, wire 166, back contact 167 of relay VP, back contact 168 of relay VI, wire 169, and winding of relay E, to (—).

The relay LOD at the control office is picked up during the conditioning period of an indication cycle in response to the picking up of the relay CF by the energization of a circuit extending from (+), including front contact 381 of relay CF, back contact 382 of relay EP, and winding of relay LOD, to (—).

At field station No. 2, the shifting of the contacts of relay 2F (see Fig. 3A) to their left-hand positions upon the shunting of the line circuit at the beginning of the conditioning period is effective to cause the relays 2LET and 2LOT to be picked up by the energization of circuits corresponding to those described when considering the mode of operation of the system during the conditioning period of a control cycle, and the relays 2SA, 2SB, 2LED, 2SO and 2SE are picked up subsequent to the picking up of the relays 2LET and 2LOT in a manner which has been described. The relay 2LOD is picked up in response to the picking up of the relay 2SB by the energization of a circuit extending from (+), including front contact 208 of relay 2SB, front contact 209 of relay 2LOT, wire 229, front contact 230 of relay 2LO, and winding of relay 2LOD, to (—). The closure of front contact 226 of relay 2LOD, shunts front contact 230 of relay 2LO out of the circuit just described. The relay 2FR is deenergized in response to the shifting of polar contact of relay 2F, but, due to its slow drop-away characteristics, such relay is maintained picked up until the picking up of the relays which have been described above.

In response to the dropping away of the relay 2FR, the relay 2EE is picked up to terminate the conditioning period by the energization of a circuit extending from (+), including front contact 203 of relay 2SB, wire 204, back contact 383 of relay 2VP, back contact 384 of relay 2VI, wire 385, back contact 386 of relay 2FR, wire 387, front contact 388 of relay 2LOD, front contact 205 of relay 2LO, back contact 206 of relay 2FA, wire 207, and winding of relay 2EE, to (—).

The relay 2CD is also picked up in response to the dropping away of relay 2FR. Such relay is picked up by the energization of an obvious circuit closed at back contact 213 of relay 2FR.

The picking up of relay 2EE to terminate the conditioning period causes the dropping away of relay 2EO by opening its circuit at back contact 236.

*Transmission of indication codes.*—The nature of the system is such that several field stations can start an indication cycle of operation simultaneously, but all stations will be ruled out but the station having the most superior code because of the manner in which the relays LO at the respective field stations are maintained energized, dependent upon correspondence between code jumpers and the code applied to the line circuit. In other words, the selection of one of a plurality of field stations for the transmission of indications is not unlike the selection of one field station for the reception of controls during a control cycle. It is believed that the mode of operation of the relays LO for selecting a single indication station under such conditions can best be understood after considering the mode of operation of the system in the transmission of indications by a single station. To consider transmission of indications by the single station No. 2, for example, it will be assumed that the relay 2LO is maintained picked up throughout the cycle of operation and the specific circuits involved in maintaining the relay 2LO picked up will be hereinafter considered when considering specifically simultaneous starts by a plurality of field stations.

To consider specifically the mode of operation of the system during an indication cycle, it will be assumed that an indication cycle is transmitted by field station No. 2, such station having a registration code corresponding to the fourth code in the order of superiority of the above mentioned code table.

It is to be understood that this code has been assigned to field station No. 2 because it has characters that best illustrate the mode of operation of the system. The first three codes of the above code table are assumed in this embodiment of the present invention to be either spare codes or assigned to indication stations at location No. 1 (see Fig. 1A).

Code No. 4 requires the first "non-shunt" period to be short, the first "shunt" period to be long, the second "non-shunt" period to be long, the second "shunt" period to be short, and the third "non-shunt" period to be short.

Upon removal of the shunt from the line circuit by the picking up of the relay 2EE at the end of the conditioning period of the indication cycle, the relay 2F becomes energized with a positive polarity to cause the operation of its polar contacts to their right-hand positions. In the description as it has been set forth when considering the conditioning during an indication cycle at the control office, it has been pointed out that the control office causes the line circuit to be energized with a negative polarity. But the picking up of the relay 2LO at the beginning of the cycle is effective to pole change the relay 2F so that such relay will be energized during the "non-shunt" periods with a polarity to operate its polar contacts to their right-hand positions. With reference to Figs. 1A and 1B, the line relay 2F is energized under such conditions by a circuit extending from the positive terminal of line battery CB, including back contact 23 of relay C, front contact 32 of relay CF, filter windings 33 and 34, line wire 28, filter windings 42 and 41, front contact 355 of relay 2EE, front contact 37 of relay 2LO, upper winding of relay 2F, resistance 38, and condenser 39 connected in multiple, lower winding of relay 2F, front contact 40 of relay 2LO, filter windings 36 and 35, line wire 22, filter windings 27 and 26, front contact 25 of relay CF, back contact 31 of relay C, and winding 29 of line transformer 30, to the negative terminal of line battery CB.

Such energization of relay 2F causes the picking up of relay 2FA by the energization of a circuit extending from (+), including polar contact 214 of relay 2F in its right-hand position (see Fig. 3A), front contact 215 of relay 2SA, wire 216, and winding of relay 2FA, to (−). It will be readily apparent that the relay 2FA repeats the right-hand position of contact 214 of the relay 2F throughout the cycle.

In response to the picking up of relay 2FA, the relay 2VP is picked up in a manner corresponding to that described when considering specifically the mode of operation of the stepping relay bank, and the relay 2SE is dropped away upon the picking up of the relay 2FA because of the opening of its stick circuit at back contact 249. The opening of this contact during a control cycle uncovers a selection circuit which requires the relay 2LED to be down in order to close a stick circuit for relay 2SE at back contact 225. This relay is always down during the first "on" period of a control cycle because of the preceding conditioning period having been long, but during an indication cycle, the conditioning period is short so the relay 2LED is maintained picked up, and the relay 2SE is dropped away because of the opening of the stick circuit for such relay at back contact 225 of relay 2LED. Upon the dropping away of the relay 2SE, the opening of front contact 243 in the stick circuit for the relay 2SO is effective to cause the dropping away of that relay.

The pick-up circuit which has been described for the relay 2EE is opened upon the picking up of the relay 2FA during the first "on" period, but the relay 2EE is maintained picked up during such "on" period until the relay 2SO is dropped away by the energization of a stick circuit extending from (+), including front contact 203 of relay 2SB, front contact 237 of relay 2EE, front contact 238 of relay 2SO, back contact 239 of relay 2EO, and winding of relay 2EE, to (−). The opening of such circuit at front contact 238 of relay 2SO upon the dropping away of the relay 2SO causes the relay 2EE to be dropped away, and the dropping away of such relay is effective to close a pick-up circuit for the relay 2EO to cause that relay to be picked up for the termination of the first "non-shunt" period. The circuit by which the relay 2EO is picked up, under such conditions extends from (+), including front contact 203 of relay 2SB, wire 204, front contact 389 of relay 2VP, back contact 390 of relay 2V1, jumper 1K, wire 391, back contact 392 of relay 2EE, wire 393, front contact 394 of relay 2LED, front contact 231 of relay 2LO, front contact 232 of relay 2FA, wire 233, and winding of relay 2EO, to (−).

With reference to Fig. 1B, the picking up of relay 2EO applies a shunt to the line circuit extending from line wire 22 including filter windings 35 and 36, front conact 40 of relay 2LO, front contact 354 of relay 2EO, back contact 355 of relay 2EE, and filter windings 41 and 42, to line wire 28. Because of the shunt, the line relay 2F operates its polar contacts to their left-hand positions, and the relay 2FA is dropped away by the opening of its circuit at polar contact 214 of relay 2F (see Fig. 3A) in its right-hand position. The first of the stepping relays 2V1 is picked up in response to the dropping away of the relay 2FA in a manner which has been described when considering specifically the mode of operation of the stepping relay bank. The relay 2LET is deenergized upon the shifting of polar contact 48 of relay 2F, and the shunt period is timed by that relay because such period must be long according to the code assigned to field station No. 2.

After the relay 2LET is dropped away, the relay 2LED is dropped away by the opening of its circuit at front contact 196 of relay 2LET, and the dropping away of the relay 2LED is effective to close a pick-up circuit for relay 2EE extending from (+), including front contact 203 of relay 2SB, wire 204, front contact 383 of relay 2VP, back contact 395 of relay 2V2, front contact 396 of relay 2V1, jumper 2K, back contact 397 of relay 2LED, wire 385, back contact 386 of relay 2FR, wire 387, front contact 388 of relay 2LOD, front contact 205 of relay 2LO, back contact 206 of relay 2FA, wire 207, and winding of relay 2EE, to (—). The picking up of relay 2EE is effective to open the shunt formerly applied to the line circuit at back contact 355 (see Fig. 1B) to mark the beginning of the second "non-shunt" period.

In accordance with the picking up of the relay 2EE at the end of the first "shunt" period, the relay 2F becomes energized to operate its polar contacts to their right-hand positions, and the relay 2EO is dropped away by the picking up of relay 2EE upon the opening of its stick circuit at back contact 236. The energization of relay 2F causes the picking up of relay 2FA by the closure of polar contact 214 in its right-hand position, and the energization of relay 2F also causes the picking up of relay 2LET by the closure of polar contact 48 of relay 2F in its right-hand position. The picking up of relay 2LET causes the picking up of relay 2LED by the closure of front contact 196.

The relay 2VP is dropped away during the second "non-shunt" period in a manner corresponding to that which has been described when considering in detail the mode of operation of the stepping relay bank, and the relay 2EE is dropped away upon the picking up of relay 2FA by the opening of its circuit at back contact 206.

The timing relay 2LOT is dropped away during the second "non-shunt" period of the cycle because, according to the code assigned to that field station, such "non-shunt" period is long, and therefore allows the picking up of the relay 2EO for the termination of the period only after the relays 2LOT and 2LOD have been successively dropped away. The relay 2LOT starts its timing when its circuit is opened at polar contact 48 of relay 2F in its left-hand position at the beginning of the "non-shunt" period, and the dropping away of that relay is effective to cause the dropping away of the relay 2LOD by opening the circuit for such relay at front contact 209.

Upon the dropping away of relay 2LOD during the second "non-shunt" period, the relay 2EO is picked up by the energization of a circuit extending from (+), including front contact 203 of relay 2SB, wire 204, back contact 389 of relay 2VP, back contact 398 of relay 2V2, front contact 399 of relay 2V1, jumper 3K, back contact 400 of relay 2LOD, wire 391, back contact 392 of relay 2EE, wire 393, front contact 394 of relay 2LED, front contact 231 of relay 2LO, front contact 232 of relay 2FA, wire 233, and winding of relay 2EO, to (—). The picking up of relay 2EO terminates the second "on" period by the closure of front contact 354 (see Fig. 1B) to shunt the line circuit.

In accordance with the application of the shunt at the beginning of the second "shunt" period, the polar contacts of relay 2F (see Fig. 3A) are operated to their left-hand positions in accordance with the shunting of the line circuit. Upon the shifting of polar contact 214 of relay 2F to its left-hand position, the relay 2FA is dropped away, and the relay 2V2 is picked up in response to the dropping away of relay 2FA in a manner which has been described when considering specifically the mode of operation of the stepping relay banks. The shifting of polar contact 48 of relay 2F to its left-hand position causes the picking up of relay 2LOT by the energization of an obvious circuit, and the picking up of such relay causes the picking up of relay 2LOD by the energization of a circuit extending from (+), including front contact 208 of relay 2SB, front contact 209 of relay 2LOT, wire 229, front contact 230 of relay 2LO, and winding of relay 2LOD, to (—).

Inasmuch as the second "shunt" period is assumed to be short, according to the code assigned to the field station under consideration, the relay 2EE is directly responsive to the picking up of the stepping relay 2V2, and the relay 2LET does not have time to drop away and cause the dropping away of its repeater relay 2LED during that period. The circuit by which the relay 2EE is picked up under such conditions extends from (+), including front contact 203 of relay 2SB, wire 204, back contact 383 of relay 2VP, back contact 401 of relay 2V3, front contact 402 of relay 2V2, jumper 4K, wire 385, back contact 386 of relay 2FR, wire 387, front contact 388 of relay 2LOD, front contact 205 of relay 2LO, back contact 206 of relay 2FA, wire 207, and winding of relay 2EE, to (—). The picking up of relay 2EE removes the shunt from the line circuit by the opening of back contact 355 (see Fig. 1B), and thus terminates the second "shunt" period of the cycle.

Inasmuch as the third "non-shunt" period (fifth digit) is short, the mode of operation of the relays during that period is similar to that which has been described with reference to the mode of operation of the relays as described specifically during the first "non-shunt" period except that the relays 2SO and 2SE do not enter into the operation as such relays, when once dropped away during the first "non-shunt" period, are maintained deenergized throughout the cycle. The picking up of the relay 2EE at the beginning of the third "non-shunt" period causes the shifting of polar contacts of relay 2F to their right-hand positions, and the picking up of relay 2EE also causes the dropping away of the relay 2EO by opening its circuit at back contact 236. The closure of polar contact 214 of relay 2F in its right-hand position causes the picking up of relay 2FA, and the picking up of such relay is effective to cause the picking up of the relay 2VP according to the mode of operation of the stepping relay bank as it has been described. The picking up of relay 2FA also causes the dropping away of the relay 2EE by opening the circuit for such relay at front contact 206. Inasmuch as the positioning of the code jumpers is such as to cause the third "non-shunt" period to be short, a circuit is closed by which the relay 2EO is picked up in response to the picking up of relay 2VP, such circuit extends from (+), including front contact 203 of relay 2SB, wire 204, front contact 389 of relay 2VP, back contact 403 of relay 2V3, front contact 404 of relay 2V2, jumper 5K, wire 391, back contact 392 of relay 2EE, wire 393, front contact 394 of relay 2LED, front contact 231 of relay 2LO, front contact 232 of relay 2FA, wire 233, and winding of relay 2EO, to (—). The picking up of relay 2EO under such conditions terminates the third "non-shunt" period by applying a shunt to the line circuit at front contact 354 (see Fig. 1B).

Inasmuch as the third "non-shunt" period is the last period used for station registration, such period is determined to be short by the positioning of the code jumpers at each station because such period is used at the control office for the execution of the registration.

Upon the picking up of the stepping relay 2V3 during the third "shunt" period of the cycle, an indication is transmitted to the control office indicative of the condition of occupancy of the OS track section at the field station No. 2. If that track section is occupied, the closure of front contact 405 of relay TR is effective to cause the third "shunt" period to be short, but if the OS section is occupied so as to cause the track relay TR to be dropped away, the third "shunt" period is made long.

First, assuming the relay TR to be picked up, the third "shunt" period is made short because a circuit is closed to cause the picking up of the relay 2EE in response to the picking up of the relay 2V3. Such circuit extends from (+), including front contact 203 of relay 2SB, wire 204, front contact 383 of relay 2VP, back contact 406 of relay 2V4, front contact 407 of relay 2V3, front contact 405 of relay TR, wire 385, back contact 386 of relay 2FR, wire 387, front contact 388 of relay 2LOD, front contact 205 of relay 2LO, back contact 206 of relay 2FA, wire 207, and winding of relay 2EE, to (—).

If, on the other hand, the track relay TR is dropped away during the third "shunt" period of the cycle, the circuit that has been described including front contact 405 of relay TR for the energization of relay 2EE is open at that contact, and the relay 2EE cannt be picked up until the relay 2LED is dropped away in response to the dropping away of the timing relay 2LET. After the relay 2LED has been dropped away, the relay 2EE can be picked up by the energization of a circuit extending from (+), including front contact 203 of relay 2SB, wire 204, jumper 407, back contact 408 of relay 2V5, front contact 409 of relay 2V3, jumper 410, back contact 397 of relay 2LED, wire 385, back contact 386 of relay 2FR, wire 387, front contact 388 of relay 2LOD, front contact 205 of relay 2LO, back contact 206 of relay 2FA, wire 207, and winding of relay 2EE, to (—). The picking up of relay 2EE at the end of the third "shunt" period is effective to terminate that period by the opening of the shunt applied to the line circuit at front contact 355 (see Fig. 1B), that relay being picked up as has been described in response to the picking up of the stepping relay 2V3 if the period is short, and in response to the dropping away of the relay 2LED if that period is long.

During the fourth "non-shunt" period of the cycle, an indication is transmitted as to the condition of occupancy of an approach track section at that field station. If the relay ATR is energized during the transmission of the cycle, the fourth "non-shunt" period is made short, and if the relay ATR is deenergized during the indication cycle, the fourth "non-shunt" period is made long.

The fourth "non-shunt" period is made short when the relay ATR is picked up because the relay 2EO is picked up to remove the shunt and thus terminate the period to make it short in response to the dropping away of the relay 2VP during that period. Such circuit extends from (+), including front contact 203 of relay 2SB, wire 204, back contact 389 of relay 2VP, back contact 420 of relay 2V4, front contact 421 of relay 2V3, front contact 422 of relay ATR, wire 391, back contact 392 of relay 2EE, wire 393, front contact 394 of relay 2LED, front contact 231 of relay 2LO, front contact 232 of relay 2FA, wire 233, and winding of relay 2EO, to (—).

If the relay ATR is deenergized when the fourth "non-shunt" period is transmitted, the relay 2EO is not picked up for the termination of that period until the relays 2LOT and 2LOD have been successively dropped away. Upon the dropping away of relay 2LOD under such conditions, the relay 2EO can be energized for the termination of the "non-shunt" period by the energization of a circuit extending from (+), including front contact 203 of relay 2SB, wire 204, front contact 423 of relay 2V3, jumper 424, back contact 400 of relay 2LOD, wire 391, back contact 392 of relay 2EE, wire 393, front contact 394 of relay 2LED, front contact 231 of relay 2LO, front contact 232 of relay 2FA, wire 233, and winding of relay 2EO, to (—). It will be noted that the circuit just described for the relay 2EO can be closed upon the dropping away of the relays 2LOT and 2LOD during any "non-shunt" period following the periods used for station registration if such non-shunt" periods are not made short by the closure of contacts of devices to be indicated. In other words, the failure of a circuit to be closed by a contact of a device to be indicated during a "non-shunt" period to make such "non-shunt" period short, is effective to cause that "non-shunt" period to be long.

From the description as it has been set forth with respect to the transmission of a particular registration code, and the transmission of particular indication codes, it is believed to be readily apparent to those skilled in the art, how the system can be readily adapted by the positioning of the code jumpers to transmit a registration code of a different number of code characters, and to transmit indications of the conditions of various other devices not shown in this embodiment of the present invention.

After all of the indications are transmitted from a field station to the control office during an indication cycle, the indication cycle is terminated on the step following the last step used for the transmission of indications, irrespective of whether or not all of the steps required for controls have been taken. In other words, the indication cycle is shortened at the respective field stations to conform to the number of steps required at that field station to transmit all of its indications. Field station No. 2, for example, requires only four steps to be taken for the transmission of indications, and therefore the "off" period following the fifth "non-shunt" period becomes a clear-out period. Inasmuch as there is no indication illustrated as being transmitted during the fifth "non-shunt" period, such period is a spare channel. The fifth "non-shunt" period under such conditions is long if front contact 425 of relay 2V4 is not connected to the short "non-shunt" selection bus, but if it is desirable to shorten the cycle by causing the spare channel to be short, front contact 425 can be connected directly to the short "non-shunt" selecting bus to cause the relay 2EO to be picked up for the termination of the "non-shunt" period in response to the shifting of contact 389 of relay 2VP.

The picking up of the stepping relay 2V5 during the "shunt" period following the fifth "non-shunt" period is effective to cause the dropping away of relay 2CHP by opening the stick circuit for such relay at back contact 426. The stick circuit by which the relay 2CHP has been maintained picked up during the cycle extends from (+), including front contact 427 of relay 2CHP, wire 428, jumper 429, back contact 426 of relay 2V5, wire 430, front contact 431 of relay 2SA, winding of relay 2CHP, and front contact 337 of relay CHP, to (—).

Since this stick circuit for relay 2CHP includes front contact 431 of relay 2SA, it is apparent that, if for some reason the system should fail and an incomplete cycle should occur, this relay 2SA would drop away and release relay 2CHP. Even if such a failure is due to a temporary cause, the field station will not initiate another cycle of operation until another change in indication conditions has taken place at such field station to effect another release of relay 2CH to again temporarily close the pick up circuit of relay 2CHP. This is because the relay 2CH is restored to its normal energized condition immediately following the picking up of the relay 2CHP at the beginning of the initiation of the system for an indication cycle, so that it must be released by a second change in indication conditions before the relay 2CHP can be again picked up to initiate a second cycle of operation if the relay 2CHP is prematurely released as a result of an incomplete first cycle of operation.

The relays 2LET and 2LED are dropped away during the clear-out period in a manner corresponding to that which has been described by which such relays are dropped away during a long "shunt" period, and the dropping away of relay 2LET is effective to cause the dropping away of relay 2SA by opening the circuit for such relay at front contact 193. When the relay 2SA is dropped away, the relay 2SB is dropped away because of the opening of its circuit at front contact 195, and the dropping away of that relay is effective to cause the dropping away of the stepping relays, relay 2LOD, relay 2EO, and relay 2LO. The relay 2LO is dropped away by the opening of its stick circuit at front contact 432 of relay 2SB; the relay 2LOD is dropped away by the opening of its circuit at front contact 208 of relay 2SB; the relay 2EO is dropped away by the opening of its circuit at front contact 203 of relay 2SB; the relay 2VP is dropped away by the opening of its circuit at front contact 217 of relay 2SB (see Fig. 4); the relays 2V1 and 2V2 are dropped away by the opening of their stick circuits at front contact 433 of relay 2SB; and the dropping away of relay 2V1 is effective to cause the dropping away of relays 2V3 and 2V4 by the opening of their stick circuits at front contact 434. The relay 2V5 is dropped away upon the opening of its stick circuit at front contact 435 of relay 2V3.

With reference to the circuit which has been described for the energization of the relay 2EE to terminate each of the long "shunt" periods used for the transmission of indications, it will be noted that such circuit is opened upon the picking up of the relay 2V5 at back contact 408, and thus the relay 2EE cannot be picked up during the clear-out period after the relay 2LED has been dropped away, as is normally the case upon the transmission of a long "shunt" period.

Figure 2C:
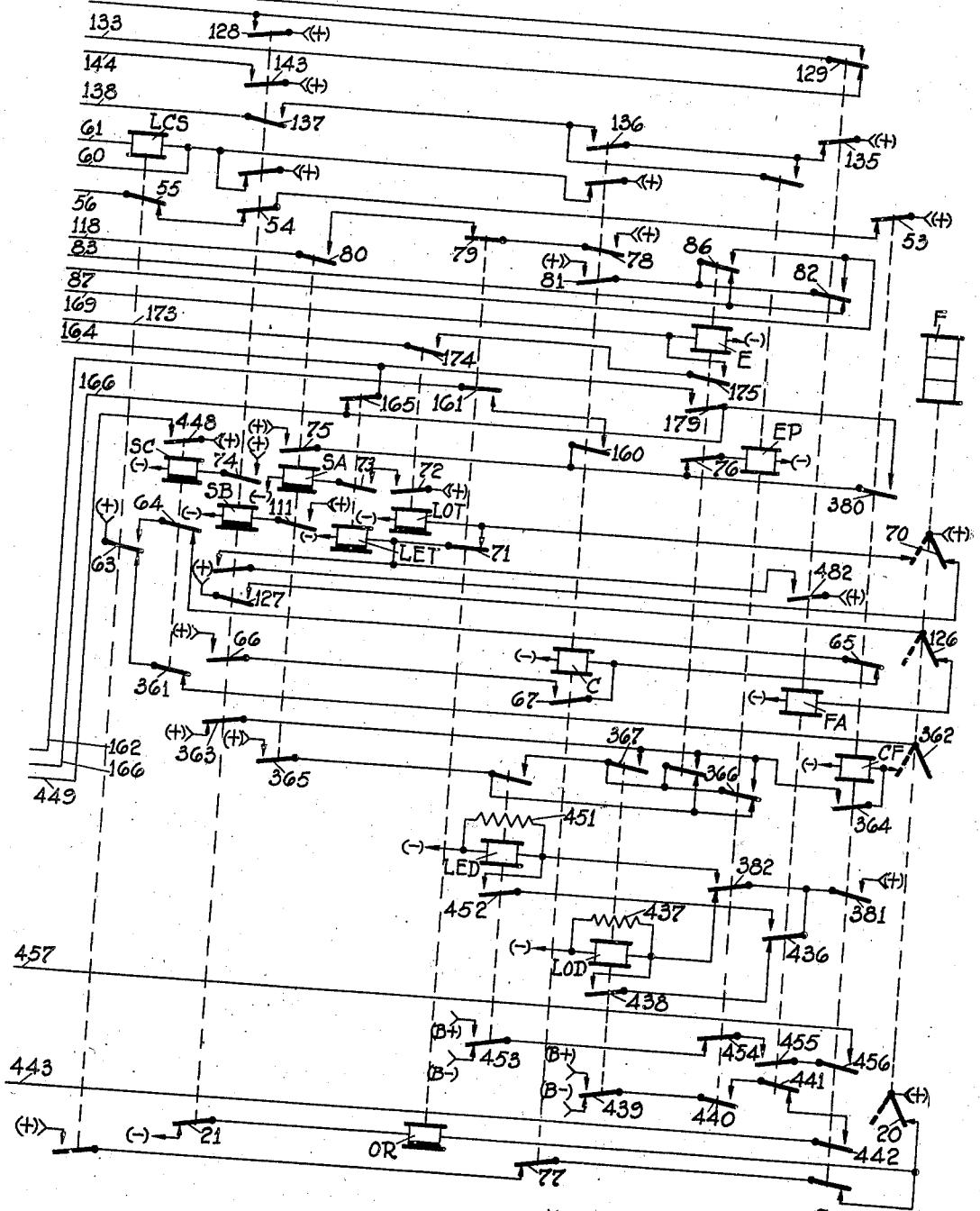

*Control office reception of indications.*—The long and short "non-shunt" and "shunt" periods caused to be transmitted by the respective field stations during indication cycles are measured at the control office as to their lengths by the relays LOD and LED respectively (see Fig. 2C). That is, if the relay LOD has had time to drop away during a "non-shunt" period, such "non-shunt" period is registered during the following "shunt" period as a long code character to form part of a station registration code, or to control an indication relay.

In a similar manner, the dropping away of relay LED during a long "shunt" period is effective during the following "non-shunt" period to register a long "shunt" period as a character of the station registration code, or to control an indication relay.

To consider specifically the mode of operation of the system during a typical indication cycle, it will be assumed that an indication cycle is transmitted by field station No. 2 in a manner which has been described, the conditioning at the control office during such indication cycle having been already considered.

The removal of the shunt applied at the field station during the conditioning period of the indication cycle is effective to cause a change in flux in the line transformer to cause the energization of the upper winding of the relay F with a polarity to cause the polar contacts of that relay to be operated to their right-hand positions. The circuit by which the relay F is energized under such conditions extends from the right-hand terminal of the secondary winding 356 (see Fig. 1A) of transformer 30 including upper winding of relay F, back contact 357 of relay LV, back contact 358 of relay C, and front contact 360 of relay SA, to the left-hand terminal of the secondary winding 356 of transformer 30. The operation of the polar contacts of relay F to their right-hand positions (see Fig. 2C) is effective to cause the picking up of the relay FA by the energization of a circuit extending from (+), including front contact 127 of relay SB, polar contact 126 of relay F in its right-hand position, and winding of relay FA, to (—). Upon the picking up of relay FA, the relay VP is picked up in a manner which has been described when considering specifically the mode of operation of the stepping relay bank, and the picking up of such relay is effective to cause the dropping away of the relay E by opening the circuit at back contact 167 which has been described as being effective to cause the relay E to be picked up during the conditioning period.

Upon the dropping away of relay E, the back point repeater relay EP is picked up by the energization of a circuit extending from (+), including front contact 75 of relay SA, back contact 76 of relay E, and winding of relay EP, to (—). Upon the picking up of relay EP, the relay LED is picked up by the energization of a circuit extending from (+), including front contact 381 of relay CF, front contact 382 of relay EP, and winding of relay LED, to (—).

The picking up of the relay EP causes the de-energization of the relay LOD by opening the circuit for such relay at back contact 382, but the relay LOD is slow in dropping away because of the resistance 437 shunted across the winding of the relay, and it is sufficiently slow in dropping away to cause it to be maintained picked up if the "non-shunt" period is short until the closure of its stick circuit upon the dropping away of relay FA at the beginning of the next "shunt" period. That is, the relay LOD does not have time to drop away upon the reception of a short non-shunt" period during the time interval between the opening of its pick-up circuit by the picking up of relay EP and the closure of its stick circuit by the dropping away of relay FA. Such stick circuit extends from (+), including front contact 381 of relay CF, back contact 436 of relay FA, front contact 438 of relay LOD, and winding of relay LOD, to (—).

The circuit by which the relay F is energized at the beginning of the first "shunt" period is the same as the circuit that has been described for the energization of such relay at the beginning of the first "non-shunt" period, but the induced voltage in the winding of transformer 30 (see Fig. 1A) upon the decay in flux of such transformer caused by the shunting of the line circuit is effective to cause the energization of that circuit with a polarity to cause the polar contacts of the relay F to be actuated to their left-hand positions. The shifting of polar contact 126 of relay F (see Fig. 2C) to its left-hand position causes the dropping away of relay FA, and the dropping away of relay FA is effective to cause the picking up of the registration relay R1 because the preceding "non-shunt" period has been short. The relay R1 is energized under such conditions by a circuit extending from (B+), including front contact 439 of relay LOD, front contact 440 of relay EP, back contact 441 of relay FA, front contact 442 of relay CF, wire 443, front contact 444 of relay VP, back contacts 445, 446 and 447 of relays V6, V4 and V2 respectively, wire 547, and lower winding of relay R1, to (B—). The picking up of that relay is effective to close a stick circuit for its upper winding to maintain such relay picked up throughout the cycle. Such stick circuit extends from (+), including front contact 448 of relay SC (see Fig. 2C), wire 449, front contact 450 of relay R1, and upper winding of relay R1, to (—). Should the first "non-shunt" period have been long, the relay LOD would have been dropped away before the dropping away of relay FA during the first "shunt" period, and relay LOD in its deenergized position during the following shunt period would cause the application of (B—) energy through back contact 439 of that relay to the circuit that has been described for the lower winding of the relay R1. But the relay R1 is not energized because both terminals of the relay are connected to (B—).

To continue consideration of the mode of operation of the relays during the first "shunt" period, the first of the stepping relays V1 is picked up in response to dropping away of relay FA in a manner which has been described, and the picking up of that relay is effective to cause the picking up of relay E by the energization of a circuit extending from (+), including front contact 75 of relay SA, front contact 380 of relay CF, wire 166, front contact 167 of relay VP, back contact 177 of relay V2, front contact 168 of relay V1, wire 169, and winding of relay E, to (—). The picking up of relay E is effective to cause the dropping away of the relay EP by opening its circuit at back contact 76, and the dropping away of relay EP is effective to open the circuit which has been described for the energization of the relay R1 at front contact 440 thus terminating an execution period for the energization of that registration period.

The dropping away of the relay EP during the first "shunt" period of the cycle opens the pick-up circuit for relay LED at front contact 382, and the relay LED by the resistance 451 shunted across its winding is sufficiently slow in dropping away to cause that relay to be maintained picked up until the closure of its stick circuit upon the picking up of the relay FA during the following "non-shunt" period, provided the "shunt" period under consideration is short. Such stick circuit extends from (+), including front contact 381 of relay CF, front contact 436 of relay FA, front contact 452 of relay LED, and winding of relay LED, to (—). According to the registration code under consideration, however, the first "shunt" period is long, and therefore the relay LED is dropped away before the closure of that stick circuit to correspond with the long "shunt" period applied to the line circuit.

The removal of the shunt from the line circuit at the end of the first "shunt" period causes the energization of the relay F with a polarity to operate its polar contacts to their right-hand positions. The relay FA is responsive to the relay F, and the relay VP is dropped away during the second "non-shunt" period in response to the picking up of the relay FA. The relay E is dropped away because of the shifting of contact 167 of relay VP, and the relay EP is picked up in response to the dropping away of the relay E upon the closure of back contact 76.

A circuit is closed for the registration relay R2 upon the picking up of relay FA during the second "non-shunt" period to register the character of the preceding "shunt" period, but inasmuch as such "shunt" period has been long, the relay R2 is not energized during the indication cycle under consideration because the contacts of relay LED remain in their dropped away positions connecting (B—) to the circuit for relay R2. It will be noted that the polarity of energization of the lower winding of relay R2 is dependent upon the contact 453 of relay LED, and should the preceding "shunt" period have been short rather than long, the closure of front contact 453 of relay LED would have been effective to cause the picking up of the relay R2 by the energization of its pick-up circuit with a positive polarity (B+). The picking up of relay EP opens the circuit which has been described for the relay R2 at back contact 454, and after such circuit has been opened, the relay LED is again picked up by the energization of its pick-up circuit closed at front contact 382. The picking up of relay EP opens the pick-up circuit for relay LOD at back contact 382, and such relay is dropped away as a result of the third "shunt" period being made long in accordance with the registration code assigned to field station No. 2.

The dropping away of the relay LOD as a result of the second "non-shunt" period being long, fails to cause the energization of the registration relay R3 associated with that period in response to the dropping away of relay FA during the following "shunt" period, because back contact 439 connects (B—) to its circuit. However, if relay LOD is maintained picked up for a short "shunt" period, the relay R3 is energized over a circuit extending from (B+), including front contact 439 of relay LOD, front contact 440 of relay EP, back contact 441 of relay FA, front contact 442 of relay CF, wire 443, back contact 444 of relay VP, back contacts 465 and 466 of relays V5 and V4 respectively, front contact 467 of relay V1, wire 468, and lower winding of relay R3, to (B—).

Should the preceding "non-shunt" period have been short rather than long, the relay R3 would have been picked up, and would have been maintained picked up by the energization of an obvious stick circuit closed at front contact 470. The dropping away of relay EP during the second "shunt" period opens the circuit that has been described for the relay R3, at front contact 440.

Inasmuch as the second "shunt" period is short in the indication cycle under consideration, the relay LED does not have time to be dropped away as the picking up of relay FA at the beginning of the third "non-shunt" period is effective to close a stick circuit for that relay before such relay has had time to be dropped away. Thus, the relay R4 is picked up during the third "non-shunt" period upon the picking up of relay FA by the energization of a circuit extending from (B+), including front contact 453 of relay LED, back contact 454 of relay EP, front contact 455 of relay FA, front contact 456 of relay CF, wire 457, back contacts 458, 459, 460 and 461 of relays V6, V5, V4 and V3 respectively, front contact 462 of relay V2, wire 469, and lower winding of relay R4, to (B—). The picking up of relay R4 by the energization of that circuit causes the closure of an obvious stick circuit for that relay at front contact 471, to maintain it picked up throughout the remainder of the indication cycle. The picking up of the relay EP opens the pick-up circuit that has been described for the relay R4 at back contact 454.

The fifth character of the registration code is short, as has been described when considering the transmission of registration codes, and therefore the relay LOD does not have time to drop away during the third "shunt" period of the cycle. Thus, during the following "shunt" period, the relay RX is picked up upon the dropping away of relay FA by the energization of a circuit extending from (B+), including front contact 439 of relay LOD, front contact 440 of relay EP, back contact 441 of relay FA, front contact 442 of relay CF, wire 443, front contact 444 of relay VP, back contacts 445 and 446 of relays V6 and V4 respectively, front contact 447 of relay V2, wire 472, and lower winding of relay RX, to (B—). The picking up of that relay closes an obvious stick circuit at front contact 473, to maintain such relay picked up until the dropping away of the relay SC during the clear-out period.

Upon the picking up of the registration execution relay RX, the station relay 2ST corresponding to field station No. 2 is picked up by the energization of a circuit extending from (+), including front contact 474 of relay RX, front contact 475 of relay R4, back contact 476 of relay R3, back contact 477 of relay R2, front contact 478 of relay R1, and winding of relay 2ST, to (—). The picking up of relay 2ST is effective to connect the indication relays TK, ATK and GK to the various indication channels to provide for their energization by one polarity or the other (B+ or B—) as such channels become energized upon the reception of the respective indication code characters.

Inasmuch as the energization of the magnetic stick indication relays with one polarity or the other in response to the respective long and short periods of the indication code received, is effective over circuits similar to those which have been described in detail for the registration relays, it is believed to be unnecessary to describe in detail the circuits used for the control of these indication relays. Thus certain portions of the indication circuits have been indicated by dotted lines 479 and 480 for the purpose of simplifying the disclosure.

For the purpose of simplifying the present disclosure, all of the indicator lamps controlled by the indication relays have not been shown, but it is to be understood that such lamps are provided in accordance with the usual practice. The OS indicator lamp TE, for example, is selectively energized and deenergized by the operation of the polar contact 481 of the magnetic stick track indication relay TK.

It has been pointed out that the number of steps to be taken during an indication cycle is dependent upon the number of channels required for indications at the field station transmitting. Thus, certain of the field stations may transmit a greater number of steps during an indication cycle than other field stations. The code receiving apparatus at the control office therefor takes a number of steps during an indication cycle to correspond with those taken by the field station transmitting, and at the end of such steps the control office apparatus goes through a clear-out period, such period being formed by the shunting of the line circuit by the field station transmitting.

To consider specifically the mode of operation at the control office during the clear-out period, it will be assumed that the system enters the clear-out period of the typical indication cycle which has been heretofore considered.

At the beginning of the clear-out period, the shunting of the line circuit causes the polar contacts of the relay F to be operated to their left-hand positions, and such operation causes the dropping away of relay FA by the opening of its circuit at polar contact 126. The dropping away of relay FA causes the picking up of the next one of the stepping relays (which in this case happens to be the relay V5), and the picking up of such stepping relay causes the picking up of relay E by the closure of a circuit extending from (+), including front contact 75 of relay SA, front contact 380 of relay CF, wire 166, front contact 167 of relay VP, back contact 190 of relay V6, front contact 181 of relay V5, front contact 180 of relay V4, front contact 178 of relay V3, front contact 177 of relay V2, front contact 168 of relay V1, wire 169, and winding of relay E, to (—). The picking up of relay E causes the dropping away of relay EP by opening its circuit at back contact 76, and the dropping away of relay EP causes the dropping away of relay LED by the opening of its circuit at front contact 382. It will be noted that the mode of operation as it has been described corresponds to that provided during a preceding long "shunt" period in the cycle, such as the first "shunt" period. This being the case, a circuit is closed upon the dropping away of relay FA for the control of an indication relay in accordance with the character of the preceding "non-shunt" period as if the period under consideration were a regular "shunt" period of the cycle.

The relay LET is deenergized by the dropping away of relay FA during the clear-out period by the opening of an obvious circuit for such relay at front contact 482, and when such relay is dropped away, the circuit for relay SA is opened at front contact 73 to cause the relay SA to be dropped away. Upon the dropping away of relay SA, the circuit for relay SB is opened at front contact 111, and the relay E is dropped away by the opening of its circuit at front contact 75 of relay SA. The dropping away of relay SA also causes the dropping away of relay CF by the opening of the circuit for such relay at front contact 365. Upon the dropping away of relay CF, the relay LOD is dropped away by the opening of its circuit at front contact 381.

After the dropping away of the relay SB, the stepping relays are dropped away, the relay VP being dropped away by the opening of its circuit at front contact 128, and the relays V1 and V2 being dropped away by the opening of their stick circuits at front contact 143. The dropping away of relay V1 causes the dropping away of relays V3 and V4 by the opening of the stick circuit for such relays at front contact 153, and the dropping away of relay V3 causes the dropping away of relay V5 by opening its circuit at front contact 156.

The line relay F (see Fig. 1A) is energized by a local circuit at the control office upon the dropping away of relay SB during the clear-out period with a polarity to operate its polar contacts to their right-hand positions. Such circuit extends from (+), including back contact 483 of relay SA, front contact 484 of relay SC, back contact 485 of relay SB, and middle winding of relay F, to (—). Upon the shifting of the polar contacts of relay F (see Fig. 2C) to their right-hand positions, the circuit for relay LOT is opened at polar contact 70 of relay F, and upon the shifting of polar contact 20 to its right-hand position, a pick-up circuit is closed for the office-rest relay OR extending from (+), including polar contact 20 of relay F in its right-hand position, winding of relay OR, and back contact 21 of relay SB, to (—).

The picking up of relay OR at the control office is effective to terminate the clear-out period by closing the line circuit to provide for its energization with a positive polarity (see Fig. 1A) and thereby restore the conditions of the line circuit to its normal rest condition. Energy is applied to the line wire 22 under such conditions from the positive terminal of line battery CB including back contact 23 of relay C, front contact 24 of relay OR, back contact 25 of relay CF, and filter windings 26 and 27 to line wire 22. The negative terminal of line battery CB is connected to line wire 28 from the negative terminal of line battery CB including winding 29 of line transformer 30, back contact 31 of relay C, back contact 32 of relay CF, and filter windings 33 and 34 to line wire 28.

The slow action of the relays LET, SA, SB and OR is such as to provide sufficient time for the clear-out to be effective at the field station which has been transmitting before the clear-out period is terminated.

*Lock-out of field station when control office transmits.*—As soon as the control office has initiated the transmission of a control cycle, and opened the line circuit at the beginning of the conditioning period, the CHP relays for the various field stations have their pick-up circuits opened by the shifting of the polar contacts of the line relays F so as to prevent the start of an indication cycle. The shifting of polar contact 214 of relay 2F (see Fig. 3A) to its left-hand position, for example, is effective to open the pick-up circuit for the relay 2CHP at field station No. 2 to prevent the picking up of that relay. It will be noted that the pick-up circuit for relay 2CHP also includes front contact 332 of relay 2FR, and the dropping away of that relay during the conditioning period of a control cycle is effective by the opening of front contact 332 to prevent the picking up of the relay 2CHP during any of the "on" periods of the control cycle when the polar relay 2F is energized with a polarity to operate its polar contact 214 to its right-hand position. It is therefore provided that the deenergization of the line circuit by the control office at the beginning of a conditioning period of a control cycle is effective to prevent the initiation of an indication cycle by any field station that does not have its CHP relay picked up at that time.

It will be noted that the relays SA and SB at the field stations are indirectly connected with the lock-out in that it is the continued energization of these relays during a control cycle that prevents the picking up of the field rest relay FR at that field station. The relay 2FR, for example, can be picked up only after the closure of back contact 49 of relay 2SB at the end of a cycle of operation.

*Lock-out of control office when field station transmits.*—When a field station has initiated an indication cycle by the shunting of the line circuit to provide a conditioning period, the field control relay CF (see Fig. 2C) at the control office is picked up in a manner which has been described. The picking up of that relays opens the circuit for the relay C which is used in the initiation of a control cycle at back contact 65 to prevent the initiation of a control cycle. The relay CF is maintained picked up throughout each indication cycle, and thus prevents a control office start from becoming effective until the indication cycle has been terminated.

*Superiority of control office starts over field starts.*—Assuming a condition where a field station starts an indication cycle simultaneously with the start of a control cycle at the control office, the relay C at the control office is picked up prior to the beginning of the conditioning period, so the shunting of the line circuit by the field station attempting to transmit cannot cause the picking up of the field control relay CF at the control office. This is true because the picking up of relay LCS (see Fig. 2C) opens the circuit for relay CF at back contact 63. Such being the case, the control office proceeds with its conditioning period according to the manner which has been described when considering the mode of operation of the system during the transmission of a control cycle, such conditioning period being made long as compared to the conditioning period ordinarily transmitted during an indication cycle by a field station. Because of the conditioning period being made long, the relay LET at the field station attempting to transmit is dropped away, and the dropping away of such relay causes the dropping away of the relay LO at that field station. Such field station is then conditioned for the reception of the control cycle.

To consider more specifically the condition of simultaneous control office and field transmission, assume field station No. 2 to be the station attempting to transmit an indication cycle. The relay 2LET (see Fig. 3A) is deenergized under such conditions upon the dropping away of relay FR during the indication cycle by the opening of its circuit at front contact 192, and the dropping away of the relay 2LET (because of a long conditioning period) is effective to cause the dropping away of the relay 2LO by opening its stick circuit at front contact 486, the stick circuit including back contact 487 of relay 2LED being open at that time because such relay is maintained energized until the opening of front contact 486 of relay 2LET. The relay 2LED is sufficiently slow in dropping away to insure the release of relay 2LO.

*Indication station selection.*—In case of simultaneous starts of a plurality of field stations for the transmission of indications, one station is selected on a code superiority basis, such station being the station of the group that is nearest to the control office. This is true because the order of superiority of the indication station registration codes corresponds to the order of geographic location of the field stations from the control office, the most superior station being the station nearest the control office.

With reference to the above code table, the order of superiority is determined on the principle that a short "non-shunt" period is superior to a long "non-shunt" period, and a long "shunt" period is superior to a short "shunt" period. On this basis, the first code in the table is the most superior code, so that station will be selected in preference to any of the others. The second code is inferior to the first in its fourth character, the fifth character being used for registration execution.

In a similar manner the third and fourth codes are inferior to the first and second codes in their third characters, the fourth code being made inferior to the third code by its fourth character. In a similar manner the order of superiority of codes is determined to complete the code table, the last code being the most inferior because of its being made up of all long "non-shunt" and short "shunt" characters.

Having thus determined the manner in which the codes are assigned to the various field stations, consideration will be given to the manner in which the most superior station is selected of a plurality of stations having simultaneous starts. In general, the selection is made by a process of elimination as for control station selection, the relays LO serving as station selecting relays during an indication cycle in a manner similar to the relays SO and SE during a control cycle. Thus, as long as there is correspondence between the code characters transmitted by the respective field stations of the group involved in the simultaneous start, such stations continue to transmit, but the LO relays are dropped away at the inferior stations when the code characters are reached in the cycle making such stations inferior. Each field station is allowed to continue to transmit only so long as its LO relay is maintained picked up.

To best illustrate the conditions involved in indication station selection, it will be assumed that of three field stations having simultaneous starts, field station No. 2 is the most superior station. It has been pointed out that registration code No. 4 in the order of superiority has been assigned to field station No. 2, and, for the purpose of best illustrating the conditions involved in indication station selection, it will be assumed that the other two stations have registration codes 5 and 9 respectively in the order of superiority of the code table. This particular choice of stations has been made for consideration because one of the stations is ruled out by a "non-shunt" period, and the other station is ruled out by a "shunt" period.

Inasmuch as the mode of operation at each of the field stations is the same as at field station No. 2 during the conditioning period, and during much of the remainder of the cycle, the mode of operation at field station No. 2 will be specifically considered, and a similar mode of operation will be assumed at each of the other field stations having the simultaneous start except as modifications in that mode of operation are pointed out. The mode of operation of the relays at such stations is illustrated diagrammatically in Figs. 8A and 8B.

The relay 2LO (see Figs. 3A and 3B) is picked up in response to the relay 2EO to initiate the conditioning period of the indication cycle at field station No. 2 in a manner which has been described. The pick-up circuit for relay 2LO under such conditions extends from (+), including back contact 346 of relay 2VI, wire 347, front contact 348 of relay 2CHP, front contact 349 of relay 2FR, back contact 350 of relay 2LOT, back contact 351 of relay 2LET, front contact 352 of relay 2EO, wire 353, and winding of relay 2LO, to (—). Such circuit is opened during the conditioning period by the dropping away of the relay 2FR at front contact 349, the relay 2FR being maintained dropped away throughout the remainder of the cycle. A stick circuit is closed for the relay 2LO, however, upon the picking up of that relay to maintain such relay picked up throughout the conditioning period. Such stick circuit extends from (+), including front contact 346 of relay 2VI, wire 347, front contact 348 of relay 2CHP, front contact 488 of relay 2EO, wire 489, front contact 490 of relay 2LO, and winding of relay 2LO, to (—). The picking up of relay 2LO initiates the conditioning period during which the relays 2F and 2FR are dropped away, and the relays 2LET, 2LOT, 2SA, 2SB, 2LOD, 2LED, 2SO, 2SE, 2CD and 2EE are picked up. The relay 2EE is the last of the relays to be picked up during the conditioning period and the picking up of that relay terminates the conditioning period. The picking up of the relay 2EE causes the dropping away of the relay 2EO, and the dropping away of relay 2EO opens the stick circuit that has been described for the relay 2LO at front contact 488; but the picking up of relay 2EE, with the relay 2LET picked up, is effective to close a stick circuit for maintaining the relay 2LO picked up, extending from (+), including front contact 432 of relay 2SB, front contact 491 of relay 2EE, front contact 486 of relay 2LET, wire 492, front contact 490 of relay 2LO, and winding of relay 2LO, to (—). It has been heretofore pointed out that although the relay 2LET is deenergized by the opening of front contact 192 of relay 2FR, it does not have time to drop away during the conditioning period unless such period is made long by the control office as is the case where there is a control office start involved.

In reviewing the mode of operation during the first "non-shunt" period of the cycle (a short period), relays 2F, 2FA and 2VP are successively picked up; and the relays 2SE, 2SO and 2EE are successively dropped away in response to the picking up of relay 2FA. The dropping away of relay 2EE causes the relay 2EO to be picked up to terminate the first "non-shunt" period.

The stick circuit including front contact 491 of relay 2EE for maintaining the relay 2LO picked up is opened upon the picking up of relay 2EE during the first "non-shunt" period, but the picking up of the relay 2FA prior to that time has been effective to cause the relay 2LO to be maintained picked up by a stick circuit extending from (+), including front contact 432 of relay 2SB, wire 493, front contact 494 of relay 2FA, front contact 490 of relay 2LO, and winding of relay 2LO, to (—). This stick circuit is maintained closed until the relay 2FA is dropped away during the following "shunt" period, but before that time the relay 2EO has been picked up, to close a stick circuit at front contact 488 to maintain the relay 2LO picked up.

It has been pointed out when considering the transmission of indications from a single field station that the relay 2EO can be picked up to terminate a "non-shunt" period in response to the dropping away of relay 2EE only if the code assigned to that station calls for that "non-shunt" period to be short. If the code calls for that "non-shunt" period to be long, the relay 2EO can be picked up only after the relays 2LOT and 2LOD have had time to be dropped away. In view of this, the field station No. 2 in making the first "non-shunt" period short does not allow sufficient time for the relays LOD and LOT at the field station having code No. 9 to be dropped away, but such relays are required to be dropped away by the long "non-shunt" period assigned as the first character of that code. Thus the relay EO cannot be picked up at that field station at the end of the first "non-shunt" period. The relay LO at such field station will, however, be maintained picked up by its stick circuit dependent upon a front contact of relay FA at such station until such relay FA is dropped away during the following "non-shunt" period. This being the case, the dropping away of the relay LO at that field station responsive to the relay FA is effective to prevent the picking up of the stepping relay V1 at that field station.

The dropping away of the relay LO at the most inferior of the field stations under consideration is effective to prevent the relay F at such station to be responsive to the energization of the line circuit during the remaining "non-shunt" periods of a cycle because such line relay is pole changed by the dropping away of the relay LO at the field station so as to be non-responsive to the "non-shunt" periods of the line circuit. This is true because the line circuit is energized with negative polarity at the control office for each transmission of a cycle in a manner which has been described, and the energization of the relay F at any field station having its relay LO dropped away is of a polarity to cause the polar contacts of such relay to be actuated to their left-hand positions.

Thus the field station having code No. 9 enters a clear-out period after the first "non-shunt" period, the relays LET, SA, SB and VP being successively dropped away responsive to the shifting of the polar contacts of relay F at that station, the relay LED being dropped away in response to the dropping away of relay LET, and the relays LOD and EE being dropped away in response to the dropping away of relay SB at that field station.

It has been pointed out that the relay 2LO at field station No. 2 is maintained picked up through the first "shunt" period by its stick circuit including front contact 488 of relay 2EO, such relay being picked up to initiate the period, and being dropped away at the beginning of the following "non-shunt" period. The relay 2EO is maintained picked up throughout the first "shunt" period because the code assigned to that field station (code No. 4) requires the first "shunt" period to be long, and under such conditions the relay 2EE can be picked up for the termination of that period only after the relays 2LET and 2LED have been dropped away.

At the field station having code No. 5, however, the relay EE is picked up in response to the picking up of the first of the stepping relays V1 because the registration code for that station requires the first "shunt" period to be short. The picking up of the relay EE under such conditions causes the dropping away of the relay EO at that station, but the "shunt" is maintained on the line circuit by the superior field station No. 2 to allow the relay LET at the field station having registration code No. 5 to be dropped away. The dropping away of the relay LET under such conditions causes the dropping away of the relay LO at that station. The circuit for such LO relay corresponds to the circuits shown in Figs. 3A and 3B for the relay 2LO. The stick circuit portion by which the relay 2LO would be maintained picked up under such conditions extends from (+), including front contact 432 of relay 2SB, front contact 491 of relay 2EE, front contact 486 of relay 2LET, wire 492, front contact 490 of relay 2LO, and winding of relay 2LO, to (—). A back contact of the relay LED is in the stick circuit for the LO relay at such field station to correspond with the opening of back contact 487 of relay 2LED in the stick circuit for relay 2LO. The relays LED and LO at that field station are both deenergized by the dropping away of the relay LET at such station, but the relay LED is sufficiently slow in dropping away to insure the dropping away of the relay LO at that station.

The dropping away of the relay LO at the field station having code No. 5 during the first "shunt" period is effective to pole change the line relay F at that field station in such a manner as to cause such relay to be non-responsive to the "non-shunt" periods transmitted during the remainder of the cycle, and therefore that field station clears out. The relays SA, SB and LOD are successively dropped away in response to the dropping away of relay LET at that station, and the relays VP, V1 and EE at that station are dropped away in response to the dropping away of the relay SB.

To consider the manner in which the relay 2LO is maintained picked up throughout the various other periods of the cycle at field station No. 2, the picking up of relay 2EE at the end of the first "shunt" period is effective to cause the relay 2LO to be maintained picked up by a stick circuit extending from (+), including front contact 432 of relay 2SB, front contact 491 of relay 2EE, wire 495, back contact 487 of relay 2LED, front contact 490 of relay 2LO, and winding of relay 2LO, to (—). This stick circuit is closed because the preceding "shunt" period has been long, but if such period would have been short, the relay 2LET would not have had time to drop away so the relay 2LO would be maintained picked up at the beginning of the "non-shunt" period by a stick circuit extending from (+), including front contact 432 of relay 2SB, front contact 491 of relay 2EE, front contact 486 of relay 2LET, wire 492, front contact 490 of relay 2LO, and winding of relay 2LO, to (—). The relay 2FA is picked up during the second "non-shunt" period to close a stick circuit for relay 2LO at front contact 494 to maintain such relay energized throughout the remainder of the "non-shunt" period, the stick circuit including front contact 491 of relay 2EE being opened during that period by the dropping away of that relay.

The picking up of relay 2EO to terminate the first "non-shunt" period is effective to close a stick circuit for relay 2LO at front contact 488 and thus maintain such relay picked up throughout the second "shunt" period of the cycle.

Having described specifically how the relay 2LO is maintained picked up during specific long and short "non-shunt" and "shunt" periods, it is believed to be readily apparent to those skilled in the art how the relay 2LO is maintained picked up throughout the remaining periods of the cycle, relay 2LO being maintained picked up during the periods used for the transmission of indications in a manner corresponding to that which has been specifically described by which the relay 2LO has maintained picked up during the registration portion of the cycle.

*Cycle distribution.*—A cycle distribution relay CD is provided at each field location for the purpose of allowing a single field station to transmit successive indication cycles only if such station is the only station having indications to transmit. This is to allow the most inferior stations equal opportunity for the transmission of indications.

The general organization of the circuits is such that one and only one indication cycle can be transmitted by each station of a group of stations having simultaneous field starts. After each station of that group has transmitted an indication cycle, the system enters a period of rest for a sufficient length of time to allow the dropping away of the cycle distribution relays CD, such relays having slow drop away characteristics and such relays being deenergized only after the picking up of the relays FR at the respective field stations. Inasmuch as the relays CHP at the respective field stations include in their pick-up circuits back contacts of the relays CD at such stations, it will be readily apparent that a second indication cycle can be initiated by any station only after the dropping away of the cycle distribution relay CD at such station. Sufficient time is taken in the drop away of such relay to allow any other station having its relay CHP already picked up to initiate an indication cycle prior to the drop away of such relay CD.

To consider more specifically the mode of operation of the cycle distribution relays CD, it will be assumed that an indication cycle has been transmitted as has been described by station No. 2, and it will also be assumed that such indication cycle has been completed by the positive energization of the line circuit at the control office to form the beginning of a period of rest. Under such conditions, the relay 2F at field station No. 2 has its polar contacts actuated to their right-hand positions, and in response to the actuation of the polar contact 48 of relay 2F (see Fig. 3A) to its right-hand positon, the relay 2FR is picked up by the energization of a circuit extending from (+), including polar contact 48 of relay 2F in its right-hand position, back contact 49 of relay 2SB, front contact 496 of relay 2CD, and winding of relay 2FR, to (—). The picking up of such relay closes a stick circuit at front contact 50 to shunt contact 496 out of the circuit just described.

The relay 2FA is picked up in response to the actuation of polar contact 214 of relay 2F to its right-hand position by the energization of a circuit extending from (+), including polar contact 214 of relay 2F in its right-hand position, back contact 332 of relay 2FR, wire 216, and winding of relay 2FA, to (—). The picking up of such relay closes a stick circuit to maintain that relay picked up as long as the relay 2CD is picked up. Such circuit extends from (+), including polar contact 214 of relay 2F in its right-hand position, front contact 497 of relay 2CD, wire 498, front contact 499 of relay 2FA, and winding of relay 2FA, to (—).

It will be noted from this circuit that the relay 2FA is maintained picked up until the relay 2CD is dropped away the picking up of relay 2FA being effective to open the stick circuit for relay 2CD which extends from (+), including back contact 500 of relay 2FA, wire 501, front contact 502 of relay 2CD, and winding of relay 2CD, to (—); and the dropping away of relay 2CD is effective to cause the drop away of relay 2FA by opening its stick circuit at front contact 497, the pick-up circuit for such relay having been opened by the picking up of relay 2FR of back contact 332. After the relay 2CD has been dropped away the system is conditioned so as to allow the picking up of the relay 2CHP, if the relay 2CH has been dropped away, to initiate an indication cycle in a manner which has been described.

It will be noted that the drop-away time of the relay 2CD is sufficient to allow another field station having its relay CHP already picked up to initiate an indication cycle before the relay 2CHP at field station No. 2 can be picked up, and thereby obtain control of the line circuit for the transmission of such cycle. This is true because such other station, having its relay CHP picked up, can pick up its relay EO in response to the picking up of the relay FR at that field station, and by the picking up of such relay EO cause the picking up of the relay LO at that field station to shunt the line circuit and initiate the indication cycle.

Having described a centralized traffic controlling system as one specific embodiment of the present invention, it is desired to be understood that this form is selected to facilitate in the disclosure of the invention rather than to limit the number of forms which the invention may assume, and it is further understood that various adaptations, alterations, and modifications may be applied to the specific form shown to meet the requirements of practice, without in any manner departing from the spirit or scope of the present invention, except as limited by the appended claims.

What we claim is:

1. In a centralized traffic controlling system for railroads, a line circuit extending from a control office to a field station, means for steadily energizing the line circuit at the control office, a code transmitter relay at the field station for when energized applying a shunt to said line circuit, another code transmitter relay at the field station for when energized removing said shunt from the line circuit, circuit means for energizing each of said code transmitter relays respectively in alternate relationship for selected long and short periods of time to cause the transmission of a series of code characters to the control office, such series being made up of shunt and non-shunt periods transmitted in alternate relationship, each of such periods being of a selected length, and code responsive means at the control office for receiving said series of code characters.

2. In a centralized traffic controlling system of the character described, a line circuit connecting a control office and a plurality of field stations and having different series of time-spaced impulses applied thereto for selecting any desired field station, each impulse of each series and each time-space of each series being characterized by its relatively long or short duration, a line relay at each field station for repeating each of the impulses of any series, two timing relays at each field station, one for timing the impulse periods and the other for timing the space periods, two station selecting relays at each field station picked up at the beginning of any series of impulses, stick circuit means at each station for maintaining one of said station selecting relays energized during each impulse period only if the preceding time space period has been of a length corresponding to the code of that station as measured by said timing relay for said space periods, stick circuit means at each station for maintaining the other of said station selecting relays energized during each space period only if the preceding impulse period has been of a length corresponding to the code of that station as measured by said timing relay for said impulse periods, and means for maintaining each of said selector relays energized during each series of impulses at those times that it is not being selectively governed in accordance with the code of its station, said means being effective throughout any given impulse or space period only provided the timing relay for the following impulse or space period is restored to its condition for measuring such following period.

3. In a centralized traffic controlling system of the character described, a line circuit connecting a control office and a field station having different series of time spaced impulses applied thereto, each impulse and each time space being characterized by being relatively long or short, a line relay at a field station for repeating each of the impulses, two selecting relays picked up at the beginning of any series of impulses, code determining means at the field station for determining the particular series of impulses to which such field station is to be responsive, stick circuit means for maintaining one of said selector relays energized during each period of energization only if the preceding time space has been of a length corresponding to the code of said code determining means for that time space, stick circuit means for maintaining the other of said selector relays energized during each time space only if the preceding period of energization has been of a length corresponding to the code of said code determining means for that period of energization, means for maintaining each of said selector relays energized during each series of impulses at times not governed by said stick circuit means only so long as the other selector relay is energized, a device at the field station, and means for controlling said device at the end of a series of impulses in response to such series only if both of said selector relays are maintained energized throughout the series.

4. In a centralized traffic controlling system, a line circuit extending between a control office and a field station, means at the control office for energizing and deenergizing said line circuit, each energization of the line circuit and the following deenergization of the line circuit comprising a step period, two code selecting relays, means effective at the beginning of each step period to selectively energize one or the other of said code selecting relays in accordance with the code to be transmitted, means controlled by one of said code selecting relays when energized to determine that the energization of the line circuit for that step period shall be relatively long while its deenergization is relatively short, and means controlled by the other code selecting relay when energized to determine that the energization of the line circuit for that step period shall be relatively short while its deenergization is relatively long.

5. In a centralized traffic controlling system for railroads, a line circuit extending from a control office to a plurality of field stations and having different series of time spaced impulses applied thereto in accordance with the station desired to be selected, said impulses and time spaces of any series being made of distinctive character by their relative short or long lengths, line circuit relay means at each field station for repeating the time spaced impulses of any series, a first timing means at each field station distinctively controlled by its associated line relay means in accordance with the short or long character of the impulses of any series, another timing means distinctively controlled by its associated line relay means in accordance with the short or long character of the time spaces of any series, two station selecting relays at each station being picked up at the beginning of any series of impulses, a selecting stick circuit at each station for one of the selecting relays at that station selectively opened or closed in accordance with whether said first timing means is distinctively controlled to correspond with its station code for each impulse period, another selecting stick circuit at each station for the other selecting relay at that station selectively opened or closed in accordance with whether said second timing means at that station is distinctively controlled to correspond with its station code for each time space period, contact means associated with the selecting relays at each station effective to open the selecting stick circuits for either relay at that station if the other is deenergized by the opening of its selecting stick circuit, and holding circuits at each station associated with said station selecting relays for maintaining them energized between the successive periods upon which they are selectively maintained energized, whereby a station is selected only upon the correspondence of the code received over said line circuit with the code assigned to that station.

6. In a centralized traffic controlling system, a line circuit extending between a control office and a plurality of field stations, means at the control office for energizing and deenergizing said line circuit, each energization of the line circuit and the following deenergization of the line circuit comprising a step period, code transmitting means at the control office for transmitting a station selecting code for selecting any desired station by distinctive characterization of each of a plurality of step periods, said distinctive characterization for each step period being either a relatively long line circuit energization followed by a relatively short line circuit deenergization or a relatively short line circuit energization followed by a relatively long line circuit deenergization, and station selecting means at each of the field stations selectively responsive to its station code at the termination of such code only if each step period of such code has included a long energization accompanied by a short deenergization or a short energization accompanied by a long deenergization, whereby the erroneous reception by any field station of a long energization followed by a long deenergization or of a short energization followed by a short period of deenergization, fails to select any field station.

7. In a centralized traffic control system for railroads, a line circuit connecting a control office and a field station, means at the control office for transmitting any one of several different distinctive codes to said field station, each code comprising a plurality of successive step periods, and each step period being characterized by a short period of line circuit energization followed by a long period of deenergization or a long period of line circuit energization followed by a short period of deenergization, code responsive means at said field station for repeating each period of energization and each period of deenergization of said line circuit as to its respective long or short duration, a device at said field station, and means for controlling said device in response to a code received by said code responsive means, only if each step period of such code comprises in combination a short period of line circuit energization followed by a long period of deenergization or a long period of line circuit energization followed by a short period of deenergization.

8. In a centralized traffic controlling system for railroads, a single line circuit connecting a control office with a plurality of field stations, a polar line relay at each field station connected in multiple across said line circuit and having polar contacts biased toward a particular position, means at the control office normally energizing said line circuit with energy of a particular polarity, whereby the polar contacts of said line relays at the field stations are normally in their operated positions, indication transmitting means at each field station effective upon a change in indication conditions at that station to initiate said system into operation only if it is at rest and said line circuit is energized with said normal polarity, said means acting to temporarily shunt said line circuit and then intermittently shunt said line circuit in accordance with an indication code, receiving means at the control office effective upon the initial shunting of said line circuit by a field station to reverse the polarity of energization of said line circuit, and means at each field station controlled by said indication transmitting means for reversibly connecting its associated line relay across said line circuit to render it responsive to the reverse polarity of energization of said line circuit, said means also being distinctively responsive to the code impressed on said line circuit by that field station so as to maintain said line relay reversibly connected to said line circuit only so long as the code impressed on said line circuit corresponds to the code assigned to that station.

9. In a centralized traffic controlling system for railroads, a single line circuit connecting a control office with a plurality of field stations, a polar line relay at each field station connected in multiple across said line circuit and each having polar contacts biased toward a particular position, means at the control office normally energizing said line circuit with energy of a particular polarity but effective upon the momentary shunting of said line circuit to energize it with the opposite polarity, whereby the polar contacts of said line relays at the field stations are normally actuated to their operated positions, indication transmitting means at each field station effective upon a change in indication conditions at that station to initiate said system into operation only if it is at rest and said line circuit is energized with said normal polarity, said means including stick relay means having a pick-up circuit momentarily energized upon a change in indication conditions at that station, and having a stick circuit controlled in accordance with the coding operation of said line relay, said stick relay means acting upon its energization to reversibly connect its associated line relay to said line circuit following a momentary shunting of said line circuit, and means at each field station controlled by its associated line relay in accordance with the code received thereby so as to momentarily open the stick circuit of its stick relay means if the code on said line circuit fails to correspond with the code for that field station, whereby in the event of the transmission of codes by a plurality of field stations at the same time, said stick relay means is caused to be deenergized at all such stations except that one applying a superior code to said line circuit.

10. In a centralized traffic controlling system for railroads, a single line circuit connecting a control office with a plurality of field stations, code transmitting means at each field station acting when rendered effective to selectively apply short and long shunt and non-shunt periods to said line circuit in accordance with its station code and indications to be transmitted to the control office, means for applying a relatively long permission impulse at the end of the transmission of each indication code, code receiving means at said control office distinctively responsive to any code applied to the line circuit, stick relay means at each field station acting when picked up to render effective its associated code transmitting means and having a pick-up circuit momentarily closed upon a change in indication conditions only if a relatively long permission impulse is applied to said line circuit at the end of the preceding code transmitted over said line circuit, and a stick circuit for each of said stick relay means maintained closed while said code transmitting means at its station is in operation only if said code transmitting means continues transmission to complete the entire code then ready for transmission, whereby a field station initiates code transmission over said line circuit following an incomplete transmission only after another change in indication conditions occurs.

11. In a centralized traffic controlling system for railroads, a single line circuit connecting a control office with a plurality of field stations, transmitting means at the control office capable of impressing any one of a plurality of different series of code elements on said line circuit, each code element comprising two complementary code digits, one being of relatively long duration and the other being of relatively short duration, and code receiving means at each of the field stations distinctively controlled in response to a particular one of said different series of code elements only if each of the code elements of that particular series comprises two complementary code digits.

WILLIAM D. HAILES.
FREDERICK W. BRIXNER.
WILLIAM M. BARKER.
ALFRED V. DASBURG.